(12) United States Patent
Kataoka et al.

(10) Patent No.: US 6,819,526 B2
(45) Date of Patent: Nov. 16, 2004

(54) HOLDING MEMBER FOR INFORMATION STORAGE DISK AND INFORMATION STORAGE DISK DRIVE DEVICE

(75) Inventors: Mariko Kataoka, Sagamihara (JP); Naoyuki Goto, Machida (JP); Kousuke Nakajima, Sagamihara (JP); Junko Ishioka, Sagamihara (JP); Katsuhiko Yamaguchi, Sagamihara (JP); Toshitaka Yagi, Sagamihara (JP)

(73) Assignee: Kabushiki Kaisha Ohara, Kanagawa (JP)

( * ) Notice: Subject to any disclaimer, the term of this patent is extended or adjusted under 35 U.S.C. 154(b) by 258 days.

(21) Appl. No.: 10/069,737

(22) PCT Filed: Mar. 29, 2001

(86) PCT No.: PCT/JP00/06396

§ 371 (c)(1),
(2), (4) Date: Feb. 26, 2002

(87) PCT Pub. No.: WO01/21539

PCT Pub. Date: Mar. 29, 2001

(65) Prior Publication Data

US 2003/0099062 A1 May 29, 2003

(30) Foreign Application Priority Data

| Sep. 21, 1999 | (JP) | 11-266457 |
| Oct. 13, 1999 | (JP) | 11-290910 |
| Feb. 1, 2000 | (JP) | 2000-023871 |
| Apr. 10, 2000 | (JP) | 2000-107608 |
| May 24, 2000 | (JP) | 2000-152961 |
| Oct. 5, 2000 | (JP) | 11-283986 |

(51) Int. Cl.⁷ ............................................. G11B 17/02
(52) U.S. Cl. .................. 360/97.01; 360/98.07; 360/98.08; 360/99.08; 360/99.12
(58) Field of Search .................... 360/97.01, 98.07, 360/98.08, 99.04, 99.05, 99.08, 99.12

(56) References Cited

U.S. PATENT DOCUMENTS

| 5,436,775 | A | * | 7/1995 | Ishimatsu | 360/98.08 |
| 5,596,462 | A | * | 1/1997 | Smith | 360/99.12 |
| 5,724,208 | A | * | 3/1998 | Yahata | 360/98.08 |
| 5,768,052 | A | * | 6/1998 | Smith | 360/99.12 |
| 5,972,816 | A | | 10/1999 | Goto | |
| 6,215,617 | B1 | * | 4/2001 | Okumura et al. | 360/99.12 |

FOREIGN PATENT DOCUMENTS

| DE | 198 50 744 C1 | 10/2000 |
| EP | 875886 | 11/1998 |
| EP | 939395 | 9/1999 |
| EP | 940806 | 9/1999 |
| EP | 945855 | 9/1999 |
| EP | 2000-302481 | 10/2000 |
| JP | 6-168536 | 6/1994 |
| JP | 8-315533 | 11/1996 |
| JP | 2000-203880 | 7/2000 |
| JP | 2000-339672 | 12/2000 |

\* cited by examiner

Primary Examiner—Robert S. Tupper
(74) Attorney, Agent, or Firm—Hedman & Costigan, P.C.

(57) ABSTRACT

An information storage disk holding member for holding an information storage disk in position in an information storage disk drive device, the holding member being made of glass-ceramics in which a crystal phase is dispersed in a glass matrix. The holding member has specific rigidity (Young's modulus/specific gravity) of not greater than 37 GPa, specific gravity of not greater than 3.0, coefficient of thermal expansion within a range from −50° C. to +70° C. which is within a range from +35×10⁻⁷/° C. to +130×10⁻⁷/° C., Young's modulus within a range from 95 GPa to 130 GPa, specific gravity within a range from 2.40 to 2.60 and bending strength within a range from 400 MPa to 800 MPa.

There is provided an information storage disk holding member which is capable of coping with a high speed rotation of a disk in conformity with tendencies toward high speed transmission of information, increasing mechanical strength for adaptation to mobile uses, having a thermal expansion property matching that of other drive component parts and eliminating defects caused by solving out of alkali. There is also provided an information storage disk drive device using this holding member.

63 Claims, 1 Drawing Sheet

HOLDING MEMBER FOR INFORMATION STORAGE DISK AND INFORMATION STORAGE DISK DRIVE DEVICE

BACKGROUND OF THE INVENTION

1. Field of the Invention

This invention relates to information storage disk holding members made of glass-ceramics and an information storage disk drive device using the disk holding members. In this specification, "holding members" mean members for holding an information storage disk in position in an information storage disk drive device and include, for example, a rotor hub in the form of a rotating column for holding one or more information storage disk, a disk supporting plane forming member on which information storage disks are stacked with a predetermined interval, a spacer ring and a shim, and a clamp as a mounting member.

An information storage disk drive device is generally constructed in such a manner that one or more information storage disks and spacer rings are mounted alternately on a rotor hub which is secured fixedly to a rotor shaft and these disks and spacer rings are finally clamped with a shim and a clamp. The holding members such as the rotor hub and spacer rings are normally made of metal materials such as stainless steel and an aluminum alloy. There is, however, an increasing tendency toward using a disk substrate made of glass-ceramics in lieu of the conventional aluminum disk. In this case, use of a metal material for holding members is undesirable because there is a great difference in the coefficient of thermal expansion between the holding members and the substrate and, moreover, there occur distortion, deformation and flash in the course of processing of the holding members. Furthermore, since an aluminum alloy is a soft material, deformation tends to occur during a high speed rotation and, therefore, it cannot cope sufficiently with current requirement for a high density recording.

In this technical field, since a high precision is required for positioning of a head and a medium, a particularly high precision in size is required for component parts of a medium substrate and a disk. For this reason, it is desirable for information storage disk holding members to have as little difference as possible between other component parts of a disk drive device (hereinafter referred to "other drive component parts") in the coefficient of thermal expansion within a temperature range of an environment in which the drive device is used. It is also desirable for them to have a low dust producing property, a high reliability, a low cost and a good polishing property. There is demand for a more suitable material for information storage disk holding members which satisfies all of these requirements.

As materials for solving these problems, there have been proposed polycrystalline ceramics (Japanese Patent Application Laid-open Publication No. Sho 61-148667 and Japanese Patent Application Laid-open Publication No. Hei 9-44969 etc.) and amorphous glass (Japanese Patent Application Laid-open Publication No. Hei 10-74350 etc.) but satisfactory solution has not been achieved yet.

It is an object of the present invention to provide information storage disk holding members which have solved the above described problems and are capable of coping with a high speed rotation of a disk in conformity with tendencies toward high density recording and high speed transmission of information, increasing mechanical strength for adaptation to mobile uses, having a thermal expansion property matching that of other drive component parts and eliminating defects caused by dissolving out of alkali, and also to provide an information storage disk drive device using these holding members.

BRIEF SUMMARY OF THE INVENTION

As a result of studies and experiments made by the inventors of the present invention for achieving the above described object of the invention, it has been found, which has led to the present invention, that, by heat treating a base glass of a proper composition such as a $SiO_2$—$Li_2O$—$K_2O$—$P_2O_5$—$Al_2O_3$—$ZrO_2$ glass under proper conditions, glass-ceramics having a high Young's modulus, a low specific gravity, a coefficient of thermal expansion, a high mechanical strength and a low dust producing property and being thereby capable of coping with a high speed rotation of a disk and very suitable for information storage disk holding members, particularly for spacer rings, can be obtained.

As the first aspect of the invention, the invention described in claim 1 is an information storage disk holding member for holding an information storage disk in position, said holding member being made of glass-ceramics in which a crystal phase is dispersed in a glass matrix.

The invention described in claim 2 is an information storage disk holding member as defined in claim 1 wherein specific rigidity (Young's modulus/specific gravity) is not smaller than 37 GPa and specific gravity is not greater than 3.0.

The invention described in claim 3 is an information storage disk holding member as defined in claim 1 wherein Young's modulus is within a range from 95 GPa to 130 GPa and specific gravity is within a range from 2.40 to 2.60.

The invention described in claim 4 is an information storage disk holding member as defined in claim 1 wherein bending strength is within a range from 400 MPa to 800 MPa.

The invention described in claim 5 is an information storage disk holding member as defined in claim 1 wherein the glass-ceramics comprise, as a predominant crystal phase or phases, at least one crystal phase selected from the group consisting of lithium disilicate ($Li_2O \cdot 2SiO_2$), α-quartz (α-$SiO_2$), α-quartz solid solution (α-$SiO_2$ solid solution), α-cristobalite (α-$SiO_2$) and α-cristobalite solid solution (α-$SiO_2$ solid solution).

The invention described in claim 6 is an information storage disk holding member as defined in claim 5 wherein the glass-ceramics comprise, as a predominant crystal phase, lithium disilicate.

The invention described in claim 7 is an information storage disk holding member as defined in claim 1 wherein an amount of crystal of lithium disilicate in the glass-ceramics is 3–10 mass % and an average crystal grain diameter of the crystal phase is within a range from 0.01 μm–0.05 μm.

The invention described in claim 8 is an information storage disk holding member as defined in claim 1 wherein the glass-ceramics comprise, in mass % on oxide basis,

| | |
|---|---|
| $SiO_2$ | 70–79% |
| $Li_2O$ | 8–12% |
| $K_2O$ | 0–4% |
| MgO | 0–less than 2% |
| ZnO | 0–less than 2% |
| $P_2O_5$ | 1.5–3% |
| $ZrO_2$ | 1.5–7% |
| $Al_2O_3$ | 3–9% |
| $Sb_2O_3 + As_3O_3$ | 0–2%. |

The invention described in claim 9 is an information storage disk holding member as defined in any of claims 1–8 wherein coefficient of thermal expansion within a range from −50° C. to +70° C. is within a range from +65×10⁻⁷/° C. to +130×10⁻⁷/° C.

As the second aspect of the invention, the invention described in claim 10 is an information storage disk holding member as defined in claim 1 wherein the glass-ceramics comprises, as a predominant crystal phase, α-quartz (α-SiO$_2$) or α-quartz solid solution (α-SiO$_2$ solid solution), an amount of the crystal phase is 3–35 mass %, and an average crystal grain diameter of the crystal phase is not greater than 0.10 μm.

The invention described in claim 11 is an information storage disk holding member as defined in claim 10 wherein an average crystal grain diameter of the entire predominant crystal phase of the glass-ceramics is not greater than 0.05 μm.

The invention described in claim 12 is an information storage disk holding member as defined in claim 10 wherein the glass-ceramics are substantially free of PbO.

The invention described in claim 13 is an information storage disk holding member as defined in claim 10 wherein coefficient of thermal expansion within a range from −50° C. to +70° C. is within a range from +95×10⁻⁷/° C. to +110×10⁻⁷/° C.

The invention described in claim 14 is an information storage disk holding member as defined in claim 10 wherein the glass-ceramics comprise, in mass % on oxide basis,

| | |
|---|---|
| SiO$_2$ | 70–77% |
| Li$_2$O | 5–less than 9% |
| K$_2$O | 2–5% |
| MgO + ZnO + SrO + BaO | 1–2% |
| Y$_2$O$_3$ + WO$_3$ + La$_2$O$_3$ + Bi$_2$O$_3$ | 1–3% |
| P$_2$O$_5$ | 1.0–2.5% |
| ZrO$_2$ | 2.0–7% |
| Al$_2$O$_3$ | 5–10% |
| Na$_2$O | 0–1% |
| Sb$_2$O$_3$ + As$_3$O$_3$ | 0–2%. |

The invention described in claim 15 is an information storage disk holding member as defined in any of claims 10–14 wherein an amount of crystal of lithium disilicate in the glass-ceramics is within a range from 15 mass % to 40 mass %.

As the third aspect of the invention, the invention described in claim 16 is an information storage disk holding member as defined in claim 1 wherein the glass-ceramics comprise, as a predominant crystal phase or phases, at least one crystal phase selected from the group consisting of cordierite (Mg$_2$Al$_4$Si$_5$O$_{18}$), cordierite solid solution (Mg$_2$Al$_4$Si$_5$O$_{18}$ solid solution), spinel, spinel solid solution, enstatite (MgSiO$_3$), enstatite solid solution (MgSiO$_3$ solid solution), β-quartz (β-SiO$_2$), β-quartz solid solution (β-SiO$_2$ solid solution), magnesium titanate (MgTi$_2$O$_5$) and magnesium titanate solid solution (MgTi$_2$O$_5$ solid solution).

The invention described in claim 17 is an information storage disk holding member as defined in claim 16 wherein the glass-ceramics comprise, in mass % on oxide basis,

| | |
|---|---|
| SiO$_2$ | 40–60% |
| MgO | 10–18% |
| Al$_2$O$_3$ | 10–less than 20% |
| P$_2$O$_5$ | 0–4% |

-continued

| | |
|---|---|
| B$_2$O$_3$ | 0–4% |
| CaO | 0.5–4% |
| SrO | 0–2% |
| BaO | 0–5% |
| ZrO$_2$ | 0–5% |
| TiO$_2$ | 2.5–12% |
| Bi$_2$O$_3$ | 0–6% |
| Sb$_2$O$_3$ | 0–1% |
| As$_2$O$_3$ | 0–1% |
| Fe$_2$O$_3$ | 0–2%. |

The invention described in claim 18 is an information storage disk holding member as defined in claim 16 or 17 wherein coefficient of thermal expansion within a range from −50° C. to +70° C. is within a range from +30×10⁻⁷/° C. to +65×10⁻⁷/° C.

As the fourth aspect of the invention, the invention described in claim 19 is an information storage disk holding member as defined in claim 1 wherein the glass-ceramics comprise, as a predominant crystal phase or phases, at least one crystal phase selected from the group consisting of enstatite (MgSiO$_3$), enstatite solid solution (MgSiO$_3$ solid solution), magnesium titanate (MgTi$_2$O$_5$), magnesium titanate solid solution (MgTi$_2$O$_5$ solid solution), spinel and spinel solid solution, the glass-ceramics comprise Al$_2$O$_3$ in an amount of less than 20 mass %, and the glass-ceramics have Young's modulus within a range from 115 GPa to 160 GPa.

The invention described in claim 20 is an information storage disk holding member as defined in claim 19 wherein the glass-ceramics comprise enstatite (MgSiO$_3$) or enstatite solid solution (MgSiO$_3$ solid solution) as a crystal phase having the largest precipitation amount (first phase).

The invention described in claim 21 is an information storage disk holding member as defined in claim 19 wherein the glass ceramics comprise magnesium titanate (MgTi$_2$O$_5$) or magnesium titanate solid solution (MgTi$_2$O$_5$ solid solution) as a crystal phase having the largest precipitation amount (first phase).

The invention described in claim 22 is an information storage disk holding member as defined in claim 20 wherein the glass-ceramics comprise, as a crystal phase having a precipitation amount which is smaller than the precipitation amount of the first phase, at least one crytal phase selected from the group consisting of magnesium titanate (MgTi$_2$O$_5$), magnesium titanate solid solution (MgTi$_2$O$_5$ solid solution), spinel and spinel solid solution.

The invention described in claim 23 is an information storage disk holding member as defined in claim 21 wherein the glass-ceramics comprise, as a crystal phase having a precipitation amount which is smaller than the precipitation amount of the first phase, at least one crytal phase selected from the group consisting of enstatite (MgSiO$_3$), enstatite solid solution (MgSiO$_3$ solid solution), spinel and spinel solid solution.

The invention described in claim 24 is an information storage disk holding member as defined in claim 19 wherein the glass-ceramics are substantially free of Li$_2$O, Na$_2$O and K$_2$O.

The invention described in claim 25 is an information storage disk holding member as defined in claim 19 wherein the glass-ceramics comprise, in mass % on oxide basis,

| | |
|---|---|
| SiO$_2$ | 40–60% |
| MgO | 10–20% |
| Al$_2$O$_3$ | 10–less than 20% |
| CaO | 0.5–4% |
| SrO | 0.5–4% |
| BaO | 0–5% |
| ZrO$_2$ | 0–5% |
| TiO$_2$ | exceeding 8% and up to 12% |
| Bi$_2$O$_3$ | 0–6% |
| Sb$_2$O$_3$ | 0–1% |
| As$_2$O$_3$ | 0–1%. |

The invention described in claim 26 is an information storage disk holding member as defined in claim 19 wherein the glass-ceramics comprise an element selected from P, W, Nb, La, Y and Pb in an amount of up to 3 mass % on oxide basis and/or an element selected from Cu, Co, Fe, Mn, Cr, Sn and V in an amount of up to 2 mass % on oxide basis.

The invention described in claim 27 is an information storage disk holding member as defined in claim 19 wherein coefficient of thermal expansion within a range from −b 50° C. to +70° C. is within a range from +40×10$^{-7}$/° C. to +60×10$^{-7}$/° C.

The invention described in claim 28 is an information storage disk holding member as defined in claim 19 wherein a crystal grain diameter of the respective crystal phases is within a range from 0.05 μm 0.30 μm.

The invention described in claim 29 is an information storage disk holding member as defined in any of claims 19–28 wherein Vickers' hardness is within a range from 700 to 850.

As the fifth aspect of the invention, the invention described in claim 30 is an information storage disk holding member as defined in claim 1 wherein a predominant crystal phase or phases of the glass-ceramics are at least one crystal phase selected from the group consisting of β-quartz, β-quartz solid solution, enstatite, enstatite solid solution, forsterite and forsterite solid solution.

The invention described in claim 31 is an information storage disk holding member as defined in claim 30 wherein the glass-ceramics comprise Al$_2$O$_3$ in an amount within a range from 10 mass % to less than 20 mass % on oxide basis and have Young's modulus (GPa)/specific gravity within a range from 37 to 63.

The invention described in claim 32 is an information storage disk holding member as defined in claim 30 wherein the glass-ceramics comprise, in mass % on oxide basis,

| | |
|---|---|
| SiO$_2$ | 40–60% |
| MgO | 10–20% |
| Al$_2$O$_3$ | 10–less than 20% |
| P$_2$O$_5$ | 0.5–2.5% |
| B$_2$O$_3$ | 1–4% |
| Li$_2$O | 0.5–4% |
| CaO | 0.5–4% |
| ZrO$_2$ | 0.5–5% |
| TiO$_2$ | 2.5–8% |
| Sb$_2$O$_3$ | 0.01–0.5% |
| As$_2$O$_3$ | 0–0.5% |
| SnO$_2$ | 0–5% |
| MoO$_3$ | 0–3% |
| CeO | 0–5% |
| Fe$_2$O$_3$ | 0–5%. |

The invention described in claim 33 is an information storage disk holding member as defined in claim 30 wherein the glass-ceramics are substantially free of Na$_2$O, K$_2$O and PbO.

The invention described in claim 34 is an information storage disk holding member as defined in any of claims 30–33 wherein a crystal grain diameter of the respective crystal phases is within a range from 0.05 μm to 0.30 μm.

As the sixth aspect of the invention, the invention described in claim 35 is an information storage disk holding member as defined in claim 1 wherein the glass-ceramics comprise, as a predominant crystal phase or phases, at least one crystal phase selected from the group consisting of cordierite, cordierite solid solution, spinel, spinel solid solution, enstatite, enstatite solid solution, β-quartz and β-quartz solid solution.

The invention described in claim 36 is an information storage disk holding member as defined in claim 1 wherein the glass-ceramics comprise, as a predominant crystal phase or phases, at least one crystal phase selected from the group consisting of β-quartz, β-quartz solid solution, enstatite, enstatite solid solution, forsterite and forsterite solid solution.

The invention described in claim 37 is an information storage disk holding member as defined in claim 35 wherein a crystal grain diameter of the respective crystal phases is within a range from 0.05 μm to 0.30 μm.

The invention described in claim 38 is an information storage disk holding member as defined in claim 35 wherein the glass-ceramics comprise, in mass % on oxide basis,

| | |
|---|---|
| SiO$_2$ | 40–60% |
| MgO | 10–20% |
| Al$_2$O$_3$ | 10–less than 20% |
| P$_2$O$_5$ | 0–4% |
| B$_2$O$_3$ | 0–4% |
| CaO | 0.5–4% |
| BaO | 0–5% |
| ZrO$_2$ | 0–5% |
| TiO$_2$ | 2.5–8% |
| Sb$_2$O$_3$ | 0–1% |
| As$_2$O$_3$ | 0–1% |
| F | 0–3% |
| Fe$_2$O$_3$ | 0–5%. |

The invention described in claim 39 is an information storage disk holding member as defined in claim 35 wherein the glass-ceramics have Young's modulus (GPa)/specific gravity within a range from 37 to 63 and comprise Al$_2$O$_3$ within a range from 10% to less than 20%.

The invention described in claim 40 is an information storage disk holding member as defined in claim 35 wherein the glass-ceramics are substantially free of Na$_2$O, K$_2$O and PbO.

The invention described in claim 41 is an information storage disk holding member as defined in any of claims 35–40 wherein coefficient of thermal expansion within a range from −50° C. to +70° C. is within a range from +30×10$^{-7}$/° C. to +50×10$^{-7}$/° C.

As the seventh aspect of the invention, the invention described in claim 42 is an information storage disk holding member as defined in claim 1 wherein the glass-ceramics comprise, as a predominant crystal phase or phases, at least one crystal phase selected from the group consisting of β-quartz (β-SiO$_2$), β-quartz solid solution (β-SiO$_2$ solid solution), β-spodumene (β-Li$_2$O.Al$_2$O$_3$.SiO$_2$), β-spodumene solid solution (β-Li$_2$O.Al$_2$O$_3$.SiO$_2$ solid solution), β-eucryptite (β-Li$_2$O.Al$_2$O$_3$.2SiO$_2$ where a part of Li$_2$O is replaceable by MgO and/or ZnO) and β-eucryptite solid solution (β-Li$_2$O.Al$_2$O$_3$.2SiO$_2$ solid solution where a part of Li$_2$O is replaceable by MgO and/or ZnO).

The invention described in claim 43 is an information storage disk holding member as defined in claim 42 wherein an average crystal grain diameter of the glass-ceramics is within a range from 0.001 μm to 0.10 μm.

The invention described in claim 44 is an information storage disk holding member as defined in claim 42 wherein the glass-ceramics comprise, in mass % on oxide basis,

| | |
|---|---|
| SiO$_2$ | 50–62% |
| P$_2$O$_5$ | 5–10% |
| Al$_2$O$_3$ | 22–26% |
| Li$_2$O + MgO + ZnO | 4–6.5% |
| in which Li$_2$O | 3–5% |
| MgO | 0.5–2% |
| ZnO | 0.2–2% |
| CaO + BaO | 0.8–5% |
| in which CaO | 0.3–4% |
| BaO | 0.5–4% |
| TiO$_2$ | 1–4% |
| ZrO$_2$ | 1–4% |
| As$_2$O$_3$ + Sb$_2$O$_3$ | 0–4% | and are substantially free of PbO, Na$_2$O and K$_2$O.

The invention described in claim 45 is an information storage disk holding member as defined in any of claims 42–44 wherein coefficient of thermal expansion within a range from −50° C. to +600° C. is within a range from −10×10$^{-7}$/° C. to +20×10$^{-7}$/° C.

As the eighth aspect of the invention, the invention described in claim 46 is an information storage disk holding member as defined in claim 1 wherein a predominant crystal phase of the glass-ceramics is gahnite (ZnAl$_2$O$_4$) and/or gahnite solid solution (ZnAl$_2$O$_4$ solid solution).

The invention described in claim 47 is an information storage disk holding member as defined in claim 46 wherein the glass-ceramics are substantially free of PbO, Na$_2$O and K$_2$O.

The invention described in claim 48 is an information storage disk holding member as defined in claim 46 wherein the glass-ceramics comprise, in mass % on oxide basis,

| | |
|---|---|
| SiO$_2$ | 30–65% |
| Al$_2$O$_3$ | 5–35% |
| ZnO | 5–35% |
| MgO | 1–20% |
| TiO$_2$ | 1–15% |
| CaO + SrO + BaO + B$_2$O$_3$ + La$_2$O$_3$ + Y$_2$O$_3$ + Gd$_2$O$_3$ + Ta$_2$O$_5$ + Nb$_2$O$_5$ + WO$_3$ + Bi$_2$O$_3$ | 0.5–20% |
| in which B$_2$O$_3$ | 0–10% |
| and Ta$_2$O$_5$ + Nb$_2$O$_5$ + WO$_3$ + Bi$_2$O$_3$ | 0–10% |
| ZrO$_2$ + P$_2$O$_5$ + SnO$_2$ | 0–7% |
| in which ZrO$_2$ | 0–less than 2% |
| P$_2$O$_5$ | 0–5% |
| SnO$_2$ | 0–2% |
| As$_2$O$_3$ + Sb$_2$O$_3$ | 0–4%. |

The invention described in claim 49 is an information storage disk holding member as defined in any of claims 46–48 wherein coefficient of thermal expansion within a range from −50° C. to +600° C. is within a range from −35×10$^{-7}$/° C. to +65×10$^{-7}$/° C.

As the ninth aspect of the invention, the invention described in claim 50 is an information storage disk holding member as defined in claim 1 wherein the glass-ceramics comprise, as a predominant crystal phase or phases, at least one crystal phase selected from the group consisting of α-cristobalite, α-cristobalite solid solution, α-quartz and α-quartz solid solution but are substantially free of lithium disilicate (Li$_2$O.2SiO$_2$), lithium silicate (Li$_2$O.SiO$_2$), β-spodumene, β-eucryptite, β-quartz, mica and fluorrichterite and also are free of Cr and Mn, have a coefficient of thermal expansion within a range from −50° C. to +70° C. which is within a range from +65×10$^{-7}$/° C. to +140×10$^{-7}$/° C. and have an average crystal grain diameter of the predominant crystal phase of less than 0.10 μm.

The invention described in claim 51 is an information storage disk holding member as defined in claim 50 wherein the glass-ceramics have Young's modulus which is not smaller than 80 GPa.

The invention described in claim 52 is an information storage disk holding member as defined in claim 50 wherein the glass-ceramics have specific gravity within a range from 2.3 to 2.7.

The invention described in claim 53 is an information storage disk holding member as defined in claim 50 wherein the glass-ceramics have light transmittance for a plate thickness of 10 mm which is 90% or over within a wavelength range from 950 nm to 1600 nm.

The invention described in claim 54 is an information storage disk holding member as defined in claim 50 wherein the glass-ceramics have bending strength of 250 MPa or over.

The invention described in claim 55 is an information storage disk holding member as defined in claim 50 wherein the glass-ceramics have Vickers' hardness within a range from 600 to 800.

The invention described in claim 56 is an information storage disk holding member as defined in any of claims 50–55 wherein the glass-ceramics comprise, in mass % on oxide basis,

| | |
|---|---|
| SiO$_2$ | 65–75% |
| Li$_2$O | 4–less than 7% |
| K$_2$O | 0–3% |
| Na$_2$O | 0–3% |
| MgO + ZnO + SrO + BaO + CaO | 2–15% |
| Y$_2$O$_3$ + WO$_3$ + La$_2$O$_3$ + Bi$_2$O$_3$ | 0–3% |
| SnO$_2$ | 0–3% |
| P$_2$O$_5$ | 1.0–2.5% |
| ZrO$_2$ | 2.0–7% |
| Al$_2$O$_3$ | 5–9% |
| Sb$_2$O$_3$ + As$_2$O$_3$ | 0–1%. |

As other aspect of the invention, the invention described in claim 57 is an information storage disk holding member as defined in any of claims 1, 10 and 16 wherein the glass-ceramics are obtained by subjecting base glass obtained by melting and forming glass raw materials to heat treatment for nucleation under a temperature within a range from 400° C. to 600° C. for one to seven hours and further subjecting the base glass to heat treatment for crystallization under a temperature within a range from 700° C. to 780° C. for one to seven hours.

The invention described in claim 58 is an information storage disk holding member as defined in any of claims 19, 30, 35, 36, 42 and 46 wherein the glass-ceramics are obtained by subjecting base glass obtained by melting and forming glass raw materials to heat treatment for nucleation under a temperature within a range from 650° C. to 750° C. for one to seven hours and further subjecting the base glass to heat treatment for crystallization under a temperature within a range from 750° C. to 950° C. for one to seven hours.

The invention described in claim 59 is an information storage disk holding member as defined in claim 50 wherein the glass-ceramics are obtained by subjecting base glass obtained by melting and forming glass raw materials to heat treatment for nucleation under a temperature within a range from 400° C. to 600° C. for one to seven hours and further subjecting the base glass to heat treatment for crystallization under a temperature within a range from 650□ to 750□ for one to seven hours.

The invention described in claim 60 is an information storage disk holding member made by forming a conductive film on the surface of the holding member as defined in any of claims 1, 10, 16, 19, 30, 35, 36, 42, 46 and 50.

The invention described in claim 61 is a spacer ring for an information storage disk made of the holding member as defined in any of claims 1, 10, 16, 19, 30, 35, 36, 42, 46 and 50, said holding member having a ring shape.

The invention described in claim 62 is an information storage disk drive device capable of holding one or more information storage disks on a rotor hub by means of the spacer ring as defined in claim 61.

The invention described in claim 63 is an information storage disk drive device as defined in claim 62 wherein the rotor hub and the spacer ring have a coefficient of thermal expansion which is substantially equal to that of the information storage disk.

DETAILED DESCRIPTION OF THE INVENTION

Figure 1:
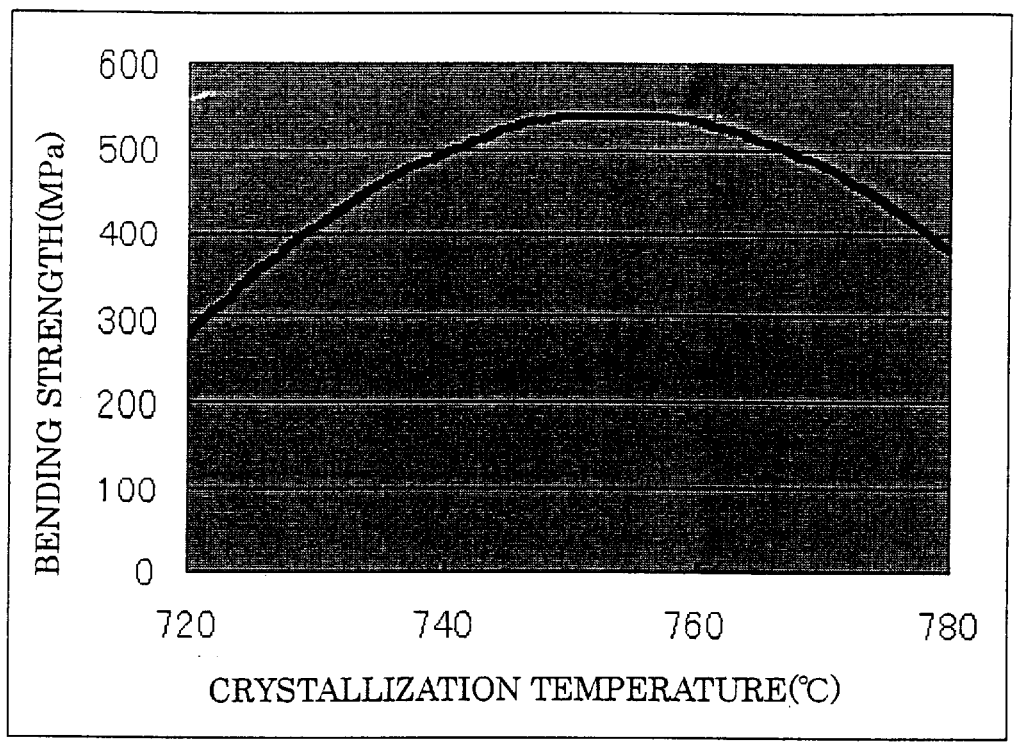
FIG. 1 is a graph showing relationship between crystallization temperature and bending strength of Examples 1-1 to 1-3 and glass-ceramics of the same compositions.

The information storage disk holding member according to the invention is made of glass-ceramics in which a crystal phase is dispersed in a glass matrix. By employing glass-ceramics as a material for the information storage disk holding member, high rigidity is achieved notwithstanding that specific gravity is relatively small and high specific rigidity thereby is achieved. By adopting the structure in which a crystal phase is dispersed in glass matrix, the glass-ceramics have a very low dust generating capability. More specifically, the problem of chipping which occurs in processing of the prior art amorphous glass material or polycrystalline ceramic material and the problem of difference in thermal expansion relative to other drive components can be eliminated. Further, the chemical strengthening treatment which is required for the amorphous glass material becomes unnecessary and, accordingly, advantages are brought about in productivity and cost. The problems of production of particles due to falling of crystal grains and generation of gas during mounting of a spacer ring which occurs in the polycrystalline ceramic material are also eliminated.

As to the grain shape of the predominant crystal phase of the glass-ceramics of the present invention, if the grain shape is indefinite, excellent smoothness cannot be obtained and, further, falling of precipitated crystals tend to take place whereby particles of crystals cause damage to a magnetic head or a medium, the grain shape should preferably be as near to a sphere as possible and most preferably be substantially spherical from the standpoint of surface characteristics of the information storage medium surface.

Description will be made about a coefficient of thermal expansion of the information storage disk holding members of the present invention and the spacer ring. As the recording density of the information-recording device increases, high accuracy is required for positioning of a magnetic head and a medium and, accordingly, high accuracy is required in the size of each component part of the information storage disk drive device. For this reason, influence of difference in the coefficient of thermal expansion relative to each component part cannot be ignored. It is therefore desirable to minimize difference in the coefficient of thermal expansion relative to these component parts to the maximum extent. More specifically, it is desirable for holding members such as a rotor hub and a spacer ring to have a coefficient of thermal expansion which is substantially equal to that of the information storage disk. Strictly speaking, there is a case where it is desirable that a coefficient of thermal expansion of these holding members should be only slightly smaller than that of the information storage disk. Particularly, as the coefficient of thermal expansion of the component parts of the information storage disk drive device, a coefficient of about $+90+10^{-7}/°$ C. to $+110 \times 10^{-7}/°$ C. is most frequently used. Accordingly, for coping broadly with material of a component part employed, the coefficient of thermal expansion of the information storage disk holding members of the invention, particularly that of the spacer ring, should preferably be within a range from $+65 \times 10^{-7}/°$ C. to $+130 \times 10^{-7}/°$ C. within temperature range from $-50°$ C. to $+70°$ C. in which the they are used.

In the third aspect of the invention, for coping broadly with material of a component part employed while considering balance with strength of the crystal phase of the present invention, the coefficient of thermal expansion of the glass-ceramics should preferably be within a range from $+65 \times 10^{-7}/°$ C. to $+110 \times 10^{-7}/°$ C. within temperature range from $-50°$ C. to $+70°$ C. The coefficient should more preferably be not smaller than $+95 \times 10^{-7}/°$ C. and not greater than $+110 \times 10^{-7}/°$ C.

In a case where an information storage disk substrate having a relatively smaller coefficient of thermal expansion than the ones described above, for example, in a case where a disk substrate made of a glass-ceramic having a coefficient of thermal expansion within a range from $+30 \times 10^{-7}/°$ C. to $+60 \times 10^{-7}/°$ C. within a range from $-50°$ C. to $+70°$ C. is used, the coefficient of thermal expansion of the information storage disk holding members of the present invention should preferably be within a range from $+30 \times 10^{-7}/°$ C. to +less than $65 \times 10^{-7}/°$ C. within a range from $-50°$ C. to $+70°$ C. Particularly in the fourth aspect of the invention, it should more preferably be within a range from $+40 \times 10^{-7}/°$ C. to $+60 \times 10^{-7}/°$ C. and in the fifth and sixth aspects of the invention, it should more preferably be within a range from $+30 \times 10^{-7}/°$ C. to $+50 \times 10^{-7}/°$ C.

In the seventh and eighth aspects of the invention, the coefficient of thermal expansion of the information storage disk holding members can be set within a range from $-10 \times 10^{-7}/°$ C. to $+80 \times 10^{-7}/°$ C. within a range from $-50°$ C. to $+70°$ C. Particularly in the seventh aspect of the invention, it should preferably be within a range from $-10 \times 10^{-7}/°$ C. to $+20 \times 10^{-7}/°$ C. and, more preferably, be within a range from $-10 \times 10^{-7}/°$ C. to $+10 \times 10^{-7}/°$ C. from the standpoint of harmonization with other physical properties. In the eighth aspect of the invention, it should preferably be within a range from $+30 \times 10^{-7}/°$ C. to $+80 \times 10^{-7}/°$ C. and, more preferably, be within a range from $+35 \times 10^{-7}/°$ C. to $+65 \times 10^{-7}/°$ C.

In the ninth aspect of the invention, for coping broadly with material of a component part used, the coefficient of thermal expansion of the information storage disk holding members should preferably be within a range from $+60 \times 10^{-7}/°$ C. to $+135 \times 10^{-7}/°$ C. within a range from $-50°$ C. to +70° C. The average linear coefficient of thermal expansion should preferably be not smaller than +70×10$^{-7}$/° C. and, more preferably be not greater than +120×10$^{-7}$/° C.

Description will now be made about Young's modulus, specific gravity and mechanical strength of the information storage disk holding members, particularly those of the spacer ring.

As to Young's modulus and specific gravity, high rigidity and low specific gravity are preferable for coping with increase in the speed of transmitting information, i.e., high speed rotation of 10000 rpm or over. That is, it is necessary to balance high rigidity and low specific gravity which are characteristics contradicting to each other in appearance. A large specific gravity tends to cause vibration during high speed rotation even if Young's modulus is high. Specific rigidity (Young's modulus/specific gravity) of the information storage disk holding members of the invention, therefore, should preferably be not smaller than 37 GPa, more preferably not smaller than 38 GPa and most preferably not smaller than 39 GPa. From the standpoint of processability in polishing, the specific rigidity should preferably be not greater than 63 GPa, more preferably be not greater than 57 GPa and most preferably be not greater than 54 GPa. In the fifth and sixth aspects of the invention, a preferable range of the specific rigidity (Young's modulus/specific gravity) of the information storage disk holding members is 40–63 GPa, a more preferable range thereof is 47–63 GPa and the most preferable range thereof is 50–63 GPa. In the ninth aspect of the invention, the specific rigidity (Young's modulus/specific gravity) of the information storage disk holding members should preferably be 30–65 GPa, and more preferably be 33–60 GPa.

For the same reason, Young's modulus of the information storage disk holding members of the invention, particularly that of the spacer ring, should preferably be not smaller than 80 GPa, more preferably be not smaller than 85 GPa and most preferably be not smaller than 95 GPa and the specific gravity should preferably be not greater than 2.50. From the standpoint of adaptability with other component parts, Young's modulus of the information storage disk holding members of the invention should preferably be within a range of 95–130 GPa and, more preferably, be within a range of 95–110 GPa. Particularly, in the fourth, fifth and sixth aspects of the invention, Young's modulus may be a value not smaller than 115 GPa and not greater than 150 GPa.

In the fourth aspect of the invention, the specific gravity of the information storage disk holding members should preferably be not greater than 3.0 and, more preferably be within a range of 2.4–2.60 and, more preferably be within a range of 2.40–2.50. In the fifth and sixth aspects of the invention, a preferable range of the specific gravity of the information storage disk holding members is 2.5–3.3. For having sufficient shock proof property in uses such as for mobiles, bending strength of the information storage disk holding members of the invention should preferably be not smaller than 250 MPa, more preferably be not smaller than 400 MPa and most preferably be not smaller than 500 MPa. From the standpoint of designing composition of glass-ceramics, the bending strength should preferably be not greater than 800 MPa.

As a high Young's modulus of a material is adopted, surface hardness of the material generally tends to increase. The surface hardness of the substrate (Vickers' hardness) should preferably be not smaller than 600 (5880 N/mm$^2$), more preferably be not smaller than 650 (6370 N/mm$^2$) and, most preferably, be not smaller than 700 (6860 N/mm$^2$). On the other hand, if it is too hard, processing time in polishing becomes excessively long with resulting deterioration in productivity and cost. Considering productivity caused by processability, the surface hardness of the substrate (Vickers' hardness) should preferably be not greater than 850 (8330 N/mm$^2$), more preferably be not greater than 800 (7840 N/mm$^2$) and, most preferably, be not greater than 760 (7448 N/mm$^2$).

For making it possible to hold the information storage disk in a predetermined position when the disk is rotating at a high speed, flatness of the surface of the information storage disk holding members which is in contact with the information storage disk should preferably be not greater than 5 μm, more preferably be not greater than 3 μm and, most preferably, be not greater than 1 μm. Mean surface roughness at the center line (Ra) should preferably be within a range of 0.1–2.0 μm.

It is difficult to realize polishing processability and particularly excellent mechanical strength, particularly bending strength unless crystal grain diameter is controlled. The crystal grain diameter should preferably be within a range of 0.001–0.10 μm, more preferably be within a range of 0.001–0.07 μm and, most preferably, be within a range of 0.001–0.05 μm.

Description will now be made about preferable crystal phases and compositions of glass-ceramics which constitute the holding members of the invention.

In the present specification, amount of crystal means ratio (mass %) of a specific crystal phase to the entire mass of a glass-ceramic. Degree of crystallization means ratio (mass %) of entire crystal phase or phases to the entire mass of a glass-ceramic. Compositions are expressed on oxide basis. In the present specification, a predominant crystal phase means all crystal phase or phases each of which has a relatively large precipitation ratio. More specifically, when the main peak (the highest peak) of a crystal phase which has the largest ratio of precipitation in an X-ray chart of X-ray diffraction (the vertical axis represents X-ray diffraction intensity and the horizontal axis represents diffraction angle) is taken as 100, any crystal phase whose ratio of X-ray diffraction intensity (hereinafter referred to as "X-ray intensity ratio) of the main peak (the highest peak in this crystal phase) is 30 or more is referred to as "predominant crystal phase".

Preferable crystal phases and compositions of the glass-ceramics constituting the holding members of the first aspect of the invention will be described below.

In the first aspect of the invention, the glass-ceramics constituting the holding members of the invention should preferably comprise, as a predominant crystal phase or phases, at least one crystal phase selected from the group consisting of lithium disilicate ($Li_2O.2SiO_2$), α-quartz (α-$SiO_2$), α-quartz solid solution (α-$SiO_2$ solid solution), α-cristobalite (α-$SiO_2$) and α-cristobalite solid solution (α-$SiO_2$ solid solution). The predominant crystal phase is an important factor determining the coefficient of thermal expansion and mechanical strength and, for realizing the properties required for the above described holding members, particularly the spacer ring, these predominant crystal phases are suitable.

In the first aspect of the invention, the glass-ceramics should preferably comprise, as a predominant crystal phase, lithium disilicate and an amount of crystal of lithium disilicate in the glass-ceramics should preferably be 3–10 mass % and an average crystal grain diameter of the crystal phase should preferably be within a range from 0.01 μm–0.05 μm.

In the first aspect of the invention, the glass-ceramics should preferably comprise, as a predominant crystal phase, α-quartz or α-quartz solid solution and an amount of crystal phase of α-quartz and α-quartz solid solution in the glass-ceramics should preferably be 5–25 mass % and an average crystal grain diameter thereof should preferably be 0.01 μm–0.10 μm.

In the first aspect of the invention, the glass-ceramics should preferably comprise, as a predominant crystal phase, α-cristobalite or α-cristobalite solid solution and an amount of crystal phase of α-cristobalite and α-cristobalite solid solution in the glass-ceramics should preferably be 2–10 mass % and an average crystal grain diameter thereof should preferably be 0.01 μm–0.10 μm.

Reasons for defining the composition range of the base glass as described above will now be described.

The $SiO_2$ ingredient is a very important ingredient which, by heat treatment of the base glass, produces lithium disilicate ($Li_2O.2SiO_2$), α-quartz (α-$SiO_2$), α-quartz solid solution (α-$SiO_2$ solid solution), α-cristobalite (α-$SiO_2$) or α-cristobalite solid solution (α-$SiO_2$ solid solution) as a predominant crystal phase. For maintaining stability of precipitating crystals of the glass-ceramics obtained and preventing their texture from becoming coarse, an amount of this ingredient should preferably be not smaller than 70% and, for maintaining excellent melting property and formability of the base glass, the amount of this ingredient should preferably be not greater than 79% and, more preferably be not greater than 77%.

The $Li_2O$ ingredient is a very important ingredient which produces lithium disilicate ($Li_2O.2SiO_2$). If the amount of this ingredient is less than 8%, difficulty arises in precipitation of this crystal and also in melting of the base glass. The amount of this ingredient, therefore, should preferably be not smaller than 8%. If the amount of this ingredient exceeds 12%, stability of the obtained crystal is deteriorated and its texture becomes coarse and, moreover, chemical durability also is deteriorated. The amount of this ingredient, therefore, should preferably be not greater than 12%.

The $K_2O$ ingredient improves the melting property of the glass and prevents the precipitating crystal from becoming coarse. If the amount of this ingredient exceeds 4%, the precipitating crystal sometimes becomes coarse, the crystal phase changes and chemical durability is deteriorated and, therefore, the amount of this ingredient should preferably be not greater than 4% and, more preferably, should be within a range of 1–3%.

The MgO and ZnO ingredients improve the melting property of the glass and prevent the precipitating crystal from becoming coarse and, further, are effective for causing the crystal grains of lithium disilicate ($Li_2O.2SiO_2$), α-quartz (α-$SiO_2$), α-quartz solid solution (α-$SiO_2$ solid solution), α-cristobalite (α-$SiO_2$) or α-cristobalite solid solution (α-$SiO_2$ solid solution) to precipitate in spherical shape. The MgO ingredient up to 2% and the ZnO ingredient up to 2% will suffice.

In the present invention, the $P_2O_5$ ingredient is indispensable as a nucleating agent and, for enhancing forming of crystal nucleuses and preventing a predominant crystal phase from becoming coarse, the amount of this ingredient should preferably be not smaller than 1.5%. For preventing the base glass from becoming opaque and maintaining stability in a large scale production, the amount of this ingredient should preferably be not greater than 3%.

The $ZrO_2$ ingredient is a very important ingredient which, like the $P_2O_5$ ingredient, functions as a nucleating agent and, moreover, has been found to have a remarkable effect for making precipitating crystals fine and improve mechanical strength and chemical durability of the material. For obtaining such effect, the amount of the $ZrO_2$ ingredient should preferably be not smaller than 1.5% and, more preferably, be not smaller than 2%. If the amount of this ingredient exceeds 9%, melting of the base glass becomes difficult and substance such as $ZrSiO_4$ which is left unmelted is produced and, therefore, the amount of this ingredient should preferably be not greater than 9% and, more preferably, be not greater than 7%.

The $Al_2O_3$ ingredient improves chemical durability and hardness of the glass-ceramics and the amount of this ingredient should preferably be not smaller than 3%. If the amount of this ingredient exceeds 9%, the melting property and resistance to devitrification deteriorate and the predominant crystal phase change to β-spodumene ($Li_2O.Al_2O_3.4SiO_2$) which is a low expansion crystal and, therefore, the amount of this ingredient should preferably be not greater than 9%. In the compositions of the present invention, precipitation of β-spodumene ($Li_2O.Al_2O_3.4SiO_2$) and β-cristobalite (β-$SiO_2$) deteriorates the coefficient of thermal expansion of the material significantly and, therefore, precipitation of these crystals should preferably be avoided.

The $Sb_2O_3$ and/or $As_2O_3$ ingredients may be added as a refining agent in melting glass and it will suffice if 2% or below of these ingredients is added.

Description will now be made about preferable crystal phases and compositions of the glass-ceramics which constitute the holding members of the second aspect of the invention.

In the second aspect of the invention, the glass-ceramics which constitute the information storage disk holding members should preferably contain lithium disilicate ($Li_2O.2SiO_2$) as a predominant crystal phase and the amount of $Li_2O$ should preferably be within a range from 5% to less than 9% on oxide basis. In the second aspect of the invention, the amount of the crystal phase of lithium disilicate should preferably be within a range of 15–40%.

In the second aspect of the invention, the glass-ceramics should preferably contain (1) lithium disilicate ($Li_2O\square 2SiO_2$) and (2) α-quartz (α-$SiO_2$) or α-quartz solid solution (α-$SiO_2$ solid solution) as predominant crystal phases and the average crystal grain diameter of the crystal phases as a whole should preferably be not greater than 0.05 μm.

In the second aspect of the invention, the glass-ceramics should preferably contain (1) lithium disilicate ($Li_2O.2SiO_2$) and (2) α-quartz (α-$SiO_2$) or α-quartz solid solution (α-$SiO_2$ solid solution) as predominant crystal phases and the amount of crystal phases of α-quartz (α-$SiO_2$) or α-quartz solid solution (α-$SiO_2$ solid solution) should preferably be within a range of 3–35% and the average crystal grain diameter should preferably be not greater than 0.10 μm.

The crystal grains of the glass-ceramics which constitute the information storage disk holding members of the invention should preferably be fine and substantially spherical.

In the second aspect of the invention, the glass-ceramics should preferably comprise, in mass % on oxide basis,

| | |
|---|---|
| $SiO_2$ | 70–77% |
| $Li_2O$ | 5–less than 9% |
| $K_2O$ | 2–5% |
| MgO + ZnO + SrO + BaO | 1–2% |
| $Y_2O_3 + WO_3 + La_2O_3 + Bi_2O_3$ | 1–3% |

-continued

| | |
|---|---|
| $P_2O_5$ | 1.0–2.5% |
| $ZrO_2$ | 2.0–7% |
| $Al_2O_3$ | 5–10% |
| $Na_2O$ | 0–1% |
| $Sb_2O_3 + As_2O_3$ | 0–2%. |

The base glass comprising the above described composition is heat treated at 400° C.–600° C. for 1 to 7 hours for nucleation and is further treated at 700° C.–760° C. for 1 to 7 hours for crystallization thereby to produce the glass-ceramics of the second aspect of the invention.

Description will be made about Young's modulus, specific gravity and mechanical strength of the glass-ceramics of the second aspect.

As to Young's modulus and specific gravity, for coping with high speed rotation of an information storage disk in correspondence to high speed transmission of information, the glass-ceramics should preferably have high rigidity and low specific gravity. Even if they have high rigidity, if they have low specific gravity, deflection takes place during high speed rotation due to their large weight which causes vibration. Conversely, vibration takes place similarly if they have low rigidity even when they have low specific gravity. Therefore, it is necessary to balance high rigidity and low specific gravity which are characteristics contradicting to each other in appearance. A preferable range of Young's modulus (GPa)/specific gravity is 37 or over. A more preferable range thereof is 39 or over, an even more preferable range thereof is 41 and the most preferable range thereof is 43 or over. There is also a preferable range of rigidity. Even when the glass-ceramics have low specific gravity and the above described range is satisfied, Young's modulus of the substrate should preferably be not smaller than 95 GPa from the standpoint of generation of vibration. In the examples of the second aspect, the glass-ceramics have Young's modulus within a range of 95 GPa–120 GPa. Similarly as to specific gravity, even when the glass-ceramics have high rigidity, the specific gravity should preferably be not greater than 2.60 and, more preferably, not greater than 2.57 from the standpoint of generation of vibration. In the examples of the second aspect of the invention, the glass-ceramics have specific gravity within a range of 2.40–2.60.

Reasons for limiting the predominant crystal phases and compositions of the glass-ceramics of the second aspect of the invention will be described below.

As to the predominant crystal phase of the glass-ceramics of the second aspect of the invention, since an information storage disk holding member comprising lithium disilicate has no crystal anisotropy, has little impurities and has a dense, uniform and fine texture, it can realize high mechanical strength, processability, and capability of controlling the coefficient of thermal expansion and high chemical durability and therefore is very useful. By containing further α-quartz or α-quartz solid solution as a the predominant crystal phase, bending strength can be further increased and, simultaneously, the coefficient of thermal expansion in −50° C.–+70° C. can be set at a higher level and, hence, the information storage disk holding members containing (1) lithium disilicate and (2) α-quartz or α-quartz solid solution are preferable because they have excellent mechanical strength, capability of controlling the coefficient of thermal expansion and chemical durability.

As to the amount of $Li_2O$, this ingredient is a very important ingredient which facilitates manufacture and melting of the base glass and causes lithium disilicate to precipitate. Conventionally, since the $Li_2O$ ingredient has been added in an amount which is larger than stoichiometrically necessary for constituting lithium disilicate, an superfluous amount of $Li_2O$ which does not contribute to production of this crystal phase exists in the glass phase. This becomes a dissolving alkali ingredient which causes the previously described problem.

More specifically, from the standpoint of the dissolving alkali amount, glass-ceramics have less dissolving alkali amount than amorphous glass as described previously but it is desirable to further decrease the amount of dissolving alkali amount in view of the high recording density tendency. Since dissolving of alkali ingredient in glass-ceramics is mainly caused by dissolving from the amorphous portion of the matrix, it is desirable to decrease alkali ingredient other than that in the crystal to the maximum extent possible. As a result of detailed study and experiments, it has become apparent that, if the amount of dissolving out alkali from the surface of a substrate in an alkali dissolving test is 1.0 μg/disk or over in a 2.5 inch disk substrate (having the size of outer diameter of 65 mm, inner diameter of 20 mm and thickness of 0.635 mm and being chamfered by 0.1 mm at chamfering angle of 45°), i.e., the amount of dissolving out alkali per unit area is 0.016 μg/mm$^2$ or over, magnetic characteristics are reduced due to dispersion of alkali during the film forming process and alkali compounds are generated by alkali ingredient which has dispersed up to the surface of the recording medium whereby reading error and head crash take place in a magnetic disk for which, for example, high speed rotation of 10000 rpm or over is required. The amount of dissolving out alkali should more preferably be not greater than 0.011 μg/cm$^2$ (not greater than 0.7 μg/disk in a 2.5 inch disk substrate) and, most preferably, be not greater than 0.008 μg/mm$^2$ (not greater than 0.5 μg/disk in a 2.5 inch disk).

Accordingly, for containing $Li_2O$ in an amount necessary for constituting lithium disilicate and reducing a superfluous amount of $Li_2O$ which causes dissolving of alkali to the maximum extent possible, it is desirable to control the amount of $Li_2O$ in a lower amount than the upper limit of the $Li_2O$ amount of the conventional glass-ceramics which contain lithium disilicate as a predominant crystal phase. If the amount of this ingredient is less than 5%, precipitation of this crystal becomes difficult and melting of the base glass becomes also difficult. If the amount of this ingredient is 9% or over, the crystal obtained is not stable, its texture becomes coarse and chemical durability is deteriorated and, moreover, a large amount of superfluous $Li_2O$ ingredient which exceeds the stoichiometric amount which constitutes the crystal is left in the glass matrix resulting in dissolving of Li ion. For obtaining holding members of better glass-ceramics, particularly those having an amount of dissolving out alkali which is not greater than 0.011 μg/cm$^2$, the amount of $Li_2O$ should preferably be within a range of 5%–less than 8% and, most preferably, within a range of 5%–7%.

The above limitation concerning the range of the amount of $Li_2O$ is effective also for other crystal phases which requires $Li_2O$ as an ingredient for constituting a predominant crystal phase (e.g., crystal phases of spodumene, eucryptite and petalite). Since, however, possibility is high that a desired coefficient of thermal expansion cannot be obtained from β-spodumene, β-eucryptite or β-cristobalite (β-$SiO_2$) which has a negative thermal expansion characteristic, it is preferable not to contain such crystal phase having a negative thermal expansion characteristic.

As the amount of crystal of lithium disilicate, for achieving the above described desired mechanical strength, processability, thermal expansion characteristic and chemical durability and also reducing a superfluous amount of $Li_2O$ in the glass matrix in the above described content range of $Li_2O$ for eliminating the problem of dissolving of alkali, a preferable range is 15%–40%, a more preferable range is 20%–40% and the most preferable range is 20%–38%.

As to the crystal of α-quartz or α-quartz solid solution, for achieving a desired value in the control of mechanical strength (particularly bending strength) and thermal expansion characteristic, the amount of crystal should preferably be within a range of 3%–35% and more preferably within a range of 5%–35%.

For realizing polishing capability and particularly excellent mechanical strength, particularly bending strength, it is difficult to realize such properties unless the crystal grain diameter must be controlled. It is desirable to control the average crystal grain diameter of the crystal phase as a whole including lithium disilicate to a value not greater than 0.05 μm. Accordingly, in a case where the predominant crystal phases include (1) lithium disilicate and (2) α-quartz or α-quartz solid solution, it is desirable to control the average crystal grain diameter of the predominant crystal phases as a whole to a value not greater than 0.05 μm. As to (2)α-quartz or α-quartz solid solution, the average crystal grain diameter may be set to a value not greater than 0.10 μm depending upon the shape of the crystal grain and other factors. A preferable range of the average crystal grain diameter of the entire crystal phases is a value not greater than 0.05 μm, that of lithium disilicate crystal is a value not greater than 0.04 μm and that of α-quartz or α-quartz solid solution crystal is a value not greater than 0.07 μm. A more preferable range of the average crystal grain diameter of the entire crystal phases is a value not greater than 0.03 μm, that of lithium disilicate crystal is a value not greater than 0.03 μm and that of α-quartz or α-quartz solid solution crystal is a value not greater than 0.05 μm.

Reasons for defining the composition range of the respective ingredients other than $Li_2O$ in the base glass as described above in the second aspect of the invention will now be described.

The $SiO_2$ ingredient is a very important ingredient which, by heat treatment of the base glass, produces lithium disilicate ($Li_2O.2SiO_2$), α-quartz (α-$SiO_2$) and α-quartz solid solution (α-$SiO_2$ solid solution) as a predominant crystal phase. If the amount of this ingredient is less than 70%, precipitated crystal of the glass-ceramics obtained becomes instable and its texture tends to become coarse. If the amount of this ingredient exceeds 77%, difficulty arises in melting and forming of the base glass.

The $K_2O$ ingredient improves the melting property of the glass and prevents the precipitating crystal from becoming coarse. The amount of this ingredient should preferably be not smaller than 2%. If the amount of this ingredient is excessive, the precipitating crystal becomes coarse, the crystal phase changes and chemical durability is deteriorated and, therefore, the amount of this ingredient should preferably be not greater than 5%. Particularly in the present invention, dispersion of alkali ion can be prevented by mixing $K_2O$ with $Li_2O$.

The MgO, ZnO, SrO and BaO ingredients improve the melting property of the glass and prevent the precipitating crystal from becoming coarse and, further, are effective for causing the crystal grains of lithium disilicate ($Li_2O.2SiO_2$), α-quartz (α-$SiO_2$) and α-quartz solid solution (α-$SiO_2$ solid solution) to precipitate in spherical shape. For these purposes, the total amount of these ingredients should preferably be not smaller than 1.0%. If, however, the total amount of these ingredients exceeds 2%, crystals obtained become instable and their texture tends to become coarse.

In the present invention, the $P_2O_5$ ingredient is indispensable as a nucleating agent and, for enhancing forming of crystal nucleuses and preventing a predominant crystal phase from becoming coarse, the amount of this ingredient should preferably be not smaller than 1.0%. For preventing the base glass from becoming opaque and maintaining stability in a large scale production, the amount of this ingredient should preferably be not greater than 2.5%.

The $ZrO_2$ ingredient is a very important ingredient which, like the $P_2O_5$ ingredient, functions as a nucleating agent and, moreover, has been found to have a remarkable effect for making precipitating crystals fine and improve mechanical strength and chemical durability of the material. For obtaining such effect, the amount of the $ZrO_2$ ingredient should preferably be not smaller than 2.0%. If an excessive amount of this ingredient is added, melting of the base glass becomes difficult and substance such as $ZrSiO_4$ which is left unmelted is produced and, therefore, the amount of this ingredient should preferably be not greater than 7%.

The $Al_2O_3$ ingredient improves chemical durability and mechanical strength, particularly hardness, of the glass-ceramics and the amount of this ingredient should preferably be not smaller than 5%. If the amount of this ingredient is excessive, the melting property and resistance to devitrification deteriorate and the predominant crystal phase change to β-spodumene ($Li_2O.Al_2O_3.4SiO_2$) which is a low expansion crystal. As described above, precipitation of β-spodumene ($Li_2O.Al_2O_3.4SiO_2$) deteriorates the coefficient of thermal expansion significantly and, therefore, precipitation of this ingredient should be avoided. For this reason, the amount of this ingredient should preferably be not greater than 10%.

The $Y_2O_3$, $WO_3$, $La_2O_3$ and $Bi_2O_3$ ingredients are important ingredients which improve the melting property which is reduced in a composition comprising a low content of $Li_2O$ and also increases Young's modulus of the glass. If the total amount of these ingredients is less than 1%, these effects cannot be achieved whereas if the total amount of these ingredients exceeds 3%, precipitation of a stable crystal becomes difficult. The $Bi_2O_3$ ingredient brings about coloring after crystallization by coexistence with $As_2O_3$ and this is effective for facilitating finding of a scar and scratch and enhancing laser energy absorption efficiency in laser texturing.

The $Na_2O$ ingredient improves, like the $K_2O$ ingredient, the melting property of the glass and prevents the precipitating crystal from becoming coarse and, further, by mixing with the $Li_2O$ ingredient, prevents dispersion of alkali ion. These effects of this ingredient are not so remarkable as the $K_2O$ ingredient and, if the amount of this ingredient exceeds 1%, dissolving of Na ion increases rather than decreases and, therefore, the amount of this ingredient should preferably be not greater than 1%.

The $Sb_2O_3$ and/or $As_2O_3$ ingredients may be added as a refining agent in melting glass and it will suffice if 2% or below, preferably 1% or below, of these ingredients is added.

In addition to the above described composition, one or more elements selected from the group consisting of Cu, Co, Fe, Mn, Cr, Sn and V may be added in an amount up to 2 weight % on oxide basis.

Preferable crystal phases and compositions of the glass-ceramics which constitute the holding members of the third aspect of the invention will now be described.

In the third aspect of the invention, the glass-ceramics which constitute the holding members should preferably comprise, as a predominant crystal phase or phases, at least one crystal phase selected from the group consisting of cordierite ($Mg_2Al_4Si_5O_{18}$), cordierite solid solution ($Mg_2Al_4Si_5O_{18}$ solid solution), spinel, spinel solid solution, enstatite ($MgSiO_3$), enstatite solid solution ($MgSiO_3$ solid solution), β-quartz (β-$SiO_2$), β-quartz solid solution (β-$SiO_2$ solid solution), magnesium titanate ($MgTi_2O_5$) and magnesium titanate solid solution ($MgTi_2O_5$ solid solution). This is because these crystal phases are advantageous in that they have excellent processability, contribute to increase in rigidity, have capability of making the grain diameter of precipitating crystal relatively small and have capability of reducing specific gravity significantly compared with other crystal phases.

Spinel herein means a spinel type crystal including, e.g., (Mg and/or Zn)$Al_2O_4$, and (Mg and/or Zn)$_2TiO_4$ and a solid solution between these crystals. Spinel solid solution herein means a solid solution crystal in which an ingredient or ingredients other than such spinel type crystal partly replaces or enters such spinel type crystal.

Description will be made about the crystal grain size of cordierite ($Mg_2Al_4Si_5O_{18}$), spine, enstatite ($MgSiO_3$), β-quartz (β-$SiO_2$) and magnesium titanate ($MgTi_2O_5$) and solid solutions of these crystals. For obtaining a smooth surface which is suitable for an information storage disk holding member, average crystal grain diameter of these predominant crystal phases should preferably be not greater than 1.0 μm and, more preferably, be not greater than 0.5 μm.

In the information storage disk holding members of the third aspect of the invention, the glass-ceramics should preferably contain the crystal phase of cordierite or enstatite having an average crystal grain diameter within a range of 0.10 μm–1.0 μm. More preferably, the glass-ceramics should contain the crystal phase of cordierite or enstatite having an average crystal grain diameter within a range of 0.30 μm–1.0 μm. The amount of crystal of the cordierite crystal phase should preferably be within a range of 10–70 mass % and, more preferably, within a range of 30–70 mass %. The amount of crystal of the enstatite crystal phase should preferably be within a range of 10–70 mass % and, more preferably, within a range of 30–70 mass %.

Description will be made about a preferable composition range (oxide basis) of the glass-ceramics which constitute the information storage disk holding members of the third aspect of the invention. In this aspect, the glass-ceramics should preferably comprise, in mass %,

| | |
|---|---|
| $SiO_2$ | 40–60% |
| MgO | 10–18% |
| $Al_2O_3$ | 10–less than 20% |
| $P_2O_5$ | 0–4% |
| $B_2O_3$ | 0–4% |
| CaO | 0.5–4% |
| SrO | 0–2% |
| BaO | 0–5% |
| $ZrO_2$ | 0–5% |
| $TiO_2$ | 2.5–12% |
| $Bi_2O_3$ | 0–6% |
| $Sb_2O_3$ | 0–1% |
| $As_2O_3$ | 0–1% |
| $Fe_2O_3$ | 0–2%. |

The $SiO_2$ ingredient is a very important ingredient which, by heat treatment of the base glass, produces cordierite ($Mg_2Al_4Si_5O_{18}$), cordierite solid solution ($Mg_2Al_4Si_5O_{18}$ solid solution), enstatite ($MgSiO_3$), enstatite solid solution ($MgSiO_3$ solid solution), β-quartz (β-$SiO_2$) and β-quartz solid solution (β-$SiO_2$ solid solution) as predominant crystal phases. If the amount of the $SiO_2$ ingredient is less than 40%, the crystal phase of the obtained glass-ceramics is not stable and its texture becomes coarse whereas if the amount of this ingredient exceeds 60%, melting and forming of the base glass become difficult. For precipitation of these crystal phases, conditions of heat treatment are also an important factor and a more preferable range of this ingredient for enabling broader heat treatment conditions is 48.5–58.5%.

The MgO ingredient is a very important ingredient which, by heat treatment of the base glass, produces cordierite ($Mg_2Al_4Si_5O_{18}$), cordierite solid solution ($Mg_2Al_4Si_5O_{18}$ solid solution), spinel, spinel solid solution, enstatite ($MgSiO_3$), enstatite solid solution ($MgSiO_3$ solid solution), β-quartz (β-$SiO_2$) and β-quartz solid solution (β-$SiO_2$ solid solution) as predominant crystal phases. If the amount of this ingredient is less than 10%, the desired crystal cannot be obtained, the crystal phase of the obtained glass-ceramics is not stable and its texture becomes coarse and, moreover, the melting property deteriorates whereas if the amount of this ingredient exceeds 18%, resistance to devitrification deteriorates. For the same reason as in the case of $SiO_2$, a more preferable range of MgO is 13–18%. For the same reason as in the case of MgO, a preferable range of MgO+ZnO is 10–18% and a more preferable range thereof is 13–18%.

The $Al_2O_3$ ingredient is a very important ingredient which, by heat treatment of the base glass, produces cordierite ($Mg_2Al_4Si_5O_{18}$), cordierite solid solution ($Mg_2Al_4Si_5O_{18}$ solid solution), spinel, spinel solid solution and β-quartz solid solution (β-$SiO_2$ solid solution) as predominant crystal phases. If the amount of this ingredient is less than 10%, the desired crystal phase cannot be obtained, the crystal phase of the obtained glass-ceramics is not stable and its texture becomes coarse and, moreover, the melting property deteriorates. If the amount of this ingredient 20% or over, the melting property and resistance to devitrification deteriorate and an amount of precipitation of spinel increases abnormally with the result that hardness increases excessively and processability in polishing of members such as spacer rings deteriorates significantly and, moreover, specific gravity increases to such a degree that the glass-ceramics are not suitable for use in an information storage disk drive device in high speed rotation. Accordingly, a preferable range of $Al_2O_3$ is 10–less than 20%, a more preferable range thereof is 10–18% and the most preferable range thereof is 12–18%.

The $P_2O_5$ ingredient functions as a nucleating agent for the glass and also is effective for improving the melting and forming properties and resistance to devitrification of the base glass. It will suffice if an amount of 4% or less of this ingredient is added and a more preferable range thereof is 1–3%.

The $B_2O_3$ ingredient is effective for controlling viscosity of the base glass during melting and forming thereof. It will suffice if an amount of 4% or less of this ingredient is added.

The CaO ingredient is an ingredient which improves the melting property of the glass and prevents the precipitating crystal from becoming coarse. If the amount of this ingredient is less than 0.5%, these effects cannot be obtained whereas if the amount of this ingredient exceeds 4%, the precipitating crystal becomes coarse, the crystal phase changes and chemical durability deteriorates. A more preferable range thereof is 1–3%.

The SrO ingredient may be added for improving the melting property of the glass. Addition of this ingredient in an amount not greater than 2% will suffice. The BaO ingredient may also be added for improving the melting property of the glass. Addition of this ingredient in an amount not greater than 5% will suffice. A more preferable range thereof is 1–3%.

The $ZrO_2$ and $TiO_2$ ingredients are important ingredients which function as a nucleating agent and, moreover, have been found to have a remarkable effect for making precipitating crystals fine and improve mechanical strength and chemical durability of the material. The $ZrO_2$ ingredient in an amount not greater than 5% will suffice. If the amount of the $TiO_2$ ingredient is less than 2.5%, these effects cannot be obtained whereas if the amount of this ingredient exceeds 12%, melting of the base glass becomes difficult and resistance to devitrification deteriorates. For the same reason as in the case of $SiO_2$, a more preferable range of the total amount of $ZrO_2$ and $TiO_2$ is 2–12%.

The $Bi_2O_2$ ingredient is effective for restraining devitrification without impairing the melting and forming properties of the base glass. Addition of this ingredient in an amount not greater than 6% will suffice.

The $Sb_2O_3$ and $As_2O_3$ ingredients may be used as a refining agent in melting the glass but addition of an amount not greater than 1% of each ingredient will suffice.

The F ingredient may be added for improving the melting property of the glass but addition of an amount not greater than 3% will suffice. The $Fe_2O_3$ ingredient may be added as a coloring agent for the glass or improving sensitivity of detection of a surface defect by utilizing coloring of the glass but addition of an amount not greater than 5% will suffice.

Description will now be made about suitable crystal phases and compositions of the glass-ceramics which constitute the information storage disk holding members of the fourth aspect of the invention.

In the fourth aspect of the invention, the glass-ceramics which constitute the information storage disk holding members comprise, as a predominant crystal phase or phases, at least one crystal phase selected from the group consisting of enstatite ($MgSiO_3$), enstatite solid solution ($MgSiO_3$ solid solution), magnesium titanate ($MgTi_2O_5$) and magnesium titanate solid solution ($MgTi_2O_5$ solid solution). This is because these crystal phases are advantageous in that they contribute to increasing rigidity and making crystal grain diameter of precipitating crystals relatively fine and, further have sufficient processability in polishing.

For obtaining the above described desired physical properties, the glass-ceramics which contain, as a first phase which has the largest precipitation ratio, enstatite ($MgSiO_3$), enstatite solid solution ($MgSiO_3$ solid solution), magnesium titanate ($MgTi_2O_5$) or magnesium titanate solid solution ($MgTi_2O_5$ solid solution) are particularly preferable. As to crystal phases which have a smaller precipitation ratio than the first phase, in case the first phase is enstatite ($MgSiO_3$) or enstatite solid solution ($MgSiO_3$ solid solution), it is preferable for the glass-ceramics to contain at least one crystal phase selected from the group consisting of magnesium titanate ($MgTi_2O_5$), magnesium titanate solid solution ($MgTi_2O_5$ solid solution), spinel and spinel solid solution. In case the first phase is magnesium titanate ($MgTi_2O_5$) or magnesium titanate solid solution ($MgTi_2O_5$ solid solution), it is preferable for the glass-ceramics to contain at least one crystal phase selected from the group consisting of enstatite ($MgSiO_3$), enstatite solid solution ($MgSiO_3$ solid solution), spinel and spinel solid solution.

In the fourth aspect of the invention, it is particularly preferable for the glass-ceramics constituting the information storage disk holding member to have enstatite ($MgSiO_3$) or enstatite solid solution ($MgSiO_3$ solid solution) as a crystal phase having the largest precipitation ratio (first phase).

In the fourth aspect of the invention, it is preferable for the respective predominant crystal phases to have a crystal grain diameter within a range of 0.05 $\mu$m–0.30 $\mu$m.

Reasons for preferable compositions of the glass-ceramics which constitute the information storage disk holding members of the fourth aspect of the invention will be described.

The $SiO_2$ ingredient is a very important ingredient which, by heat treatment of the base glass, produces enstatite ($MgSiO_3$) or enstatite solid solution ($MgSiO_3$ solid solution) as predominant crystal phases. If the amount of the $SiO_2$ ingredient is less than 40%, the crystal phase of the obtained glass-ceramics is not stable and its texture becomes coarse and, moreover, resistance to devitrification deteriorates whereas if the amount of this ingredient exceeds 60%, melting and forming of the base glass become difficult.

The MgO ingredient is a very important ingredient which, by heat treatment of the base glass, produces enstatite ($MgSiO_3$), enstatite solid solution ($MgSiO_3$ solid solution), magnesium titanate ($MgTi_2O_5$), magnesium titanate solid solution ($MgTi_2O_5$ solid solution), spinel and spinel solid solution as predominant crystal phases. If the amount of this ingredient is less than 10%, the desired crystal cannot be obtained and, even if they are obtained, the crystal phase of the obtained glass-ceramics is not stable and its texture becomes coarse and, moreover, the melting property deteriorates whereas if the amount of this ingredient exceeds 20%, resistance to devitrification deteriorates.

The $Al_2O_3$ ingredient is a very important ingredient which, by heat treatment of the base glass, produces enstatite solid solution ($MgSiO_3$ solid solution), magnesium titanate ($MgTi_2O_5$) solid solution, spinel and spinel solid solution as predominant crystal phases. If the amount of this ingredient is less than 10%, the desired crystal phase cannot be obtained and, even if it is obtained, the precipitating crystal phase of the obtained glass-ceramics is not stable and its texture becomes coarse and, moreover, the melting property deteriorates. If the amount of this ingredient is 20% or over, the melting property and resistance to devitrification of the base glass deteriorate and, moreover, spinel phase becomes predominant as the first phase with the result that hardness increases excessively and processability in polishing of members such as spacer rings deteriorates significantly which is undesirable from the standpoint of processability. Accordingly, a preferable range of $Al_2O_3$ is 10–less than 18% and a more preferable range thereof is 10–17%.

The CaO ingredient is an ingredient which improves the melting property of the glass and prevents the precipitating crystal from becoming coarse. If the amount of this ingredient is less than 0.5%, these effects cannot be obtained whereas if the amount of this ingredient exceeds 4%, the precipitating crystal becomes coarse, the crystal phase changes and chemical durability deteriorates.

The SrO ingredient may be added for improving the melting property of the glass. If the amount of this ingredient is less than 0.5%, this effect cannot be obtained. Addition of this ingredient in an amount not greater than 4% will suffice.

The BaO ingredient may also be added for improving the melting property of the glass. Addition of this ingredient in an amount not greater than 5% will suffice.

The $ZrO_2$ and $TiO_2$ ingredients are very important ingredients which function as a nucleating agent and, moreover, have been found to have a remarkable effect for making precipitating crystals fine and improve mechanical strength and chemical durability of the material. The $ZrO_2$ ingredient in an amount not greater than 5% will suffice. As to $TiO_2$ ingredient, if the amount of the $TiO_2$ ingredient is 8% or below, softening sometimes occurs during crystallization whereas if the amount of this ingredient exceeds 12%, melting of the base glass becomes difficult and resistance to devitrification deteriorates.

The $Bi_2O_2$ ingredient is effective for restraining devitrification without impairing the melting and forming properties of the base glass. If the amount of this ingredient exceeds 6%, corrosion of a material such as Pt and $SiO_2$ which constitute a melting crucible becomes significant.

The $Sb_2O_3$ and $As_2O_3$ ingredients may be used as a refining agent in melting the glass but addition of an amount not greater than 1% of each ingredient will suffice.

Within a scope not impairing the characteristics of the invention, an optional element selected from P, W, Nb, La, Y and Pb may be added in an amount of up to 3% on oxide basis and/or an optional element selected from Cu, Co, Fe, Mn, Cr, Sn and V may be added in an amount of up to 2% on oxide basis.

In the fourth aspect of the invention, it is preferable for the glass-ceramics to be substantially free of $Li_2O$, $Na_2O$ and $K_2O$.

As the fifth aspect of the invention, preferable crystal phases and compositions of the glass-ceramics which constitute the information storage disk holding members will now be described.

The glass-ceramics which constitutes the information storage disk holding member of the fifth aspect of the invention should preferably comprise at least one crystal phase selected from the group consisting of β-quartz, β-quartz solid solution, enstatite, enstatite solid solution, forsterite and forsterite solid solution as a predominant crystal phase or phases.

This is because these crystal phases are advantageous in that they contribute to increasing rigidity, making the glass-ceramics relatively of a low specific gravity and, moreover, making the grain diameter of the precipitating crystals very fine. In the fifth aspect of the invention, precipitation and ratios of precipitation of β-quartz, enstatite and forsterite in the glass-ceramics are determined by the ratio of MgO and $SiO_2$ and precipitation and ratios of precipitation of these three crystal phases and solid solutions of these three crystal phases are determined by the ratios of the MgO and $SiO_2$ ingredients and other ingredients.

Reasons for defining compositions of the fifth aspect of the invention will now be described.

The $SiO_2$ ingredient is a very important ingredient which, by heat treatment of the base glass, produces β-quartz, β-quartz solid solution, enstatite, enstatite solid solution, forsterite and forsterite solid solution as predominant crystal phases. If the amount of the $SiO_2$ ingredient is less than 40%, the crystal phase of the obtained glass-ceramics is not stable and its texture becomes coarse whereas if the amount of this ingredient exceeds 60%, melting and forming of the base glass become difficult. For precipitation of these crystal phases, conditions of heat treatment are also an important factor and a more preferable range of this ingredient for enabling broader heat treatment conditions is 48.5–58.5%.

The MgO ingredient is a very important ingredient which, by heat treatment of the base glass, produces β-quartz, β-quartz solid solution, enstatite, enstatite solid solution, forsterite and forsterite solid solution as predominant crystal phases. If the amount of this ingredient is less than 10%, the crystal phase of the obtained glass-ceramics is not stable and its texture becomes coarse and, moreover, the melting property deteriorates whereas if the amount of this ingredient exceeds 20%, resistance to devitrification and chemical durability of the base glass deteriorates. For the same reason as in the case of $SiO_2$, a more preferable range of MgO is 12–18%.

The $Al_2O_3$ ingredient is a very important ingredient which, by heat treatment of the base glass, produces β-quartz solid solution as a predominant crystal phase. If the amount of this ingredient is less than 10%, the crystal phase of the obtained glass-ceramics is not stable and its texture becomes coarse whereas if the amount of this ingredient exceeds 20%, the melting property and resistance to devitrification deteriorate. For the same reason as described above, a more preferable range thereof is 12–18%.

The $P_2O_5$ ingredient functions as a nucleating agent for the glass and also is effective for improving the melting property of the base glass and improving resistance to devitrification during forming of the glass. If the amount of this ingredient is less than 0.5%, these effects cannot be obtained whereas if the amount of this ingredient exceeds 2.5%, resistance to devitrification deteriorates. A preferable range of this ingredient is 1–2%.

The $B_2O_3$ ingredient is effective for controlling viscosity of the base glass during melting and forming thereof. If the amount of this ingredient is less than 1%, these effects cannot be obtained whereas if the amount of this ingredient exceeds 4%, the melting property of the base glass deteriorates and the precipitating crystal of the glass-ceramics are not stable and its texture becomes coarse. A preferable range of this ingredient is 1–3%.

The $Li_2O$ ingredient is a very important ingredient which, by heat treatment of the base glass, produces β-quartz solid solution as a predominant crystal phase and, moreover, improves the melting property of the base glass. If the amount of this ingredient is less than 0.5%, these effects cannot be obtained whereas if the amount of this ingredient exceeds 4%, the precipitating crystal of the obtained glass-ceramics is not stable and its texture becomes coarse. A preferable range of this ingredient is 1–3%.

The CaO ingredient is an ingredient which improves the melting property of the glass and prevents the precipitating crystal from becoming coarse. If the amount of this ingredient is less than 0.5%, these effects cannot be obtained whereas if the amount of this ingredient exceeds 4%, it becomes difficult to obtain the desired crystal and the precipitating crystal becomes coarse and chemical durability deteriorates. A more preferable range thereof is 1–3%.

The $ZrO_2$ and $TiO_2$ ingredients are important ingredients which function as a nucleating agent and, moreover, have been found to have a remarkable effect for making precipitating crystals fine and improve mechanical strength and chemical durability of the material. If the amount of the $ZrO_2$ ingredient is less than 0.5% and the amount of the $TiO_2$ ingredient is less than 2.5%, these effects cannot be obtained. If the amount of the $ZrO_2$ ingredient exceeds 5% and the amount of the $TiO_2$ ingredient exceeds 8%, melting of the base glass becomes difficult, substance such as $ZrSiO_4$ which is left unmelted is produced and resistance to devitrification deteriorates with the result that abnormal growth of grain of crystal grains take place during crystallization process. A preferable range of the total amount of $ZrO_2$ and $TiO_2$ is 9% or less. A preferable range of $ZrO_2$ is 1–4%, a preferable range of $TiO_2$ is 3–7.5% and a more preferable range of the total amount of $TiO_2$ and $ZrO_2$ is 3–8%.

The $Sb_2O_3$ and $As_2O_3$ ingredients may be added as a refining agent in melting the glass but addition of an amount not greater than 0.5% of each ingredient will suffice. As to the $Sb_2O_3$ ingredient, it is preferable to add an amount not smaller than 0.01%.

The $SnO_2$, $MoO_3$, $CeO$ and $Fe_2O_3$ ingredients may be added up to 5% for each of these ingredients for imparting color to the glass or improving sensitivity of detection of surface defects by imparting color, and improving absorption characteristic of an LD excited solid laser. The $SnO_2$, $CeO$ and $Fe_2O_3$ ingredients should preferably be added in an amount not greater than 5% and the $MoO_3$ ingredient should preferably be added in an amount not greater than 3%. The $SnO_2$ and $MoO_3$ ingredients are important ingredients which have a light transmitting property in the state of glass before heat treatment and are imparted with color after crystallization by the heat treatment.

Description will now be made about preferable crystal phases and compositions which constitute the holding members of the sixth aspect of the invention.

In the sixth aspect of the invention, the glass-ceramics which constitute the information storage disk holding members should preferably comprise at least one crystal phase selected from the group consisting of cordierite, cordierite solid solution, spinel, spinel solid solution, enstatite, enstatite solid solution, β-quartz and β-quartz solid solution.

This is because these crystal phases are advantageous in that they have excellent processability, contribute to increasing rigidity, making the grain diameter of the precipitating crystals relatively small, and making the glass-ceramics relatively of a low specific gravity. Precipitation and ratios of precipitation of cordierite, spinel, enstatite and β-quartz in the glass-ceramics are determined by the ratio of $MgO$, $SiO_2$ and $Al_2O_3$. Precipitation and ratios of precipitation of these four crystal phases and solid solutions of these four crystal phases are determined by the ratios of the $MgO$, $SiO_2$ and $Al_2O_3$ ingredients and other ingredients. In the sixth aspect of the invention, the crystal grain diameter of the respective predominant crystal phases of the glass-ceramics should preferably be within a range of 0.05 μm–0.30 μm.

The $SiO_2$ ingredient is a very important ingredient which, by heat treatment of the base glass, produces cordierite, cordierite solid solution, enstatite, enstatite solid solution, β-quartz and β-quartz solid solution as predominant crystal phases. If the amount of the $SiO_2$ ingredient is less than 40%, the crystal phase of the obtained glass-ceramics is not stable and its texture becomes coarse whereas if the amount of this ingredient exceeds 60%, melting and forming of the base glass become difficult. For precipitation of these crystal phases, conditions of heat treatment are also an important factor and a more preferable range of this ingredient for enabling broader heat treatment conditions is 48.5–58.5%.

The $MgO$ ingredient is a very important ingredient which, by heat treatment of the base glass, produces cordierite, cordierite solid solution, spinel, spinel solid solution, enstatite, enstatite solid solution, β-quartz and β-quartz solid solution as predominant crystal phases. If the amount of this ingredient is less than 10%, the desired crystal cannot be obtained, the crystal phase of the obtained glass-ceramics is not stable and its texture becomes coarse and, moreover, the melting property deteriorates whereas if the amount of this ingredient exceeds 20%, resistance to devitrification deteriorates. For the same reason as in the case of $SiO_2$, a more preferable range of $MgO$ is 13–20%.

The $Al_2O_3$ ingredient is a very important ingredient which, by heat treatment of the base glass, produces cordierite, cordierite solid solution, spinel, spinel solid solution and β-quartz solid solution as predominant crystal phases. If the amount of this ingredient is less than 10%, the desired crystal phase cannot be obtained, the crystal phase of the obtained glass-ceramics is not stable and its texture becomes coarse and, moreover, the melting property deteriorates. If the amount of this ingredient exceeds 20%, the melting property and resistance to devitrification deteriorate and an amount of precipitation of spinel increases abnormally with the result that hardness increases excessively and processability in polishing deteriorates significantly. For the same reason as described above, a preferable range of $Al_2O_3$ is 10–less than 18% and a more preferable range thereof is 10–17%.

The $P_2O_5$ ingredient functions as a nucleating agent for the glass and also is effective for improving the melting and forming properties and resistance to devitrification of the base glass. It will suffice if an amount of 4% or less of this ingredient is added and a more preferable range thereof is 1–3%.

The $B_2O_3$ ingredient is effective for controlling viscosity of the base glass during melting and forming thereof. It will suffice if an amount of 4% or less of this ingredient is added.

The $CaO$ ingredient is an ingredient which improves the melting property of the glass and prevents the precipitating crystal from becoming coarse. If the amount of this ingredient is less than 0.5%, these effects cannot be obtained whereas if the amount of this ingredient exceeds 4%, the precipitating crystal becomes coarse, the crystal phase changes and chemical durability deteriorates. A more preferable range thereof is 1–3%.

The $BaO$ ingredient may be added for improving the melting property of the glass. Addition of this ingredient in an amount not greater than 5% will suffice. A more preferable range thereof is 1–3%.

The $ZrO_2$ and $TiO_2$ ingredients are important ingredients which function as a nucleating agent and, moreover, have been found to have a remarkable effect for making precipitating crystals fine and improve mechanical strength and chemical durability of the material. The $ZrO_2$ ingredient in an amount not greater than 5% will suffice. If the amount of the $TiO_2$ ingredient is less than 2.5%, these effects cannot be obtained whereas if the amount of this ingredient exceeds 8%, melting of the base glass becomes difficult and resistance to devitrification deteriorates. For the same reason as in the case of $SiO_2$, a more preferable range is 2–8%.

The $Sb_2O_3$ and $As_2O_3$ ingredients may be used as a refining agent in melting the glass but addition of an amount not greater than 1% of each ingredient will suffice.

The F ingredient may be added for improving the melting property of the glass. Addition of this ingredient in an amount not greater than 3% will suffice.

The $Fe_2O_3$ ingredient may be added as a coloring agent for the glass or improving sensitivity of detection of a surface defect by utilizing coloring of the glass and improving laser absorption characterisitc of an LD excited laser but addition of this ingredient in an amount not greater than 5% will suffice.

Description will now be made about preferable crystal phases and compositions of the glass-ceramics for the holding members of the seventh aspect of the invention.

In the seventh aspect of the invention, the information storage disk holding member is made of the glass-ceramics which comprise, as a predominant crystal phase or phases, at least one crystal phase selected from the group consisting of β-quartz (β-SiO$_2$), β-quartz solid solution (β-SiO$_2$ solid solution), β-spodumene (β-Li$_2$O.Al$_2$O$_3$.SiO$_2$), β-spodumene solid solution (β-Li$_2$O.Al$_2$O$_3$.SiO$_2$ solid solution), β-eucryptite (β-Li$_2$O.Al$_2$O$_3$.2SiO$_2$ where a part of Li$_2$O is replaceable by MgO and/or ZnO) and eucryptite solid solution (β-Li$_2$O.Al$_2$O$_3$.2SiO$_2$ solid solution where a part of Li$_2$O is replaceable by MgO and/or ZnO).

Precipitation and ratios of precipitation of one or more crystal phases selected from β-quartz, β-spodumene and β-eucryptite are determined by ratio of amount of Li$_2$O to amounts of Al$_2$O$_3$ and SiO$_2$ within the specific composition ranges. Precipitation and ratios of precipitation of one or more crystal phases selected from these crystal phases and solid solution phases of the respective crystal phases are determined by amounts of other ingredients.

Description will be made about respective ingredients.

In the seventh aspect of the invention, the SiO$_2$ ingredient in the glass-ceramics which constitute the information storage disk holding member is a very important ingredient which, by heat treatment of the base glass, produces the above described crystals as predominant crystal phases. If the amount of this ingredient is less than 50%, the precipitating crystal of the obtained glass-ceramics is not stable and its texture tends to become coarse with resulting deterioration in mechanical strength and increase in surface roughness obtained by polishing. If the amount of this ingredient exceeds 62%, melting and forming of the base glass become difficult and homogeneity is deteriorated. A preferable range of this ingredient is 53–57% and a more preferable range thereof is 54–56%.

The P$_2$O$_5$ ingredient is effective for improving melting and clarity of the base glass by coexistence with the SiO$_2$ ingredient. If the amount of this ingredient is less than 5%, this effect cannot be obtained whereas if the amount of this ingredient exceeds 10%, resistance to devitrification of the base glass deteriorates with the result that texture of the glass-ceramics becomes coarse in the crystallization process and mechanical strength thereby is reduced. A preferable range of this ingredient is 6–10% and a more preferable range thereof is 7–9%.

For attaining this effect significantly, a preferable range of SiO$_2$+P$_2$O$_5$ is 61–65% and a preferable range of P$_2$O$_5$/SiO$_2$ is 0.12–0.16. A more preferable range of SiO$_2$+P$_2$O$_5$ is 62–64% and a preferable range of P$_2$O$_5$/SiO$_2$ is 0.13–0.15.

If the amount of the Al$_2$O$_3$ ingredient is less than 22%, melting of the base glass becomes difficult and, therefore, homogeneity of the glass-ceramics obtained deteriorates and chemical durability of the base glass-ceramics also deteriorates. If the amount of this ingredient exceeds 26%, the melting property of the base glass deteriorates with resulting deterioration in homogeneity and, moreover, resistance to devitrification of the base glass deteriorates with the result that the texture of the glass-ceramics become coarse and mechanical strength thereby is reduced. A preferable range of this amount is 23–26% and a more preferable range thereof is 23–25%.

The three ingredients of Li$_2$O, MgO and ZnO are important ingredients which constitute β-quartz solid solution,β-spodumene,β-spodumene solid solution,β-eucryptite and β-eucryptite solid solution. These three ingredients are also important in that, by coexistence with the above described limited ranges of SiO$_2$ and P$_2$O$_5$ ingredients, improve the low expansion characteristic of the glass-ceramics, reduce an amount of deflection in high temperatures and, further, improve the melting property and clarity of the base glass significantly.

If the amount of the Li$_2$O ingredient is less than 3%, these effects cannot be obtained and, moreover, decrease in homogeneity due to deterioration in the melting property takes place and difficulty arises in precipitation of the desired crystal phase. If the amount of this ingredient exceeds 5%, the low expansion characteristic cannot be obtained and resistance to devitrification deteriorates with the result that the texture of the glass-ceramics becomes coarse in the crystallization process and mechanical strength thereby is reduced. A preferable range of this ingredient is 3.5–5% and a more preferable range thereof is 3.5–4.5%.

If the amount of the MgO ingredient is less than 0.5%, the above described effect cannot be obtained whereas if the amount of this ingredient exceeds 2%, the low expansion characteristic cannot be obtained. A preferable range of this ingredient is 0.5–1.8% and a more preferable range thereof is 0.6–1.5%.

If the amount of the ZnO ingredient is less than 0.2%, the above described effect cannot be obtained whereas if the amount of this ingredient exceeds 2%, the low expansion characteristic cannot be obtained and resistance to devitrification deteriorates with the result that the texture of the glass-ceramics becomes coarse in the crystallization process and mechanical strength thereby is reduced. A preferable range of this ingredient is 0.2–1.8% and a more preferable range thereof is 0.2–1.5%.

For attaining the above described effects significantly, the total amount of the three ingredients of Li$_2$O, MgO and ZnO should be within a range of 4.0–6.5%. A more preferable range thereof is 4.3–6.5% and a more preferable range thereof is 4.5–6.5%.

The two ingredients of CaO and BaO basically remain as a glass matrix other than the crystals which have precipitated in the glass and are important in that they function to perform fine adjustment between the crystal phases and the glass matrix phase with respect to the above described low expansion characteristic and improvement in the melting property.

If the amount of the CaO ingredient is less than 0.3%, this effect cannot be obtained whereas if the amount of this ingredient exceeds 4%, the desired crystal phase cannot be obtained and, moreover, resistance to devitrification deteriorates with the result that the texture of the glass-ceramics becomes coarse in the crystallization process and mechanical strength thereby is reduced. A preferable range of this ingredient is 0.5–3% and a more preferable range thereof is 0.5–2%.

If the amount of the BaO ingredient is less than 0.5%, this effect cannot be obtained whereas if the amount of this ingredient exceeds 4%, resistance to devitrification deteriorates with the result that the texture of the glass-ceramics becomes coarse in the crystallization process and mechanical strength thereby is reduced. A preferable range of this ingredient is 0.5–3% and a more preferable range thereof is 0.5–2%.

For attaining the above described effect significantly, the total amount of CaO and BaO should be within a range of 0.8–5%. A preferable range thereof is 1–4% and a more preferable range thereof is 1–3%.

The TiO$_2$ and ZrO$_2$ ingredients are indispensable as a nucleating agent. If the amount of each of these ingredients is less than 1%, a desired crystal cannot precipitate whereas if the amount of each of these ingredients exceeds 4%, the melting property of the base glass deteriorates with resulting deterioration in homogeneity and, in the worst case, an unmelted substance remains in the glass. A preferable range of $TiO_2$ is 1.5–4% and a preferable range of $ZrO_2$ is 1.5–3.5%. A more preferable range of $TiO_2$ is 1.5–3.5% and a more preferable range of $ZrO_2$ is 1–3%.

The $As_2O_3$ and $Sb_2O_3$ ingredients may be added as a refining agent in melting of the glass for obtaining a homogeneous product. Addition of these ingredients in an amount not greater than 4% will suffice. A preferable range of $As_2O_3+Sb_2O_3$ is 0–2% and a more preferable range is 0–2% of $As_2O_3$.

In addition to the above described ingredients, for fine adjustment of properties and other purposes and within the scope not impairing the characteristics of the information storage disk holding member of the invention, one or more of SrO, $B_2O_3$, $F_2$, $La_2O_3$, $Bi_2O_3$, $WO_3$, $Y_2O_3$, $Gd_2O_3$ and $SnO_2$ may be added in the total amount of not greater than 2%. In addition, one or more coloring agents such as CoO, NiO, $MnO_2$, $Fe_2O_3$ and $Cr_2O_3$ may be added in the total amount of not greater than 2%.

Description will be made about preferable crystal phases and compositions of the holding member of the eighth aspect of the invention.

The information storage disk holding members of the eighth aspect of the invention can be made of glass-ceramics which comprise gahnite ($ZnAl_2O_3$) and/or gahnite solid solution ($ZnAl_2O_3$ solid solution) as predominant crystal phase or phases.

In the eighth aspect of the invention, precipitation and ratio of precipitation of gahnite and/or gahnite solid solution are determined by ratios of amounts of ingredients other than ZnO and $Al_2O_3$ which constitute gahnite.

The precipitating predominant crystal phase is an important factor which influences the coefficient of thermal expansion. It is preferable to cause a crystal phase having a negative coefficient of thermal expansion to precipitate against glass which has a positive coefficient of thermal expansion and thereby realize a coefficient of thermal expansion of the glass-ceramics as a whole within a desired range.

In the glass-ceramics constituting the information storage disk holding members of the eighth aspect of the invention, if the amount of the $SiO_2$ ingredient is less than 30%, the crystal grain tends to become coarse and chemical durability and mechanical strength deteriorate whereas if the amount of this ingredient exceeds 65%, melting of the base glass becomes difficult and homogeneity thereby deteriorates. A preferable range of this ingredient is 32–63% and a more preferable range thereof is 34–61%.

If the amount of the $Al_2O_3$ ingredient is less than 5%, precipitation of gahnite as a predominant crystal phase becomes difficult whereas if the amount of this ingredient exceeds 35%, the melting property deteriorates resulting in deterioration of homogeneity and resistance to devitrification of the base glass deteriorates with the result that the texture of the glass-ceramics becomes coarse in the crystallization process and mechanical strength thereby is reduced. A preferable range of this ingredient is 7–33% and a more preferable range thereof is 10–30%.

The ZnO ingredient is an important ingredient which, by heat treatment of the base glass, produces gahnite as a predominant crystal phase with the $Al_2O_3$ ingredient and improves mechanical strength and heat resisting property of the substrate. If the amount of this ingredient is less than 5%, this effect cannot be obtained whereas if the amount of this ingredient exceeds 35%, resistance to devitrification deteriorates with the result that the texture of the glass-ceramics becomes coarse in the crystallization process and mechanical strength thereby is reduced. A preferable range of this ingredient is 7–33% and a more preferable range thereof is 10–30%.

If the amount of the MgO ingredient is less than 1%, the melting property deteriorates and thereby homogeneity deteriorates and, moreover, resistance to devitrification deteriorates with the result that the texture of the glass-ceramics becomes coarse in the crystallization process and mechanical strength thereby is reduced. If the amount of this ingredient exceeds 20%, resistance to devitrification of the base glass deteriorates. A preferable range of this ingredient is 3–18% and a more preferable range thereof is 3–15%.

The CaO, SrO, BaO, $B_2O_3$, $La_2O_3$, $Y_2O_3$, $Gd_2O_3$, $Ta_2O_3$, $Nb_2O_5$, $WO_3$ and $Bi_2O_3$ ingredients are effective for improving the melting property of the base glass and the $La_2O_3$, $Y_2O_3$, $Gd_2O_3$, $Ta_2O_3$, $Nb_2O_5$, $WO_3$ and $Bi_2O_3$ ingredients are effective also for improving mechanical strength and chemical durability of the product. For obtaining these effects while preventing the crystal phase which precipitates by heat treatment from becoming coarse, the total amount of one or more of these ingredients should be within a range of 0.5%–20%. If, however, the amount of $B_2O_3$ exceeds 10% or the total amount of one or more of the $Ta_2O_3$, $Nb_2O_5$, $WO_3$ and $Bi_2O_3$ ingredients exceeds 10%, difficulty arises in precipitation of a desired crystal phase. A preferable range of $CaO+SrO+BaO+B_2O_3+La_2O_3+Y_2O_3+Gd_2O_3+Ta_2O_3+Nb_2O_5+WO_3+Bi_2O_3$ is 0.5–15%. A preferable range of $B_2O_3$ is 0–8%. A preferable range of $Ta_2O_3+Nb_2O_5+WO_3+Bi_2O_3$ is 0–5%. A more preferable range of $CaO+SrO+BaO+B_2O_3+La_2O_3+Y_2O_3+Gd_2O_3+Ta_2O_3+Nb_2O_5+WO_3+Bi_2O_3$ is 0.5–10%. A more preferable range of $B_2O_3$ is 0–5%. A more preferable range of $Ta_2O_3+Nb_2O_5+WO_3+Bi_2O_3$ is 0–5%.

The $TiO_2$ ingredient is indispensable as a nucleating agent. If the amount of this ingredient is less than 1%, a desired crystal phase cannot be produced whereas if the amount of this ingredient exceeds 15%, resistance to devitrification deteriorates with the result that the texture of the glass-ceramics becomes coarse in the crystallization process and mechanical strength thereby is reduced. A preferable range of this ingredient is 3–13% and a more preferable range thereof is 4–10%.

The $ZrO_2$, $P_2O_5$ and $SnO_2$ ingredients may be employed as an auxiliary nucleating agent. The total amount of these ingredients should preferably be not greater than 7%. The amount of the $ZrO_2$ ingredient should preferably be less than 2%, the amount of the $P_2O_5$ ingredient should preferably be not greater than 5% and the amount of the $SnO_2$ ingredient should preferably be not greater than 2%. If the amounts of these ingredients exceed the above ranges, resistance to devitrification deteriorates with the result that the texture of the glass-ceramics becomes coarse in the crystallization process and mechanical strength thereby is reduced. More preferably, the amount of $ZrO_2+P_2O_5+SnO_2$ should not be greater than 6%, the amount of $ZrO_2$ should be less than 1.8%, the amount of $P_2O_5$ should not be greater than 4.5% and the amount of $SnO_2$ should not be greater than 1.8%. Most preferably, the amount of $ZrO_2+P_2O_5+SnO_2$ should not be greater than 5%, the amount of $ZrO_2$ should be less than 1.7%, the amount of $P_2O_5$ should not be greater than 4% and the amount of $SnO_2$ should not be greater than 1.7%.

The $As_2O_3$ and $Sb_2O_3$ ingredients may be added as a refining agent in melting of the glass. Addition of these ingredients in the total amount not greater than 4% will suffice. A preferable total amount is 3% or below and a more preferable total amount is 2% or below.

If one or more fluorides of the above described ingredients are contained, it is effective as a flux of the base glass and is effective for adjusting crystallization. If the amount of the fluoride as the total amount of F exceeds 5%, the tendency to devitrification increases to such a degree that a desired product cannot be obtained.

In addition to these ingredients, within a scope not impairing the desired characteristics, coloring agents including $MnO_2$, $NiO$, $CoO$, $Fe_2O_3$, $Cr_2O_3$, $V_2O_3$, $MoO_2$ and $Cu_2O$, $GeO_2$ and one or more rare earth oxides other than those described above may be added in the total amount up to 10%.

Description will be made about the ninth aspect of the invention. For achieving the desired coefficient of thermal expansion, the glass-ceramics should preferably contain at least one crystal phase selected from α-cristobalite, α-cristobalite solid solution, α-quartz and α-quartz solid solution which has a relatively large positive coefficient of thermal expansion as a predominant crystal phase or phases. Particularly, by selecting these predominant crystal phases, glass-ceramics having excellent chemical durability and physical properties can be obtained easily. The grain diameter (average) of these crystal phases should preferably be less than 0.10 μm. Ratio of X-ray intensity of crystal phases other than these predominant crystal phases should preferably be less than 20, more preferably less than 10 and most preferably less than 5.

In the ninth aspect of the invention, the glass-ceramics should preferably not contain lithium disilicate as a predominant crystal phase from the standpoint of mechanochemical influence in the polishing process. For adjusting the thermal expansion characteristic, the glass-ceramics should preferably not contain β-spodumene, β-eucryptite or β-cristobalite which has a negative coefficient of thermal expansion and lithium silicate ($Li_2O.SiO_2$), diopside, enstatite, mica, α-tridymite or fluorrichterite.

Description will now be made about the glass-ceramics which constitute the information storage disk holding members of the ninth aspect of the invention.

The $SiO_2$ ingredient is a very important ingredient which, by heat treatment of the base glass, produces α-cristobalite, α-cristobalite solid solution, α-quartz and α-quartz solid solution as predominant crystal phases. If the amount of this ingredient is less than 65%, precipitating crystals of the glass-ceramics obtained is not stable and its texture tends to become coarse whereas if the amount of this ingredient exceeds 75%, melting and forming of the base glass become difficult. A preferable range of this ingredient is a value exceeding 65% and/or up to 75% and a more preferable range thereof is 68–74%.

The $Li_2O$ ingredient is an important ingredient which improves the melting property of the glass. If the amount of this ingredient is less than 4%, this effect cannot be obtained and difficulty arises in melting of the base glass. If the amount of this ingredient exceeds 7%, the problem of dissolving out of Li ion arises and production of lithium disilicate crystal increases. A preferable range of this ingredient is 4.5–6.5% and a more preferable range thereof is 4.5–6.0%.

The MgO, ZnO, SrO, BaO and CaO ingredients improve the melting property of the glass and prevent the precipitating crystal from becoming coarse. The total amount of these ingredients should preferable be not smaller than 2%. If the total amount of these ingredients exceeds 15%, crystals obtained become instable and their texture tends to become coarse.

In the present invention, the $P_2O_5$ ingredient is indispensable as a nucleating agent and, for enhancing forming of crystal nucleuses and preventing a predominant crystal phase from becoming coarse, the amount of this ingredient should preferably be not smaller than 1.0%. For preventing the base glass from becoming opaque and maintaining stability in a large scale production, the amount of this ingredient should preferably be not greater than 2.5%.

The $ZrO_2$ ingredient is an important ingredient which, like the $P_2O_5$ ingredient, functions as a nucleating agent and, moreover, has been found to have a remarkable effect for making precipitating crystals fine and improves mechanical strength and chemical durability of the material. The amount of the $ZrO_2$ ingredient should preferably be not smaller than 2.0%. If an excessive amount of this ingredient is added, melting of the base glass becomes difficult and substance such as $ZrSiO_4$ which is left unmelted is produced and, therefore, the amount of this ingredient should preferably be not greater than 7%. A more preferable range thereof is 2–6% and, more preferably, the upper limit of this ingredient should be 5%.

The $SnO_2$ ingredient functions, like $ZrO_2$, as a nucleating agent. Addition of this ingredient in an amount not greater than 3% will suffice.

The $Al_2O_3$ ingredient improves chemical durability and mechanical strength, particularly hardness, of the glass-ceramics and the amount of this ingredient should preferably be not smaller than 5%. If the amount of this ingredient is excessive, the melting property and resistance to devitrification deteriorate and the predominant crystal phase change to β-spodumene ($Li_2O.Al_2O_3.4SiO_2$) which is a low expansion crystal. Precipitation of β-spodumene ($Li_2O.Al_2O_3.4SiO_2$) deteriorates the coefficient of thermal expansion significantly and, therefore, precipitation of this ingredient should be avoided. For this reason, the amount of this ingredient should preferably be not greater than 9%. More preferably, the lower limit of this ingredient should not be smaller than 5% and the upper limit thereof should be less than 9% and, most preferably, the lower limit should not be smaller than 6% and the upper limit thereof should be less than 8%.

The $Y_2O_3$, $WO_3$, $La_2O_3$ and $Bi_2O_3$ ingredients are ingredients which improve the melting property which is reduced in a composition comprising a low content of $Li_2O$ and also increase Young's modulus of the glass. Addition of these ingredients in the total amount of not greater than 3% will suffice. If the total amount of these ingredients exceeds 3%, precipitation of a stable crystal becomes difficult.

The $Sb_2O_3$ and $As_2O_3$ ingredients may be added as a refining agent in melting of he glass. Addition of these ingredients in the total amount not greater than 1% will suffice.

Within a scope not impairing the above described characteristics, the Ga, Ge, Cu, Fe, Co, Nb, Ti, V, Ce, Gd and B ingredients may be added in an amount up to 3% (mass % on oxide basis) for each ingredient. The Mo, Ta, Mn, Cr and F ingredients should preferably not be added if possible.

A preferable range of each of the $Na_2O$ and $K_2O$ ingredients is 0–less than 3%. A preferable range of $Na_2O+K_2O$ is 0.1–2.5%. The $K_2O$ and $Na_2O$ ingredients are effective for reducing the melting temperature and also are effective for restraining. dissolving out of alkali ion from the glass matrix by mixing with the $Li_2O$ ingredient. This is because mixing and coexistence of small amounts of these alkali ingredients improve electrical nature (volume resistivity). By mixing and coexistence of the $K_2O$ and $Na_2O$ ingredients in glass containing a relatively large amount of the $Li_2O$ ingredient, volume resistivity is improved and mobility of alkali ion in the glass thereby is restrained with the result that dissolving out of alkali ion can be restrained.

In the first to ninth aspects of the invention, the glass-ceramics which constitute the information storage disk holding members should be substantially free of the PbO ingredient which is not desirable for environment.

In the information storage disk holding members made of the glass-ceramics of the invention, the total amount of the above described ingredients should not be smaller than 90% and, more preferably, be not smaller than 95% and most preferably be not smaller than 98% for obtaining better information storage disk holding members.

The glass-ceramics which constitute the information storage disk holding members of the invention can be manufactured by melting glass having the above described compositions, subjecting the glass to hot forming or cold processing and thereafter subjecting the glass to heat treatment for nucleation and further heat treatment at a higher temperature for crystallization. By these treatments, the glass-ceramics which constitute the information storage disk holding members of the invention have a structure in which crystal phases are dispersed in glass matrix and which does not substantially contain pores.

In the first and third aspects of the invention, the glass-ceramics which constitute the information storage disk holding members of the invention can be manufactured by melting the glass having the above described compositions at a temperature within a range of about 1350° C.–1500° C., subjecting the glass to hot forming or cold processing, and thereafter subjecting the glass to heat treatment for nucleation at a temperature within a range of 450° C.–850° C. for 1 to 12 hours, more preferably for 1 to 7 hours and further heat treatment for crystallization at a temperature within a range of 700° C.–1000° C.

In the method of manufacturing of the glass-ceramics which constitute the information storage disk holding members of the second aspect of the invention, the melting temperature range of the glass should preferably be about 1350° C.–1450° C., the range of nucleation temperature should preferably be 450° C.–650° C., more preferably 500° C.–600° C. and the range of the crystallization temperature should preferably be 700° C.–800° C., more preferably 720° C.–780° C. In the third aspect of the invention, the range of the melting temperature should preferably be 1400° C.–1500° C., the range of nucleation temperature should preferably be 600° C.–800° C., more preferably 650° C.–750° C. and the range of the crystallization temperature should preferably be 800° C.–1000° C., more preferably 830° C.–980° C.

In the fourth aspect of the invention, the glass-ceramics which constitute the information storage disk holding members of the invention can be manufactured by subjecting the glass to heat treatment for nucleation at a temperature within a range of 400° C.–600° C. for 1 to 7 hours and further heat treatment for crystallization at a temperature within a range of 700° C.–760° C. for about 1–7 hours. By these heat treatment conditions, information storage disk holding members made of glass-ceramics which have desired crystal phases, crystal grain diameter, amount of crystals and degree of crystallization can be obtained.

In the sixth aspect of the invention, the glass-ceramics which constitute the information storage disk holding members of the invention can be manufactured by subjecting the glass to heat treatment for nucleation at a temperature within a range of 650° C.–750° C. for 1 to 12 hours and further heat treatment for crystallization at a temperature within a range of 750° C.–1050° C. for about 1–12 hours.

In the seventh and eighth aspects of the invention, the glass-ceramics which constitute the information storage disk holding members of the invention can be manufactured by melting the glass having the above described compositions, subjecting the glass to hot forming or cold processing, and thereafter subjecting the glass to heat treatment for nucleation at a temperature within a range of 650° C.–750° C. for 1 to 12 hours and further heat treatment for crystallization at a temperature within a range of 750° C.–950° C. for about 1 to 12 hours.

In the ninth aspect of the invention, the glass-ceramics which constitute the information storage disk holding members of the invention can be manufactured by mixing raw materials including oxides, carbonates and nitrates having the above described composition, melting the raw materials at a temperature of about 1350° C.–1450° C. by using a conventional melting device, stirring and homogenizing the glass, forming the glass to the form of a disk and cooling it to obtain a formed glass, and thereafter subjecting the formed glass to heat treatment for nucleation at a temperature within a range of 400° C.–600° C. for about 1 to 7 hours and further heat treatment for crystallization at a temperature within a range of 650° C.–750° C. for about 1 to 7 hours.

For releasing static electricity stored in an information storage disk, it is preferable to form an electrically conductive film on the surface of the information storage disk holding members. The conductive film may be formed by a surface treatment using a hard metal or by flame spray of ceramics.

The spacer rings for the information storage disk of the invention can be manufactured by pressing the glass-ceramics to a ring form in the hot forming or cold processing in the above described manufacturing process and lapping and polishing the surface of the spacer rings which comes into contact with the information storage disk.

By placing one or more information storage disks on a rotor hub through the spacer rings for the information storage disk, an information storage disk drive device suitable for high speed information transmission can be realized. In this case, it is preferable that coefficients of thermal expansion of the rotor hub and spacer rings should be about equal to each other.

DESCRIPTION OF THE PREFERRED EMBODIMENTS

Preferred Examples of information storage disk holding members of the invention will now be described.

Average crystal grain diameters of respective crystal phases were measured by a transmission electron microscope (TEM). Types of crystal grains of the respective crystal phases were identified by TEM structure analysis or X-ray diffraction analysis (XRD). Description of the crystal phases is made in the order of a larger precipitation ratio. The order of the precipitation ratio was determined in the order of height of the main peak of respective predominant crystal phases by XRD.

Surface roughness Ra (arithmetic mean roughness) was measured by an atomic force microscope (AFM).

Measurement of Li ion dissolving amount was conducted by ion chromatography. In the measurement, 80 ml (room temperature) of super pure water and a disk (having a diameter of 65 mm and thickness of 0.635 mm) were packed in a film pack which was thereafter held in a drier with its temperature maintained at about 30□ for 3 hours and then the disk was taken out and the ion chromatography was conducted.

Average coefficient of linear expansion was measured by JOGIS (Japan Optical Glass Industry Standard) 06. Young's modulus was measured by the ultrasonic pulse method of JIS R1602. Bending strength was measured by JIS R1601 (three-point bending strength). Vickers' hardness was measured by JIS R1610. Transmittance of material having a plate thickness of 10 mm at wavelength 950–1600 nm was measured by a spectrophotometer. Specific gravity was measured by JOGIS (Japan Optical Glass Industry Standard) 06.

Examples and comparative examples of the information storage disk holding members were finished by lapping glass-ceramics of the respective examples and comparative examples with diamond pellets of 800#–2000# for about 5 minutes to 30 minutes and then polishing them with abrasive (cerium oxide) having a grain diameter (average) of 0.02 μm to 3.0 μm for about 30 minutes to 60 minutes.

Preferred examples of the information storage disk holding members of the first and third aspects of the invention will be described. Tables 1–9 show Examples (1-1 to 1-14 and 3-1 to 3-8) of spacer rings made of glass-ceramics and Comparative Examples (1 to 3) of the prior art glass-ceramics with respect to their compositions, nucleation and crystallization temperatures, crystal phase, average crystal grain diameter and amount of crystal of the crystal phase of the glass-ceramics, and degree of crystallization, coefficient of thermal expansion, Young's modulus, specific gravity, specific rigidity (Young's modulus/specific gravity) and bending strength of the glass-ceramics. In expressing crystal phases in these tables, solid solutions of the respective crystals are expressed by affixing "SS" after the names of the crystal phases. The invention is not limited to these examples.

In FIG. 1, relationship between crystallization temperature and bending strength of glass-ceramics having the same composition as those of Examples 1-1 to 1-3 is shown.

TABLE 1

| | Examples | | |
|---|---|---|---|
| | 1-1 | 1-2 | 1-3 |
| $SiO_2$ | 75.3 | 75.3 | 75.3 |
| $Li_2O$ | 9.9 | 9.9 | 9.9 |
| $P_2O_5$ | 2.0 | 2.0 | 2.0 |
| $ZrO_2$ | 2.3 | 2.3 | 2.3 |
| $Al_2O_3$ | 7.0 | 7.0 | 7.0 |
| MgO | 0.8 | 0.8 | 0.8 |
| ZnO | 0.5 | 0.5 | 0.5 |
| $K_2O$ | 2.0 | 2.0 | 2.0 |
| $Sb_2O_3$ | 0.2 | 0.2 | 0.2 |
| Nucleation temperature (° C.) | 540 | 540 | 540 |
| Crystallization temperature (° C.) | 720 | 740 | 760 |
| Predominant crystal phase | lithium disilicate $Li_2Si_2O_5$ | lithium disilicate $Li_2Si_2O_5$ | lithium disilicate $Li_2Si_2O_5$ |
| Average grain diameter (μm) | 0.005 μm | 0.005 μm | 0.020 μm |
| Amount of crystal (mass %) | 8 mass % | 10 mass % | 18 mass % |
| Predominant crystal phase | | α-quartz α-$SiO_2$ | α-quartz α-$SiO_2$ |
| Average grain diameter (μm) | | 0.010 μm | 0.030 μm |
| Degree of crystallization (mass %) | 8 | 26 | 43 |
| Coefficient of thermal expansion ($\times 10^{-7}$/° C.) (−50° C. +70° C.) | 65 | 74 | 110 |
| Young's modulus (GPa) | 108 | 98 | 95 |
| Specific gravity | 2.45 | 2.46 | 2.47 |
| Young's modulus/specific gravity (GPa) | 44.1 | 39.8 | 38.5 |
| Bending strength (MPa) | 430 | 700 | 500 |

TABLE 2

| | Examples | | |
|---|---|---|---|
| | 1-4 | 1-5 | 1-6 |
| $SiO_2$ | 75.0 | 75.0 | 76.0 |
| $Li_2O$ | 9.9 | 9.5 | 9.5 |
| $P_2O_5$ | 2.0 | 2.5 | 2.3 |
| $ZrO_2$ | 3.0 | 3.9 | 4.5 |
| $Al_2O_3$ | 7.0 | 7.0 | 6.0 |
| MgO | 0.4 | — | — |
| ZnO | 0.5 | 0.5 | — |
| $K_2O$ | 2.0 | 1.4 | 1.5 |
| $Sb_2O_3$ | 0.2 | 0.2 | 0.2 |
| Nucleation temperature (° C.) | 520 | 540 | 540 |
| Crystallization temperature (° C.) | 730 | 740 | 780 |
| Predominant crystal phase | lithium disilicate $Li_2Si_2O_5$ | lithium disilicate $Li_2Si_2O_5$ | lithium disilicate $Li_2Si_2O_5$ |
| Average grain diameter (μm) | 0.010 μm | 0.020 μm | 0.040 μm |
| Amount of crystal (mass %) | 5 mass % | 7 mass % | 18 mass % |
| Predominant crystal phase | α-quartz α-$SiO_2$ | α-cristobalite α-$SiO_2$ | α-quartz α-$SiO_2$ |
| Average grain diameter (μm) | 0.010 μm | 0.010 μm | 0.100 μm |
| Amount of crystal (mass %) | | | 23 mass % |
| Predominant crystal phase | | | α-cristobalite α-$SiO_2$ |
| Average grain diameter (μm) | | | 0.050 μm |
| Degree of crystallization (mass %) | 10 | 14 | 50 |
| Coefficient of thermal expansion ($\times 10^{-7}$/° C.) (−50° C. +70° C.) | 72 | 74 | 79 |
| Young's modulus (GPa) | 105 | 100 | 97 |
| Specific gravity | 2.46 | 2.47 | 2.50 |
| Young's modulus/specific gravity (GPa) | 42.7 | 40.5 | 38.8 |
| Bending strength (MPa) | 460 | 760 | 580 |

TABLE 3

| | Examples | | |
|---|---|---|---|
| | 1-7 | 1-8 | 1-9 |
| $SiO_2$ | 72.0 | 74.2 | 75.6 |
| $Li_2O$ | 11.0 | 9.0 | 8.5 |
| $P_2O_5$ | 2.5 | 1.8 | 1.7 |
| $ZrO_2$ | 6.9 | 3.0 | 2.1 |
| $Al_2O_3$ | 3.6 | 7.8 | 8.5 |
| MgO | 0.5 | 1.7 | |
| ZnO | | | 1.0 |
| $K_2O$ | 2.5 | 2.0 | 1.5 |
| $Sb_2O_3$ | 1.0 | 0.5 | |
| Nucleation temperature (° C.) | 580 | 560 | 590 |
| Crystallization temperature (° C.) | 740 | 780 | 780 |
| Predominant crystal phase | lithium disilicate $Li_2Si_2O_5$ | lithium disilicate $Li_2Si_2O_5$ | lithium disilicate $Li_2Si_2O_5$ |
| Average grain diameter (μm) | 0.020 μm | 0.030 μm | 0.050 μm |
| Amount of crystal (mass %) | 20 mass % | 12 mass % | 18 mass % |
| Predominant crystal phase | α-quartz α-$SiO_2$ | α-quartz α-$SiO_2$ | α-quartz α-$SiO_2$ |
| Average grain diameter (μm) | 0.030 μm | 0.040 μm | 0.050 μm |
| Amount of crystal (mass %) | | | 20 mass % |
| Predominant crystal phase | | | α-cristobalite α-$SiO_2$ |
| Average grain diameter (μm) | | | 0.040 μm |
| Degree of crystallization (mass %) | 30 | 18 | 48 |

TABLE 3-continued

| | Examples | | |
|---|---|---|---|
| | 1-7 | 1-8 | 1-9 |
| Coefficient of thermal expansion ($\times 10^{-7}/°$ C.) ($-50°$ C.$\to +70°$ C.) | 80 | 100 | 130 |
| Young's modulus (GPa) | 110 | 100 | 96 |
| Specific gravity | 2.44 | 2.42 | 2.48 |
| Young's modulus/specific gravity (GPa) | 45.1 | 41.3 | 38.7 |
| Bending strength (MPa) | 650 | 600 | 420 |

TABLE 4

| | Examples | | |
|---|---|---|---|
| | 1-10 | 1-11 | 1-12 |
| $SiO_2$ | 74.3 | 77.2 | 78.4 |
| MgO | 0.8 | 1.0 | 0.5 |
| $Al_2O_3$ | 7.0 | 3.5 | 2.5 |
| $P_2O_5$ | 2.0 | 2.0 | 2.0 |
| $Li_2O$ | 9.9 | 10.6 | 10.7 |
| ZnO | 0.5 | 0.5 | 0.5 |
| $ZrO_2$ | 2.3 | 2.4 | 2.2 |
| $TiO_2$ | | | |
| $Sb_2O_3$ | 0.2 | 0.2 | 0.2 |
| $As_2O_3$ | | | |
| $K_2O$ | 3.0 | 2.6 | 3.0 |
| $MoO_3$ | | | |
| Nucleation temperature (° C.) | 540 | 520 | 540 |
| Crystallization temperature (° C.) | 770 | 750 | 780 |
| Predominant crystal phase | α-quartz α-$SiO_2$ | lithium disilicate $Li_2Si_2O_5$ | lithium disilicate $Li_2Si_2O_5$ |
| Average grain diameter (μm) | 0.15 μm | 0.10 μm | 0.10 μm |
| Amount of crystal (mass %) | 25 mass % | 55 mass % | 43 mass % |
| Predominant crystal phase | lithium disilicate $Li_2Si_2O_5$ | α-cristobalite α-$SiO_2$ | α-cristobalite α-$SiO_2$ |
| Average grain diameter (μm) | 0.10 μm | 0.15 μm | 0.15 μm |
| Degree of crystallization (mass %) | 50 | 65 | 60 |
| Coefficient of thermal expansion ($\times 10^{-7}/°$ C.) ($-50°$ C.$\to +70°$ C.) | 115 | 87 | 75 |
| Young's modulus (GPa) | 98 | 100 | 105 |
| Specific gravity | 2.42 | 2.42 | 2.41 |
| Young's modulus/specific gravity (GPa) | 40.5 | 41.3 | 43.6 |

TABLE 5

| | Examples | |
|---|---|---|
| | 1-13 | 1-14 |
| $SiO_2$ | 76.5 | 76.0 |
| MgO | 0.8 | 0.9 |
| $Al_2O_3$ | 3.5 | 4.5 |
| $P_2O_5$ | 2.3 | 2.5 |
| $K_2O$ | 3.8 | 2.5 |
| $Li_2O$ | 10.5 | 10.0 |
| ZnO | 0.5 | 0.4 |
| $ZrO_2$ | 1.9 | 3.0 |
| $Sb_2O_3$ | 0.2 | 0.2 |
| $As_2O_3$ | | |
| Nucleation temperature (° C.) | 540 | 560 |
| Crystallization temperature (° C.) | 770 | 750 |

TABLE 5-continued

| | Examples | |
|---|---|---|
| | 1-13 | 1-14 |
| Predominant crystal phase | α-quartz α-$SiO_2$ | lithium disilicate $Li_2Si_2O_5$ |
| Average grain diameter (μm) | 0.15 μm | 0.040 μm |
| Amount of crystal (mass %) | 20 mass % | 8 mass % |
| Predominant crystal phase | lithium disilicate $Li_2Si_2O_5$ | α-quartz α-$SiO_2$ |
| Average grain diameter (μm) | 0.10 μm | 0.040 μm |
| Degree of crystallization (mass %) | 50 | 24 |
| Coefficient of thermal expansion ($\times 10^{-7}/°$ C.) ($-50°$ C.$\to +70°$ C.) | 110 | 75 |
| Young's modulus (GPa) | 100 | 108 |
| Specific gravity | 2.43 | 2.48 |
| Young's modulus/specific gravity (GPa) | 41.2 | 43.5 |

TABLE 6

| | Examples | | |
|---|---|---|---|
| | 3-1 | 3-2 | 3-3 |
| $SiO_2$ | 53.5 | 53.5 | 53.5 |
| MgO | 15.0 | 15.0 | 15.0 |
| $Al_2O_3$ | 18.0 | 18.0 | 18.0 |
| $P_2O_5$ | 2.0 | 2.0 | 2.0 |
| $Li_2O$ | | | |
| CaO | 2.0 | 2.0 | 2.0 |
| BaO | 2.0 | 2.0 | 2.0 |
| $TiO_2$ | 7.0 | 7.0 | 6.5 |
| $Sb_2O_3$ | | | |
| $As_2O_3$ | 0.5 | 0.5 | 0.2 |
| Others | | | |
| $Fe_2O_3$ | | | 0.8 |
| Nucleation temperature (° C.) | 700 | 700 | 650 |
| Crystallization temperature (° C.) | 970 | 980 | 830 |
| Predominant crystal phase | cordierite $Mg_2Al_4Si_5O_{18}$ | cordierite $Mg_2Al_4Si_5O_{18}$ | enstatite $MgSiO_3$ |
| Average grain diameter (μm) | 0.3 μm | 0.3 μm | 0.10 μm |
| Amount of crystal (mass %) | 55 mass % | 60 mass % | 50 mass % |
| Predominant crystal phase | β-quartz SS β-$SiO_2$ SS | β-quartz SS β-$SiO_2$ SS | |
| Average grain diameter (μm) | 0.10 μm | 0.10 μm | |
| Degree of crystallization (mass %) | 65 | 70 | 50 |
| Coefficient of thermal expansion ($\times 10^{-7}/°$ C.) ($-50°$ C.$\to +70°$ C.) | 37 | 35 | 46 |
| Young's modulus (GPa) | 135 | 145 | 113 |
| Specific gravity | 2.72 | 2.80 | 2.58 |
| Young's modulus/specific gravity (GPa) | 49.6 | 51.8 | 43.8 |

TABLE 7

| | Examples | | |
|---|---|---|---|
| | 3-4 | 3-5 | 3-6 |
| $SiO_2$ | 49.0 | 45.5 | 52.7 |
| MgO | 14.0 | 17.0 | 15.0 |
| $Al_2O_3$ | 17.0 | 19.0 | 16.0 |
| CaO | 1.7 | 1.2 | 1.4 |
| SrO | 1.7 | 1.2 | 1.4 |

TABLE 7-continued

|  | Examples | | |
| --- | --- | --- | --- |
|  | 3-4 | 3-5 | 3-6 |
| BaO | 4.2 | 1.4 | 3.5 |
| ZrO$_2$ | 1.4 |  | 0.8 |
| TiO$_2$ | 9.0 | 9.5 | 9.0 |
| Bi$_2$O$_3$ | 1.8 | 5.0 |  |
| Sb$_2$O$_3$ | 0.2 | 0.2 | 0.2 |
| Nucleation temperature (° C.) | 700 | 700 | 700 |
| Crystallization temperature (° C.) | 970 | 950 | 950 |
| Predominant crystal phase | enstatite MgSiO$_3$ magnesium titanate SS MgTi$_2$O$_5$ SS | enstatite MgSiO$_3$ spinel SS MgAl$_2$O$_4$ | enstatite MgSiO$_3$ magnesium titanate SS MgTi$_2$O$_5$ SS |
| Average grain diameter (μm) | 0.1 μm | 0.1 μm | 0.1 μm |
| Coefficient of thermal expansion (×10$^{-7}$/° C.) (−50° C.–+70° C.) | 51 | 51 | 51 |
| Young's modulus (GPa) | 116 | 135 | 120 |
| Specific gravity | 2.97 | 2.97 | 2.91 |
| Young's modulus/specific gravity (GPa) | 39.1 | 45.5 | 41.2 |

TABLE 8

|  | Examples | |
| --- | --- | --- |
|  | 3-7 | 3-8 |
| SiO$_2$ | 53.5 | 53.5 |
| MgO | 15.0 | 15.0 |
| Al$_2$O$_3$ | 18.0 | 18.0 |
| P$_2$O$_5$ | 2.0 | 2.0 |
| Li$_2$O |  |  |
| CaO | 2.0 | 2.0 |
| ZrO$_2$ |  | 1.0 |
| TiO$_2$ | 7.0 | 7.0 |
| Sb$_2$O$_3$ |  |  |
| As$_2$O$_3$ | 0.5 | 0.5 |
| BaO | 1.0 | 1.0 |
| MoO$_3$ |  | 1.0 |
| Nucleation temperature (° C.) | 700 | 700 |
| Crystallization temperature (° C.) | 970 | 980 |
| Predominant crystal phase | cordierite Mg$_2$Al$_4$Si$_5$O$_{18}$ | cordierite Mg$_2$Al$_4$Si$_5$O$_{18}$ |
| Average grain diameter (μm) | 0.3 μm | 0.3 μm |
| Amount of crystal (mass %) | 63 mass % | 68 mass % |
| Predominant crystal phase | β-quartz SS β-SiO$_2$ SS | spinel MgAl$_2$O$_4$ |
| Average grain diameter (μm) | 0.10 μm | 0.10 μm |
| Degree of crystallization (mass %) | 65 | 70 |
| Coefficient of thermal expansion (×10$^{-7}$/° C.)(−50° C.–+70° C.) | 37 | 45 |
| Young's modulus (GPa) | 135 | 155 |
| Specific gravity | 2.78 | 2.80 |
| Young's modulus/specific gravity (GPa) | 48.6 | 55.3 |

TABLE 9

|  | Comparative Examples | | |
| --- | --- | --- | --- |
|  | 1 | 2 | 3 |
| SiO$_2$ | 43.0 | 75.8 | 55.0 |
| MgO | 23.0 | 2.0 | 10.0 |
| Al$_2$O$_3$ | 26.8 | 2.5 | 10.0 |
| P$_2$O$_5$ |  | 2.5 |  |
| ZnO |  | 0.5 | 10.0 |

TABLE 9-continued

|  | Comparative Examples | | |
| --- | --- | --- | --- |
|  | 1 | 2 | 3 |
| Li$_2$O | K$_2$O = 2.4 | 10.0 |  |
| ZrO$_2$ |  | 1.5 |  |
| Sb$_2$O$_3$ |  | 0.2 | As$_2$O$_3$ = 0.3 |
| Others | Ga$_2$O$_3$ = 4.8 | K$_2$O = 3.2 V$_2$O$_5$ = 0.6 MnO$_2$ = 0.6 CuO = 0.6 | Nb$_2$O$_5$ = 3.0 CaO = 3.0 TiO$_2$ = 3.7 BaO = 5.0 |
| Nucleation temperature (° C.) | 800 | 540 | 720 |
| Crystallization temperature (° C.) | 950 | 700 | 880 |
| Predominant crystal phase | spinel MgAl$_2$O$_4$ | lithium disilicate Li$_2$Si$_2$O$_5$ | gahnite ZnAl$_2$O$_4$ |
| Average grain diameter (μm) | 0.10 μm | 0.10 μm | 0.05 μm |
| Amount of crystal (mass %) | 75 mass % | 30 mass % | 40 mass % |
| Degree of crystallization (mass %) | 75 | 30 | 40 |
| Coefficient of thermal expansion (×10$^{-7}$/° C.) (−50° C.–+70° C.) | 53 | 60 | 55 |
| Young's modulus (GPa) | 110.5 | 90 | 120 |
| Specific gravity | 3.24 | 2.50 | 3.05 |
| Young's modulus/specific gravity (GPa) | 34.1 | 36.0 | 39.3 |

The spacer rings for the information storage disk made of the glass-ceramics of Examples 1-1 to 1-14 and 3-1 to 3-8 and those of Comparative Examples 1-3 were manufactured by the following process. First, raw materials such as oxides, carbonates and nitrates were weighed and mixed to compose the oxide compositions of the tables and the mixtures were melted at a temperature within a range from about 1350° C. to 1500° C. by using a conventional melting device and homogenized by stirring. The melt was formed to a ring-shape and cooled to provide a glass form. It was heat treated under a temperature of 450–800° C. for about 1 to 7 hours for nucleation and further heat treated under a temperature of 700–980° C. for about 1 to 7 hours for crystallization. Further, the upper and lower surfaces of the product were lapped and polished to provide Ra of 0.1 μm and flatness of 0.3 μm whereby spacer rings for an information storage disk made of desired glass-ceramics in which a crystal phase was uniformly dispersed in glass matrix were obtained.

As shown in Tables 1 to 9, the spacer rings of Comparative Examples which are made of non-crystalline glass etc. have specific rigidity of less than 37 GPa or specific gravity exceeding 3.0 and therefore are not suitable for a high speed rotation type disk drive device and, in contrast thereto, the spacer rings made of the glass-ceramics of the invention have a relatively small specific gravity and a relatively high specific rigidity and thereby have capability of coping with the tendency to high speed rotation of the disk drive device. In Examples 1-1 to 1-14 which are examples of spacer rings made of glass-ceramics which contain lithium disilicate (Li$_2$O.2SiO$_2$) as a predominant crystal phase, the coefficient of thermal expansion within a range from −50° C. to +70° C. which is a temperature environment in which the product is used is within a range from +65×10$^{-7}$/° C. to +130×10$^{-7}$/° C. Thus, these Examples have a coefficient of thermal expansion which is substantially equal to typical coefficient of thermal expansion of other drive components for an information storage disk.-

The bending strength of Examples 1-1 to 1-9 was calculated by the cup type ring bending test on the basis of inner diameter, outer diameter, plate thickness, Poisson's ratio and maximum load with respect to a spacer ring of a ring shape having inner diameter of about 20.0 mm, outer diameter of about 23.5 mm and plate thickness of about 2.0 mm. The bending strength of the spacer rings of Examples 1-1 to 1-9 is within a range of 400 MPa–800 MPa and therefore is suitable for uses such as mobiles which require shock resistance property.

Preferred examples of the second aspect of the invention will be described below. Tables 10 to 12 show compositions, nucleation temperatures, crystallization temperatures, crystal phases, amount of crystal of the crystal phases and average crystal grain diameters of Examples (2-1 to 2-7) of the information storage disk holding members of the invention and two prior art glass-ceramics (Comparative Example 8: Japanese Patent Application Laid-open Publication No. Sho 62-72547 and Comparative Example 9: Japanese Patent Application Laid-open Publication No. Hei 9-35234). Tables 13 to 15 show coefficients of thermal expansion, values of Young's modulus, specific gravity, bending strength and alkali dissolving amount of the information storage disk holding members of Tables 10 to 12.

TABLE 10

| | Examples | | |
|---|---|---|---|
| | 2-1 | 2-2 | 2-3 |
| $SiO_2$ | 73.7 | 73.7 | 73.7 |
| $Li_2O$ | 6.6 | 6.6 | 6.6 |
| $P_2O_5$ | 1.9 | 1.9 | 1.9 |
| $ZrO_2$ | 3.0 | 3.0 | 3.0 |
| $Al_2O_3$ | 8.0 | 8.0 | 8.0 |
| MgO | 0.5 | 0.5 | 0.5 |
| ZnO | 0.5 | 0.5 | 0.5 |
| SrO | 0.5 | | 0.5 |
| BaO | | 0.5 | |
| $Y_2O_3$ | | | |
| $WO_3$ | | | 2.0 |
| $La_2O_3$ | 2.0 | | |
| $Bi_2O_3$ | | 2.0 | |
| $K_2O$ | 3.0 | 3.0 | 3.0 |
| $Na_2O$ | | | |
| $Sb_2O_3$ | | | |
| $As_2O_3$ | 0.3 | 0.3 | 0.3 |
| Nucleation temperature (° C.) | 540 | 540 | 540 |
| Crystallization temperature (° C.) | 740 | 750 | 760 |
| Predominant crystal phase | α-quartz α-$SiO_2$ | lithium disilicate $Li_2Si_2O_5$ | lithium disilicate $Li_2Si_2O_5$ |
| Average grain diameter (μm) | 0.01 μm | <0.01 μm | 0.01 μm |
| Amount of crystal (mass %) | 10% | 20% | 25% |
| Predominant crystal phase | lithium disilicate $Li_2Si_2O_5$ | α-quartz α-$SiO_2$ | α-quartz α-$SiO_2$ |
| Average grain diameter (μm) | <0.01 μm | 0.01 μm | 0.02 μm |
| Amount of crystal (mass %) | 15% | 16% | 20% |

TABLE 11

| | Examples | | |
|---|---|---|---|
| | 2-4 | 2-5 | 2-6 |
| $SiO_2$ | 73.7 | 73.7 | 73.7 |
| $Li_2O$ | 6.6 | 6.6 | 6.6 |
| $P_2O_5$ | 1.9 | 1.9 | 1.9 |
| $ZrO_2$ | 3.0 | 3.0 | 3.0 |
| $Al_2O_3$ | 8.0 | 8.0 | 8.0 |
| MgO | 0.5 | 0.5 | 0.5 |
| ZnO | 0.5 | 0.5 | 0.5 |
| SrO | 0.5 | 0.5 | 0.5 |
| BaO | | | |
| $Y_2O_3$ | 2.0 | | |
| $WO_3$ | | | |
| $La_2O_3$ | | 1.0 | 2.0 |
| $Bi_2O_3$ | | 1.0 | |
| $K_2O$ | 3.0 | 3.0 | 2.0 |
| $Na_2O$ | | | 1.0 |
| $Sb_2O_3$ | | | |
| $As_2O_3$ | 0.3 | 0.3 | 0.3 |
| Nucleation temperature (° C.) | 440 | 440 | 500 |
| Crystallization temperature (° C.) | 720 | 740 | 760 |
| Predominant crystal phase | α-quartz α-$SiO_2$ | lithium disilicate $Li_2Si_2O_5$ | lithium disilicate $Li_2Si_2O_5$ |
| Average grain diameter (μm) | 0.01 μm | <0.01 μm | 0.01 μm |
| Amount of crystal (mass %) | 10% | 20% | 35% |
| Predominant crystal phase | lithium disilicate $Li_2Si_2O_5$ | α-quartz α-$SiO_2$ | α-quartz α-$SiO_2$ |
| Average grain diameter (μm) | <0.01 μm | 0.01 μm | 0.02 μm |
| Amount of crystal (mass %) | 15% | 30% | 33% |

TABLE 12

| | Example | Comparative Examples | |
|---|---|---|---|
| | 2-7 | 4 | 5 |
| $SiO_2$ | 73.7 | 74.2 | 76.1 |
| $Li_2O$ | 6.6 | 9.6 | 11.8 |
| $P_2O_5$ | 2.0 | 1.5 | 2.0 |
| $ZrO_2$ | 3.0 | 0.4 | |
| $Al_2O_3$ | 8.0 | 9.6 | 7.1 |
| MgO | 0.5 | PbO = 2.3 | |
| ZnO | 0.5 | | |
| SrO | 0.5 | | |
| BaO | | | |
| $Y_2O_3$ | 0.5 | | |
| $WO_3$ | 0.5 | | |
| $La_2O_3$ | 0.5 | | |
| $Bi_2O_3$ | 0.5 | | |
| $K_2O$ | 2.0 | 2.4 | 2.8 |
| $Na_2O$ | 0.9 | | |
| $Sb_2O_3$ | | | 0.2 |
| $As_2O_3$ | 0.3 | | |
| Nucleation temperature (° C.) | 560 | 540 | 500 |
| Crystallization temperature (° C.) | 750 | 800 | 860 |
| Predominant crystal phase | lithium disilicate $Li_2Si_2O_5$ | lithium disilicate $Li_2Si_2O_5$ | lithium disilicate $Li_2Si_2O_5$ |
| Average grain diameter (μm) | 0.01 μm | 1.5 μm | 0.1 μm |
| Amount of crystal (mass %) | 28% | 45% | 48% |
| Predominant crystal phase | α-quartz α-$SiO_2$ $Li_2Si_2O_5$ | α-cristobalite α-$SiO_2$ | β-spodumene β-$Li_2O$ $Al_2O_3 \cdot 4SiO_2$ |
| Average grain diameter (μm) | 0.02 μm | 0.3 μm | 0.2 μm |
| Amount of crystal (mass %) | 25% | 16% | 21% |

TABLE 13

| | Examples | | |
|---|---|---|---|
| | 2-1 | 2-2 | 2-3 |
| Coefficient of thermal expansion ($\times 10^{-7}/°$ C.) (-50° C.–+70° C.) | 72 | 95 | 110 |
| Young's modulus (GPa) | 110 | 114 | 110 |
| Specific gravity | 2.55 | 2.56 | 2.57 |
| Young's modulus(GPa)/specific gravity | 43.1 | 44.5 | 42.8 |
| Bending strength (MPa) | 510 | 600 | 750 |
| Alkali dissolving amount | | | |
| Li ($\mu$g/Disk) | 0.300 | 0.300 | 0.300 |
| Na ($\mu$g/Disk) | 0.005 | 0.005 | 0.005 |
| K ($\mu$g/Disk) | 0.090 | 0.080 | 0.090 |
| Total ($\mu$g/Disk) | 0.395 | 0.385 | 0.395 |
| Total ($\mu$g/cm$^2$) | 0.0064 | 0.0062 | 0.0064 |

TABLE 14

| | Examples | | |
|---|---|---|---|
| | 2-4 | 2-5 | 2-6 |
| Coefficient of thermal expansion ($\times 10^{-7}/°$ C.) (-50° C.–+70° C.) | 78 | 115 | 125 |
| Young's modulus (GPa) | 115 | 120 | 110 |
| Specific gravity | 2.52 | 2.55 | 2.58 |
| Young's modulus(GPa)/specific gravity | 45.6 | 47.1 | 42.6 |
| Bending strength (MPa) | 480 | 630 | 710 |
| Alkali dissolving amount | | | |
| Li ($\mu$g/Disk) | 0.400 | 0.300 | 0.200 |
| Na ($\mu$g/Disk) | 0.004 | 0.006 | 0.005 |
| K ($\mu$g/Disk) | 0.080 | 0.070 | 0.030 |
| Total ($\mu$g/Disk) | 0.484 | 0.376 | 0.235 |
| Total ($\mu$g/cm$^2$) | 0.0078 | 0.0061 | 0.0038 |

TABLE 15

| | Example | Comparative Example | |
|---|---|---|---|
| | 2-7 | 4 | 5 |
| Coefficient of thermal expansion ($\times 10^{-7}/°$) (-50° C.–+70° C.) | 119 | 48 | 49 |
| Young's modulus (GPa) | 118 | 86 | 82 |
| Specific gravity | 2.57 | 2.46 | 2.55 |
| Young's modulus(GPa)/specific gravity | 45.9 | 35.0 | 32.2 |
| Bending strength (MPa) | 720 | 320 | 300 |
| Alkali dissolving amount | | | |
| Li ($\mu$g/Disk) | 0.100 | 2.800 | 3.000 |
| Na ($\mu$g/Disk) | 0.003 | 0.010 | 0.013 |
| K ($\mu$g/Disk) | 0.060 | 0.100 | 0.110 |
| Total ($\mu$g/Disk) | 0.163 | 2.910 | 3.123 |
| Total ($\mu$g/cm$^2$) | 0.0026 | 0.0471 | 0.0506 |

Raw materials such as oxides, carbonates and nitrates were mixed and were melted at a temperature within a range from about 1350° C. to 1450° C. by using a conventional melting device and homogenized by stirring. The melt was formed to a disk-shape and cooled to provide a glass form. It was heat treated under a temperature of 400–600° C. for about 1 to 7 hours for nucleation and further heat treated under a temperature of 700–760° C. for about 1 to 7 hours for crystallization to provide desired glass-ceramics.

Average crystal grain diameter of each crystal phase was measured by a transmission electron microscope (TEM). Type of each crystal phase was determined by X-ray diffraction analysis (XRD) device and amount of crystal was measured by preparing a 100% crystal standard specimen for each crystal type and measuring a diffraction peak area by using the internal standard method.

The bending strength was calculated by the cup type ring bending test on the basis of inner diameter, outer diameter, plate thickness, Poission's ratio and maximum load.

Measurement of alkali dissolving amount was conducted by using ion chromatography. Each information storage disk holding member obtained in the above described manner was soaked in 80 ml of pure water at 30° C. for 3 hours and the alkali dissolving amount of the substrate was calculated from concentration of alkali which solved out in the pure water.

As shown in Tables 10 to 12, the information storage disk holding members of the present invention comprise lithium disilicate ($Li_2Si_2O_5$) and α-quartz as predominant crystal phases and have fine crystal grains of 0.02 $\mu$m or below which are substantially spherical. In contrast, the glass-ceramic of Comparative Example 4 comprises lithium disilicate having an average crystal grain diameter of 1.5 $\mu$m and the glass-ceramic of Comparative Example 5 comprises β-spodumene having an average crystal grain diameter of 0.2 $\mu$m and both have a relatively large acicular shape or rice grain shape.

As to the coefficient of thermal expansion ($\times 10^{-7}/°$ C.), Comparative Examples 4 and 5 are low expansion glass-ceramics having a coefficient of less than 50. Further, the glass-ceramics of Comparative Examples 4 and 5 are materials of low Young's modulus and low strength, showing Young's modulus of not greater than 84 GPa and bending strength of not greater than 320 MPa.

Preferred examples of the fourth aspect of the invention will now be described. Tables 16 to 18 show compositions of Examples (4-1 to 4-9) of the information storage disk holding members of the invention and those of Comparative Examples (Comparative Example 6: Japanese Patent Application Laid-open Publication No. Hei 8-48537, the prior art alumino-silicate glass which is a type of chemically tempered glass, Comparative Example 7: Japanese Patent Application Laid-open Publication No. Hei 9-35234, $Li_2O$—$SiO_2$ glass-ceramics and Comparative Example 8: Japanese Patent Application Laid-open Publication No. Hei 9-77531, $SiO_2$—$Al_2O_3$—$MgO$—$ZnO$—$TiO_2$ glass-ceramics) together with nucleation temperature, crystallization temperature, crystal phase, crystal grain diameter, Young's modulus, Vickers' hardness, specific gravity and coefficient of thermal expansion within a range of -50° C.–+70° C. The precipitation ratio of the respective crystal phases was measured by preparing a 100% crystal standard specimen of each crystal phase and calculating a diffraction peak area by an X-ray diffraction (XRD) device using the internal standard method.

In Tables 16 to 18, magnesium titanate solid solution is expressed as magnesium titanate SS, spinel solid solution as spinel SS and solid solutions of other crystals are expressed by affixing "SS" to the names of the crystals (e.g., β-quartz solid solution is expressed as β-quartz SS).

TABLE 16

| | Examples | | |
|---|---|---|---|
| | 4-1 | 4-2 | 4-3 |
| $SiO_2$ | 49.0 | 49.0 | 51.0 |
| MgO | 14.0 | 15.0 | 14.0 |
| $Al_2O_3$ | 17.0 | 16.0 | 17.0 |
| CaO | 1.7 | 1.7 | 1.4 |
| SrO | 1.7 | 1.7 | 1.4 |
| BaO | 4.2 | 4.2 | 3.5 |
| $ZrO_2$ | 1.4 | 1.4 | 0.8 |
| $TiO_2$ | 9.0 | 9.0 | 9.0 |
| $Bi_2O_3$ | 1.8 | 1.8 | 1.7 |
| $Sb_2O_3$ | 0.2 | 0.2 | 0.2 |
| Nucleation temperature:time | 700° C.:5 Hr | 700° C.:3 Hr | 700° C.:8 Hr |
| Crystallization temperature:time | 900° C.:3 Hr | 950° C.:7 Hr | 950° C.:5 Hr |
| Predominant crystal phase | enstatite $MgSiO_3$ magnesium titanate SS $MgTi_2O_5$ SS | magnesium titanate SS $MgTi_2O_5$ SS enstatite $MgSiO_3$ | magnesium titanate SS $MgTi_2O_5$ SS enstatite $MgSiO_3$ |
| Average grain diameter (μm) | 0.1 μm | 0.1 μm | 0.1 μm |
| Young's modulus (GPa) | 116 | 125 | 120 |
| Vickers' hardness | 720 | 780 | 800 |
| Specific gravity | 2.97 | 3.03 | 2.95 |
| Coefficient of thermal expansion (×10⁻⁷/° C.) (−50° C.→70° C.) | 51 | 49 | 50 |

TABLE 17

| | Examples | | |
|---|---|---|---|
| | 4-4 | 4-5 | 4-6 |
| $SiO_2$ | 45.5 | 45.5 | 52.7 |
| MgO | 17.0 | 17.0 | 15.0 |
| $Al_2O_3$ | 19.0 | 19.0 | 16.0 |
| CaO | 1.2 | 1.2 | 1.4 |
| SrO | 1.2 | 1.2 | 1.4 |
| BaO | 1.4 | 1.4 | 3.5 |
| $ZrO_2$ | | | 0.8 |
| $TiO_2$ | 9.5 | 9.5 | 9.0 |
| $Bi_2O_3$ | 5.0 | 2.5 | |
| $Sb_2O_3$ | 0.2 | 0.2 | 0.2 |
| Other ingredient | | 2.5($WO_3$) | |
| Nucleation temperature:time | 700° C.:9 Hr | 700° C.:3 Hr | 700° C.:5 Hr |
| Crystallization temperature:time | 900° C.:5 Hr | 950° C.:5 Hr | 950° C.:2 Hr |
| Predominant crystal phase | enstatite $MgSiO_3$ spinel SS $MgAl_2O_4$ SS | enstatite $MgSiO_3$ spinel SS $MgAl_2O_4$ SS | enstatite $MgSiO_3$ magnesium titanate SS $MgT_2O_5$ SS |
| Average grain diameter (μm) | 0.1 μm | 0.1 μm | 0.1 μm |
| Young's modulus (GPa) | 135 | 123 | 120 |
| Vickers' hardness | 800 | 810 | 820 |
| Specific gravity | 2.97 | 3.10 | 2.91 |
| Coefficient of thermal expansion (×10⁻⁷/° C.) (−50° C.→70° C.) | 51 | 48 | 51 |

TABLE 18

| | Examples | | |
|---|---|---|---|
| | 4-7 | 4-8 | 4-9 |
| $SiO_2$ | 55.0 | 51.0 | 44.0 |
| MgO | 10.0 | 15.0 | 18.0 |
| $Al_2O_3$ | 17.5 | 16.0 | 19.0 |
| CaO | 1.2 | 1.4 | 1.0 |
| SrO | 1.2 | 1.4 | 1.0 |
| BaO | 1.9 | 3.5 | 2.5 |
| $ZrO_2$ | | 0.8 | |
| $TiO_2$ | 9.5 | 9.0 | 10.0 |
| $Bi_2O_3$ | 3.0 | 1.7 | 4.0 |
| $Sb_2O_3$ | 0.2 | 0.2 | 0.5 |
| Other ingredient | | | |
| Nucleation temperature:time | 700° C.:3 Hr | 700° C.:5 Hr | 700° C.:5 Hr |
| Crystallization temperature:time | 950° C.:5 Hr | 1000° C.:1 Hr | 900° C.:5 Hr |
| Predominant crystal phase | magnesium titanate SS $MgTi_2O_5$ SS enstatite $MgSiO_3$ β-quartz Ss β-$SiO_2$ SS | enstatite $MgSiO_3$ magnesium titanate SS $MgTi_2O_5$ SS rutile $TiO_2$ | enstatite $MgSiO_3$ spinel SS $MgAl_2O_4$ SS |
| Average grain diameter (μm) | 0.1–0.2 μm | 0.1–0.3 μm | 0.1 μm |
| Young's modulus (GPa) | 130 | 123 | 148 |
| Vickers' hardness | 810 | 840 | 790 |
| Specific gravity | 2.88 | 2.97 | 3.15 |
| Coefficient of thermal expansion (×10⁻⁷/° C.) (−50° C.→70° C.) | 53 | 50 | 50 |

TABLE 19

| | Comparative Examples | | |
|---|---|---|---|
| | 6 | 7 | 8 |
| $SiO_2$ | 62.0 | 78.5 | 49.0 |
| MgO | | | 12.0 |
| $Al_2O_3$ | 16.0 | 4.4 | 24.8 |
| $P_2O_5$ | | 2.0 | |
| ZnO | | | 5.0 |
| $TiO_2$ | | | 10.0 |
| $Li_2O$ | 7.0 | 12.5 | |
| Other alkali ingredients | 9.0($Na_2O$) | 2.8($K_2O$) | |
| $ZrO_2$ | 4.0 | | |
| $Sb_2O_3$ | 0.5 | 0.2 | |
| Other ingredient | | | $As_2O_3$ = 0.5 |
| Nucleation temperature:time | 450° C.:5 Hr | | 700° C.:5 Hr |
| Crystallization temperature:time | 850° C.:5 Hr | | 965° C.:5 Hr |
| Predominant crystal phase | lithium dsilicate $Li_2Si_2O_5$ | | spinel $MgAl_2O_4$ |
| Average grain diameter | 0.10 μm | | 0.10 μm |
| Amount of crystal | 25 mass % | | |
| Predominant crystal phases | α-cristobalite α-$SiO_2$ | | enstatite $MgSiO_3$ |
| Average grain diameter | | 0.30 μm | 0.10 μm |
| Degree of crystallization (mass %) | 0 | 45 | |
| Young's modulus (GPa) | 82 | 92 | 119 |
| Specific gravity | 2.54 | 2.51 | 2.87 |
| Vickers' hardness | 640 | 760 | 1000 |
| Coefficient of thermal expansion (×10⁻⁷/° C.) (−50° C.→70° C.) | 70 | 61 | 53 |

Raw materials such as oxides, carbonates and nitrates were mixed and were melted at a temperature within a range from about 1350° C. to 1490° C. by using a conventional melting device and homogenized by stirring. The melt was formed to a disk-shape and cooled to provide a glass form. It was heat treated under a temperature of 650–750° C. for about 1 to 12 hours for nucleation and further heat treated under a temperature of 850–1000° C. for about 1 to 12 hours for crystallization to provide desired glass-ceramics.

As shown in Tables 16 to 19, the glass-ceramics of the present invention are different in the crystal phases from Comparative Examples of the prior art alumino-silicate chemically tempered glass, $Li_2O$—$SiO_2$ glass-ceramics and $SiO_2$—$Al_2O_3$—$MgO$—$ZnO$—$TiO_2$ glass-ceramics and are of higher rigidity in terms of Young's modulus than the alumino-silicate chemically tempered glass and the $Li_2O$—$SiO_2$ glass-ceramics. The $SiO_2$—$Al_2O_3$—$MgO$—$ZnO$—$TiO_2$ glass-ceramics of Comparative Example 8 are very hard material having Vickers' hardness of 1000 (9800 N/mm$^2$) as the surface hardness and therefore are difficult to process. In contrast, the glass-ceramics of the invention have Vickers' hardness of 850 (8330 N/mm$^2$) as the surface hardness and sufficient smoothness can be obtained in normal polishing. Moreover, the glass-ceramics of the invention have no defects such as crystal anisotropy, foreign matters and impurities, have a dense, homogeneous and fine (the grain diameter of the precipitating crystals is 0.3 μm or below) and have chemical durability by which the glass-ceramics can stand rinsing or etching with various chemicals and water.

Preferred examples of the fifth aspect of the invention will now be described. Tables 20 to 24 show examples (5-1 to 5-14) of compositions, nucleation temperature, crystallization temperature, crystal phase, crystal grain diameter, Young's modulus, specific gravity, Young's modulus (GPa)/ specific gravity, and coefficient of thermal expansion within a range of −50° C.−+70° C. of the information storage disk holding members of the invention. B-quartz solid solution is expressed as β-quartz SS.

TABLE 20

|  | Examples | | |
|---|---|---|---|
|  | 5-1 | 5-2 | 5-3 |
| $SiO_2$ | 52.2 | 52.2 | 52.2 |
| MgO | 12.0 | 12.0 | 12.0 |
| $Al_2O_3$ | 17.0 | 16.0 | 16.0 |
| $P_2O_5$ | 1.5 | 1.5 | 1.5 |
| $B_2O_3$ | 3.0 | 3.5 | 4.0 |
| $Li_2O$ | 2.0 | 2.5 | 2.0 |
| CaO | 2.0 | 2.0 | 2.0 |
| $ZrO_2$ | 2.0 | 1.5 | 1.5 |
| $TiO_2$ | 5.0 | 5.5 | 5.5 |
| $Sb_2O_3$ | 0.3 | 0.3 | 0.3 |
| $As_2O_3$ |  |  |  |
| $SnO_2$ | 1.5 | 1.5 | 1.5 |
| $MoO_3$ | 1.5 | 1.5 | 1.5 |
| CeO |  |  |  |
| $Fe_2O_3$ |  |  |  |
| Nucleation temperature | 650 | 600 | 650 |
| Crystallization temperature | 1000 | 800 | 900 |
| Predominant crystal phase | β-quartz SS | β-quartz SS | β-quartz SS |
| Average grain diameter | 0.1 μm | 0.1 μm | 0.1 μm |
| Predominant crystal phase | enstatite | enstatite | enstatite |
| Average grain diameter | 0.05 μm | 0.05 μm | 0.05 μm |
| Young's modulus (GPa) | 120 | 128 | 135 |
| Specific gravity | 2.65 | 2.65 | 2.67 |
| Young's modulus(GPa)/ specific gravity | 45.3 | 48.3 | 50.6 |
| Coefficient of thermal expansion (×10$^{-7}$/° C.) (−50° C.−+70° C.) | 43 | 48 | 45 |

TABLE 21

|  | Examples | | |
|---|---|---|---|
|  | 5-4 | 5-5 | 5-6 |
| $SiO_2$ | 52.2 | 56.0 | 41.0 |
| MgO | 12.0 | 13.0 | 16.0 |
| $Al_2O_3$ | 16.0 | 15.0 | 20.0 |
| $P_2O_5$ | 1.5 | 1.5 | 2.0 |
| $B_2O_3$ | 3.5 | 3.5 | 4.0 |
| $Li_2O$ | 2.0 | 2.5 | 2.0 |
| CaO | 2.5 | 3.5 | 3.9 |
| $ZrO_2$ | 1.5 | 1.0 | 2.5 |
| $TiO_2$ | 5.5 | 3.5 | 3.5 |
| $Sb_2O_3$ | 0.3 | 0.5 | 0.2 |
| $As_2O_3$ |  |  |  |
| $SnO_2$ | 1.5 |  | 4.9 |
| $MoO_3$ | 1.5 |  |  |
| CeO |  |  |  |
| $Fe_2O_3$ |  |  |  |
| Nucleation temperature | 700 | 650 | 670 |
| Crystallization temperature | 1000 | 750 | 800 |
| Predominant crystal phase | β-quartz SS | β-quartz SS | β-quartz SS |
| Average grain diameter | 0.1 μm | 0.1 μm | 0.1 μm |
| Predominant crystal phase | enstatite | enstatite | enstatite |
| Average grain diameter | 0.05 μm | 0.05 μm | 0.05 μm |
| Young's modulus (GPa) | 157 | 120 | 122 |
| Specific gravity | 2.71 | 2.50 | 2.53 |
| Young's modulus(GPa)/ specific gravity | 57.9 | 48.0 | 48.2 |
| Coefficient of thermal expansion (×10$^{-7}$/° C.) (−50° C.−+70° C.) | 41 | 50 | 48 |

TABLE 22

|  | Examples | | |
|---|---|---|---|
|  | 5-7 | 5-8 | 5-9 |
| $SiO_2$ | 51.4 | 46.1 | 49.0 |
| MgO | 11.0 | 18.0 | 19.0 |
| $Al_2O_3$ | 18.0 | 15.0 | 11.0 |
| $P_2O_5$ | 2.0 | 0.5 | 2.5 |
| $B_2O_3$ | 1.4 | 1.5 | 3.5 |
| $Li_2O$ | 0.5 | 3.5 | 3.9 |
| CaO | 2.5 | 3.5 | 0.5 |
| $ZrO_2$ | 0.5 | 1.0 | 4.7 |
| $TiO_2$ | 7.7 | 7.5 | 2.5 |
| $Sb_2O_3$ | 0.01 | 0.01 | 0.1 |
| $As_2O_3$ | 0.09 | 0.39 | 0.3 |
| $SnO_2$ |  | 1.5 | 1.5 |
| $MoO_3$ |  | 1.5 | 1.5 |
| CeO | 4.9 |  |  |
| $Fe_2O_3$ |  |  |  |
| Nucleation temperature | 690 | 710 | 730 |
| Crystallization temperature | 850 | 900 | 1000 |
| Predominant crystal phase | β-quartz SS | β-quartz SS | β-quartz SS |
| Average grain diameter | 0.1 μm | 0.1 μm | 0.1 μm |
| Predominant crystal phase | enstatite | enstatite | enstatite |
| Average grain diameter | 0.05 μm | 0.05 μm | 0.20 μm |
| Young's modulus (GPa) | 128 | 130 | 140 |
| Specific gravity | 2.62 | 2.70 | 2.80 |
| Young's modulus(GPa)/ specific gravity | 48.9 | 48.1 | 50.0 |
| Coefficient of thermal expansion (×10$^{-7}$/° C.) (−50° C.−+70° C.) | 47 | 45 | 37 |

TABLE 23

|  | Examples | | |
|---|---|---|---|
|  | 5-10 | 5-11 | 5-12 |
| $SiO_2$ | 59.7 | 56.8 | 60.0 |
| MgO | 13.0 | 14.0 | 10.5 |
| $Al_2O_3$ | 12.0 | 14.0 | 16.0 |
| $P_2O_5$ | 1.0 | 1.0 | 1.0 |
| $B_2O_3$ | 2.5 | 2.0 | 1.0 |
| $Li_2O$ | 1.0 | 1.0 | 0.7 |
| CaO | 0.5 | 1.0 | 1.0 |
| $ZrO_2$ | 3.0 | 0.5 | 3.5 |
| $TiO_2$ | 4.0 | 4.5 | 6.0 |
| $Sb_2O_3$ | 0.3 | 0.3 | 0.3 |
| $As_2O_3$ |  |  |  |
| $SnO_2$ |  |  |  |
| $MoO_3$ | 3.0 |  |  |
| CeO |  |  |  |
| $Fe_2O_3$ |  | 4.9 |  |
| Nucleation temperature | 750 | 650 | 680 |
| Crystallization temperature | 950 | 980 | 1050 |
| Predominant crystal phase | β-quartz SS | β-quartz SS | β-quartz SS |
| Average grain diameter | 0.1 μm | 0.1 μm | 0.1 μm |
| Predominant crystal phase | enstatite | enstatite | enstatite |
| Average grain diameter | 0.05 μm | 0.05 μm | 0.10 μm |
| Young's modulus (GPa) | 141 | 135 | 148 |
| Specific gravity | 2.81 | 2.78 | 2.90 |
| Young's modulus(GPa)/ specific gravity | 50.2 | 48.6 | 48.6 |
| Coefficient of thermal expansion (×10$^{-7}$/° C.) (−50° C.−+70° C.) | 41 | 39 | 38 |

TABLE 24

|  | Examples | |
|---|---|---|
|  | 5-13 | 5-14 |
| $SiO_2$ | 49.2 | 41.0 |
| MgO | 12.0 | 16.0 |
| $Al_2O_3$ | 17.0 | 20.0 |
| $P_2O_5$ | 1.5 | 2.0 |
| $B_2O_3$ | 3.0 | 4.0 |
| $Li_2O$ | 2.0 | 2.0 |
| CaO | 2.0 | 3.9 |
| $ZrO_2$ | 2.0 | 2.5 |
| $TiO_2$ | 5.0 | 3.5 |
| $Sb_2O_3$ | 0.3 | 0.2 |
| $As_2O_3$ |  |  |
| $SnO_2$ | 1.5 | 4.9 |
| $MoO_3$ | 1.5 |  |
| CeO | 3.0 |  |
| $Fe_2O_3$ |  |  |
| Nucleation temperature | 650 | 670 |
| Crystallization temperature | 900 | 850 |
| Predominant crystal phase | β-quartz SS | β-quartz SS |
| Average grain diameter | 0.1 μm | 0.1 μm |
| Predominant crystal phase | enstatite | forsterite |
| Average grain diameter | 0.05 μm | 0.05 μm |
| Young's modulus (GPa) | 128 | 125 |
| Specific gravity | 2.75 | 2.58 |
| Young's modulus(GPa)/ specific gravity | 46.5 | 48.4 |
| Coefficient of thermal expansion (×10$^{-7}$/° C.) (−50° C.−+70° C.) | 40 | 48 |

In the examples of Tables 20 to 24, raw materials such as oxides, carbonates and nitrates were mixed and were melted at a temperature within a range from about 1350° C. to 1490° C. by using a conventional melting device and homogenized by stirring. The melt was formed to a disk-shape and cooled to provide a glass form. It was heat treated under a temperature of 650–750° C. for about 1 to 12 hours for nucleation and further heat treated under a temperature of 750–1050° C. for about 1 to 12 hours for crystallization to provide desired glass-ceramics.

As shown in Tables 20 to 24, the glass-ceramics of the invention have excellent processability and desired smoothness can be sufficiently achieved and, further, have no defects such as crystal anisotropy, foreign matters and impurities, have a dense, homogeneous and fine texture and have chemical durability by which the glass-ceramics can stand rinsing or etching with various chemicals and water.

Preferred examples of the sixth aspect of the invention will now be described. Tables 25 to 33 show examples (6-1 to 6-27) of compositions, nucleation temperature, crystallization temperature, crystal phase, crystal grain diameter, Young's modulus, specific gravity, Young's modulus (GPa)/ specific gravity, and coefficient of thermal expansion within a range of −50° C.−+70° C. of the information storage disk holding members of the invention. B-quartz solid solution is expressed as β-quartz SS.

TABLE 25

|  | Examples | | |
|---|---|---|---|
|  | 6-1 | 6-2 | 6-3 |
| $SiO_2$ | 54.0 | 56.8 | 57.5 |
| MgO | 14.0 | 16.0 | 16.0 |
| $Al_2O_3$ | 19.5 | 17.0 | 14.0 |
| $P_2O_5$ |  |  | 1.0 |
| $B_2O_3$ |  | 1.0 | 2.0 |
| CaO | 2.0 | 2.2 | 2.5 |
| BaO | 2.0 |  |  |
| $ZrO_2$ |  |  | 0.5 |
| $TiO_2$ | 5.0 | 5.5 | 6.0 |
| $Sb_2O_3$ |  |  |  |
| $As_2O_3$ | 0.5 | 0.5 | 0.5 |
| F |  |  |  |
| $Fe_2O_3$ | 3.0 | 1.0 |  |
| Nucleation temperature | 670 | 700 | 680 |
| Crystallization temperature | 1000 | 950 | 930 |
| Predominant crystal phase | cordierite | cordierite | cordierite |
| Average grain diameter | 0.3 μm | 0.3 μm | 0.3 μm |
| Predominant crystal phase | spinel | spinel | enstatite |
| Average grain diameter | 0.1 μm | 0.1 μm | 0.1 μm |
| Young's modulus (GPa) | 135 | 128 | 143 |
| Specific gravity | 2.65 | 2.60 | 2.58 |
| Young's modulus(GPa)/ specific gravity | 50.9 | 49.2 | 55.4 |
| Coefficient of thermal expansion (×10$^{-7}$/° C.) (−50° C.−+70° C.) | 37 | 35 | 46 |

TABLE 26

|  | Examples | | |
|---|---|---|---|
|  | 6-4 | 6-5 | 6-6 |
| $SiO_2$ | 57.1 | 45.6 | 56.0 |
| MgO | 14.0 | 18.0 | 10.4 |
| $Al_2O_3$ | 17.9 | 19.5 | 15.0 |
| $P_2O_5$ |  | 3.0 |  |
| $B_2O_3$ | 3.0 | 2.5 | 3.0 |
| CaO | 2.0 | 2.0 | 3.8 |
| BaO |  | 0.5 |  |
| $ZrO_2$ |  |  |  |
| $TiO_2$ | 5.5 | 8.0 | 7.0 |
| $Sb_2O_3$ |  |  |  |
| $As_2O_3$ | 0.5 | 0.9 |  |
| F |  |  |  |
| $Fe_2O_3$ |  |  | 4.8 |
| Nucleation temperature | 650 | 650 | 720 |
| Crystallization temperature | 980 | 940 | 1000 |
| Predominant crystal phase | cordierite | cordierite | cordierite |

TABLE 26-continued

| | Examples | | |
|---|---|---|---|
| | 6-4 | 6-5 | 6-6 |
| Average grain diameter | 0.3 μm | 0.3 μm | 0.3 μm |
| Predominant crystal phase | β-quartz | β-quartz | β-quartz |
| Average grain diameter | 0.1 μm | 0.1 μm | 0.1 μm |
| Young's modulus (GPa) | 133 | 121 | 141 |
| Specific gravity | 2.64 | 2.50 | 2.90 |
| Young's modulus(GPa)/specific gravity | 50.4 | 48.4 | 48.6 |
| Coefficient of thermal expansion ($\times 10^{-7}/°C$) ($-50°C.\rightarrow 70°C.$) | 30 | 48 | 36 |

TABLE 27

| | Examples | | |
|---|---|---|---|
| | 6-7 | 6-8 | 6-9 |
| $SiO_2$ | 59.5 | 60.0 | 41.7 |
| MgO | 17.0 | 19.5 | 17.0 |
| $Al_2O_3$ | 12.0 | 10.9 | 18.7 |
| $P_2O_5$ | 3.0 | 0.9 | 3.9 |
| $B_2O_3$ | 2.0 | 1.5 | 1.0 |
| CaO | 0.5 | | 3.8 |
| BaO | 2.0 | | |
| $ZrO_2$ | | | 2.8 |
| $TiO_2$ | 4.0 | 3.5 | 6.6 |
| $Sb_2O_3$ | | 0.9 | 0.5 |
| $As_2O_3$ | | | |
| F | | 2.8 | |
| $Fe_2O_3$ | | | 4.0 |
| Nucleation temperature | 700 | 730 | 750 |
| Crystallization temperature | 960 | 1000 | 1050 |
| Predominant crystal phase | cordierite | cordierite | cordierite |
| Average grain diameter | 0.3 μm | 0.3 μm | 0.3 μm |
| Predominant crystal phase | β-quartz | β-quartz | β-quartz |
| Average grain diameter | 0.1 μm | 0.1 μm | 0.1 μm |
| Young's modulus (GPa) | 138 | 120 | 151 |
| Specific gravity | 2.81 | 2.60 | 2.65 |
| Young's modulus(GPa)/specific gravity | 49.1 | 46.2 | 57.0 |
| Coefficient of thermal expansion ($\times 10^{-7}/°C$) ($-50°C.-+70°C.$) | 32 | 41 | 38 |

TABLE 28

| | Examples | | |
|---|---|---|---|
| | 6-10 | 6-11 | 6-12 |
| $SiO_2$ | 55.5 | 50.0 | 56.2 |
| MgO | 18.0 | 13.0 | 11.0 |
| $Al_2O_3$ | 10.0 | 18.0 | 14.5 |
| $P_2O_5$ | 1.0 | 3.1 | 2.0 |
| $B_2O_3$ | 3.5 | 3.9 | 3.0 |
| CaO | 3.0 | 1.0 | 4.0 |
| BaO | 1.0 | 3.0 | 4.8 |
| $ZrO_2$ | 5.0 | | |
| $TiO_2$ | 2.5 | 7.5 | 4.0 |
| $Sb_2O_3$ | 0.5 | 0.5 | 0.5 |
| $As_2O_3$ | | | |
| F | | | |
| $Fe_2O_3$ | | | |
| Nucleation temperature | 750 | 670 | 670 |
| Crystallization temperature | 1050 | 900 | 1050 |
| Predominant crystal phase | cordierite | cordierite | cordierite |
| Average grain diameter | 0.3 μm | 0.1 μm | 0.3 μm |
| Predominant crystal phase | β-quartz | β-quartz | β-quartz |
| Average grain diameter | 0.1 μm | 0.1 μm | 0.1 μm |
| Young's modulus (GPa) | 143 | 120 | 122 |

TABLE 28-continued

| | Examples | | |
|---|---|---|---|
| | 6-10 | 6-11 | 6-12 |
| Specific gravity | 2.90 | 3.10 | 2.70 |
| Young's modulus(GPa)/specific gravity | 49.3 | 38.7 | 45.2 |
| Coefficient of thermal expansion ($\times 10^{-7}/°C$) ($-50°C.\rightarrow 70°C.$) | 36 | 42 | 41 |

TABLE 29

| | Examples | | |
|---|---|---|---|
| | 6-13 | 6-14 | 6-15 |
| $SiO_2$ | 55.0 | 53.5 | 49.2 |
| MgO | 15.0 | 15.0 | 12.0 |
| $Al_2O_3$ | 17.0 | 18.0 | 17.0 |
| $P_2O_5$ | 1.0 | 2.0 | 1.5 |
| $B_2O_3$ | 2.0 | | 3.0 |
| $Li_2O$ | | | 2.0 |
| CaO | 1.0 | 2.0 | 2.0 |
| BaO | 4.0 | 2.0 | |
| $ZrO_2$ | | | 2.0 |
| $TiO_2$ | 4.5 | 7.0 | 5.0 |
| $Sb_2O_3$ | 0.5 | | 0.3 |
| $As_2O_3$ | | 0.5 | |
| $SnO_2$ | | | 1.5 |
| $MoO_3$ | | | 1.5 |
| CeO | | | 3.0 |
| $Fe_2O_3$ | | | |
| Nucleation temperature | 700 | 700 | 650 |
| Crystallization temperature | 950 | 970 | 900 |
| Predominant crystal phase | cordierite | cordierite | β-quartz SS |
| Average grain diameter | 0.3 μm | 0.3 μm | 0.1 μm |
| Predominant crystal phase | β-quartz | β-quartz | enstatite |
| Average grain diameter | 0.1 μm | 0.1 μm | 0.05 μm |
| Young's modulus (GPa) | 128 | 134 | 128 |
| Specific gravity | 2.80 | 2.77 | 2.75 |
| Young's modulus(GPa)/specific gravity | 44.4 | 48.4 | 46.5 |
| Coefficient of thermal expansion ($\times 10^{-7}/°C$) ($-50°C.\rightarrow 70°C.$) | 37 | 30 | 40 |

TABLE 30

| | Examples | | |
|---|---|---|---|
| | 6-16 | 6-17 | 6-18 |
| $SiO_2$ | 52.2 | 52.2 | 52.2 |
| MgO | 12.0 | 12.0 | 12.0 |
| $Al_2O_3$ | 17.0 | 16.0 | 16.0 |
| $P_2O_5$ | 1.5 | 1.5 | 1.5 |
| $B_2O_3$ | 3.0 | 3.5 | 4.0 |
| $Li_2O$ | 2.0 | 2.5 | 2.0 |
| CaO | 2.0 | 2.0 | 2.0 |
| $ZrO_2$ | 2.0 | 1.5 | 1.5 |
| $TiO_2$ | 5.0 | 5.5 | 5.5 |
| $Sb_2O_3$ | 0.3 | 0.3 | 0.3 |
| $As_2O_3$ | | | |
| $SnO_2$ | 1.5 | 1.5 | 1.5 |
| $MoO_3$ | 1.5 | 1.5 | 1.5 |
| CeO | | | 3.0 |
| $Fe_2O_3$ | | | |
| Nucleation temperature | 650 | 600 | 650 |
| Crystallization temperature | 1000 | 800 | 900 |
| Predominant crystal phase | β-quartz SS | β-quartz SS | β-quartz SS |
| Average grain diameter | 0.1 μm | 0.1 μm | 0.1 μm |
| Predominant crystal phase | enstatite | enstatite | enstatite |

TABLE 30-continued

| | Examples | | |
|---|---|---|---|
| | 6-16 | 6-17 | 6-18 |
| Average grain diameter | 0.05 μm | 0.05 μm | 0.05 μm |
| Young's modulus (GPa) | 120 | 128 | 135 |
| Specific gravity | 2.65 | 2.65 | 2.67 |
| Young's modulus(GPa)/ specific gravity | 45.3 | 48.3 | 50.6 |
| Coefficient of thermal expansion (×10$^{-7}$/° C.) (−50° C.→70° C.) | 43 | 48 | 45 |

TABLE 31

| | Examples | | |
|---|---|---|---|
| | 6-19 | 6-20 | 6-21 |
| SiO$_2$ | 52.2 | 56.0 | 41.0 |
| MgO | 12.0 | 13.0 | 16.0 |
| Al$_2$O$_3$ | 16.0 | 15.0 | 20.0 |
| P$_2$O$_5$ | 1.5 | 1.5 | 2.0 |
| B$_2$O$_3$ | 3.5 | 3.5 | 4.0 |
| Li$_2$O | 2.0 | 2.5 | 2.0 |
| CaO | 2.5 | 3.5 | 3.9 |
| ZrO$_2$ | 1.5 | 1.0 | 2.5 |
| TiO$_2$ | 5.5 | 3.5 | 3.5 |
| Sb$_2$O$_3$ | 0.3 | 0.5 | 0.2 |
| As$_2$O$_3$ | | | |
| SnO$_2$ | 1.5 | | 4.9 |
| MoO$_3$ | 1.5 | | |
| CeO | | | |
| Fe$_2$O$_3$ | | | |
| Nucleation temperature | 700 | 650 | 670 |
| Crystallization temperature | 1000 | 750 | 800 |
| Predominant crystal phase | β-quartz SS | β-quartz SS | β-quartz SS |
| Average grain diameter | 0.1 μm | 0.1 μm | 0.1 μm |
| Predominant crystal phase | enstatite | enstatite | enstatite |
| Average grain diameter | 0.05 μm | 0.05 μm | 0.05 μm |
| Young's modulus (GPa) | 157 | 120 | 122 |
| Specific gravity | 2.71 | 2.50 | 2.53 |
| Young's modulus(GPa)/ specific gravity | 57.9 | 48.0 | 48.2 |
| Coefficient of thermal expansion (×10$^{-7}$/° C.) (−50° C.→70° C.) | 41 | 50 | 48 |

TABLE 32

| | Examples | | |
|---|---|---|---|
| | 6-22 | 6-23 | 6-24 |
| SiO$_2$ | 51.4 | 46.1 | 49.0 |
| MgO | 11.0 | 18.0 | 19.0 |
| Al$_2$O$_3$ | 18.0 | 15.0 | 11.0 |
| P$_2$O$_5$ | 2.0 | 0.5 | 2.5 |
| B$_2$O$_3$ | 1.4 | 1.5 | 3.5 |
| Li$_2$O | 2.5 | 3.5 | 3.9 |
| CaO | 2.5 | 3.5 | 0.5 |
| ZrO$_2$ | 0.5 | 1.0 | 4.7 |
| TiO$_2$ | 7.7 | 7.5 | 2.5 |
| Sb$_2$O$_3$ | 0.01 | 0.01 | 0.1 |
| As$_2$O$_3$ | 0.09 | 0.39 | 0.3 |
| SnO$_2$ | | 1.5 | 1.5 |
| MoO$_3$ | | 1.5 | 1.5 |
| CeO | 4.9 | | |
| Fe$_2$O$_3$ | | | |
| Nucleation temperature | 690 | 710 | 730 |
| Crystallization temperature | 850 | 900 | 1000 |
| Predominant crystal phase | β-quartz SS | β-quartz SS | β-quartz SS |

TABLE 32-continued

| | Examples | | |
|---|---|---|---|
| | 6-22 | 6-23 | 6-24 |
| Average grain diameter | 0.1 μm | 0.1 μm | 0.1 μm |
| Predominant crystal phase | enstatite | enstatite | enstatite |
| Average grain diameter | 0.05 μm | 0.05 μm | 0.20 μm |
| Young's modulus (GPa) | 128 | 130 | 140 |
| Specific gravity | 2.62 | 2.70 | 2.80 |
| Young's modulus(GPa)/ specific gravity | 48.9 | 48.1 | 50.0 |
| Coefficient of thermal expansion (×10$^{-7}$/° C.) (−50° C.→70° C.) | 47 | 45 | 37 |

TABLE 33

| | Examples | | |
|---|---|---|---|
| | 6-25 | 6-26 | 6-27 |
| SiO$_2$ | 59.7 | 56.8 | 60.0 |
| MgO | 13.0 | 14.0 | 10.5 |
| Al$_2$O$_3$ | 12.0 | 14.0 | 16.0 |
| P$_2$O$_5$ | 1.0 | 1.0 | 1.0 |
| B$_2$O$_3$ | 2.5 | 2.0 | 1.0 |
| Li$_2$O | 1.0 | 1.0 | 0.7 |
| CaO | 0.5 | 1.0 | 1.0 |
| ZrO$_2$ | 3.0 | 0.5 | 3.5 |
| TiO$_2$ | 4.0 | 4.5 | 6.0 |
| Sb$_2$O$_3$ | 0.3 | 0.3 | 0.3 |
| As$_2$O$_3$ | | | |
| SnO$_2$ | | | |
| MoO$_3$ | 3.0 | | |
| CeO | | | |
| Fe$_2$O$_3$ | | 4.9 | |
| Nucleation temperature | 750 | 650 | 680 |
| Crystallization temperature | 950 | 980 | 1050 |
| Predominant crystal phase | β-quartz SS | β-quartz SS | β-quartz SS |
| Average grain diameter | 0.1 μm | 0.1 μm | 0.1 μm |
| Predominant crystal phase | enstatite | enstatite | enstatite |
| Average grain diameter | 0.05 μm | 0.05 μm | 0.10 μm |
| Young's modulus (GPa) | 141 | 135 | 148 |
| Specific gravity | 2.81 | 2.78 | 2.90 |
| Young's modulus(GPa)/ specific gravity | 50.2 | 48.6 | 48.6 |
| Coefficient of thermal expansion (×10$^{-7}$/° C.) (−50° C.→70° C.) | 41 | 39 | 38 |

In the above examples, raw materials such as oxides, carbonates and nitrates were mixed and were melted at a temperature within a range from about 1350° C. to 1490° C. by using a conventional melting device and homogenized by stirring. The melt was formed to a disk-shape and cooled to provide a glass form. It was heat treated under a temperature of 650–750° C. for about 1 to 12 hours for nucleation and further heat treated under a temperature of 750–1050° C. for about 1 to 12 hours for crystallization to provide desired glass-ceramics.

As shown in Tables 25 to 33, the glass-ceramics of the invention have excellent processability and, further, have no defects such as crystal anisotropy, foreign matters and impurities, have a dense, homogeneous and fine texture and have chemical durability by which the glass-ceramics can stand rinsing or etching with various chemicals and water.

Preferred examples of the seventh and eighth aspects of the invention will now be described. Tables 34 to 44 show examples (7-1 to 7-27, 8-1 to 8-23) of compositions, nucleation temperature, crystallization temperature, crystal phase, crystal grain diameter and coefficient of thermal expansion within a range of −60° C.−+600° C. of the information storage disk holding members of the invention. Table 45 shows compositions and the above mentioned properties of the prior art $Al_2O_3$—$SiO_2$ glass-ceramics (Comparative Example No. 9) and the prior art $Li_2O$—$SiO_2$ glass-ceramics (Comparative Example No. 10). As to the precipitated crystals in the tables, β-quartz is expressed as β-Q, B-quartz solid solution as β-Q- SS, β-spodumene as β-Sp, β-spodumene solid solution as β-Sp-SS, β-eurcyptite as β-Eu, β-eucryptite solid solution as β-Eu-SS, gahnite as Ga and gahnite solid solution as Ga-SS.

TABLE 34

| | Examples | | | | |
|---|---|---|---|---|---|
| | 7-1 | 7-2 | 7-3 | 7-4 | 7-5 |
| $SiO_2$ | 55.0 | 54.0 | 54.0 | 30.5 | 64.8 |
| $Al_2O_3$ | 18.5 | 18.0 | 18.0 | 20.0 | 12.0 |
| ZnO | 12.0 | 12.5 | 12.0 | 9.0 | 7.5 |
| MgO | 6.0 | 5.0 | 7.0 | 15.0 | 11.3 |
| $TiO_2$ | 6.0 | 4.5 | 5.0 | 3.0 | 1.7 |
| $B_2O_3$ | | 2.5 | | 7.5 | |
| $ZrO_2$ | | 1.0 | | | |
| $P_2O_5$ | | | | 1.0 | |
| $SnO_2$ | | | | | |
| CaO | | | 1.5 | 12.0 | |
| SrO | | | | | 1.7 |
| BaO | 2.0 | 1.0 | | | |
| $La_2O_3$ | | | | | |
| $Y_2O_3$ | | | 1.0 | | |
| $Gd_2O_3$ | | | | | |
| $Ta_2O_5$ | | | 1.0 | | |
| $Nb_2O_5$ | | | | | |
| $WO_3$ | | | | | |
| $Bi_2O_3$ | | | | | |
| $V_2O_5$ | | 1.0 | | | |
| $As_2O_3$ | 0.5 | 0.5 | 0.5 | 1.0 | 0.5 |
| $Sb_2O_3$ | | | 1.0 | | 0.5 |
| Nucleation temperature (° C.) | 690 | 700 | 720 | 650 | 740 |
| Crystallization temperature (° C.) | 850 | 900 | 850 | 760 | 940 |
| Predominant crystal phase | Ga | Ga | Ga | Ga-SS | Ga-SS |
| Average grain diameter (μm) | 0.005 | 0.007 | 0.010 | 0.005 | 0.007 |
| Coefficient of thermal expansion (× 10⁻⁷/° C.) (−60° C.−+600° C.) | 49 | 55 | 65 | 70 | 33 |

TABLE 35

| | Examples | | | | |
|---|---|---|---|---|---|
| | 7-6 | 7-7 | 7-8 | 7-9 | 7-10 |
| $SiO_2$ | 60.0 | 31.5 | 55.0 | 37.0 | 50.0 |
| $Al_2O_3$ | 5.2 | 34.8 | 5.6 | 8.5 | 28.2 |
| ZnO | 10.0 | 20.0 | 5.3 | 34.5 | 10.0 |
| MgO | 2.5 | 4.5 | 2.0 | 5.5 | 1.1 |
| $TiO_2$ | 13.5 | 2.0 | 11.4 | 4.5 | 1.8 |
| $B_2O_3$ | | | | | 0.8 |
| $ZrO_2$ | | 0.5 | 1.5 | 0.7 | |
| $P_2O_5$ | 2.5 | | 3.8 | 0.5 | |
| $SnO_2$ | | | 0.9 | | |
| CaO | | | | | 5.0 |
| SrO | | 5.5 | | | |
| BaO | 6.0 | | 13.0 | | |
| $La_2O_3$ | | | | | 2.5 |
| $Y_2O_3$ | | | | | |
| $Gd_2O_3$ | | | 1.0 | | 6.9 |
| $Ta_2O_5$ | | | | | |
| $Nb_2O_5$ | 0.3 | | | | |
| $WO_3$ | | | | | |
| $Bi_2O_3$ | | | 0.7 | | |
| $V_2O_5$ | | | 1.0 | | |
| $As_2O_3$ | | | | 0.5 | |
| $Sb_2O_3$ | | 0.5 | | 0.5 | 2.0 |

TABLE 35-continued

| | Examples | | | | |
|---|---|---|---|---|---|
| | 7-6 | 7-7 | 7-8 | 7-9 | 7-10 |
| Nucleation temperature (° C.) | 670 | 650 | 650 | 650 | 750 |
| Crystallization temperature (° C.) | 850 | 750 | 830 | 900 | 800 |
| Predominant crystal phase | Ga-SS | Ga-SS | Ga-SS | Ga-SS | Ga-SS |
| Average grain diameter (μm) | 0.004 | 0.001 | 0.001 | 0.010 | 0.001 |
| Coefficient of thermal expansion (× 10⁻⁷/° C.) (−60° C.−+600° C.) | 55 | 80 | 60 | 75 | 51 |

TABLE 36

| | Examples | | | | |
|---|---|---|---|---|---|
| | 7-11 | 7-12 | 7-13 | 7-14 | 7-15 |
| $SiO_2$ | 40.0 | 45.0 | 49.0 | 48.5 | 57.2 |
| $Al_2O_3$ | 25.0 | 15.0 | 17.0 | 22.5 | 25.5 |
| ZnO | 8.0 | 15.0 | 6.9 | 6.0 | 8.3 |
| MgO | 19.5 | 18.0 | 3.0 | 3.1 | 1.5 |
| $TiO_2$ | 2.0 | 1.0 | 15.0 | 3.1 | 1.5 |
| $B_2O_3$ | | | | 9.8 | |
| $ZrO_2$ | | 1.7 | 0.5 | | 1.8 |
| $P_2O_5$ | 1.5 | | | 0.1 | |
| $SnO_2$ | | | 0.1 | | |
| CaO | | | 2.5 | | |
| SrO | | | | | 0.5 |
| BaO | | 1.3 | | 0.7 | |
| $La_2O_3$ | | | | | |
| $Y_2O_3$ | 3.0 | | | | |
| $Gd_2O_3$ | | | | | 0.2 |
| $Ta_2O_5$ | | | | | |
| $Nb_2O_5$ | | | 4.0 | | |
| $WO_3$ | | | | | |
| $Bi_2O_3$ | | | | 2.7 | |
| $V_2O_5$ | | | | | |
| $As_2O_3$ | 0.5 | | 2.0 | | 3.5 |
| $Sb_2O_3$ | 0.5 | 3.0 | | 3.5 | |
| Nucleation temperature (° C.) | 700 | 700 | 650 | 650 | 700 |
| Crystallization temperature (° C.) | 850 | 850 | 750 | 750 | 890 |
| Predominant crystal phase | Ga-SS | Ga | Ga-SS | Ga-SS | Ga-SS |
| Average grain diameter (μm) | 0.001 | 0.001 | 0.001 | 0.050 | 0.001 |
| Predominant crystal phase | | Ga-SS | | | |
| Average grain diameter (μm) | | 0.001 | | | |
| Coefficient of thermal expansion (× 10⁻⁷/° C.) (−60° C.−+600° C.) | 66 | 78 | 80 | 48 | 58 |

TABLE 37

| | Examples | | | | |
|---|---|---|---|---|---|
| | 7-16 | 7-17 | 7-18 | 7-19 | 7-20 |
| $SiO_2$ | 33.0 | 34.0 | 43.0 | 38.0 | 36.0 |
| $Al_2O_3$ | 9.5 | 31.0 | 10.0 | 30.0 | 8.5 |
| ZnO | 31.5 | 28.0 | 19.5 | 7.0 | 25.0 |
| MgO | 9.5 | 1.3 | 1.9 | 1.7 | 8.0 |
| $TiO_2$ | 8.0 | 1.3 | 1.5 | 1.7 | 8.0 |
| $B_2O_3$ | | | | | |
| $ZrO_2$ | | | | | |
| $P_2O_5$ | 5.0 | | 0.8 | | |
| $SnO_2$ | | 2.0 | | | |
| CaO | | 0.4 | 19.8 | | |
| SrO | | | | 20.0 | |
| BaO | | | | | 19.5 |
| $La_2O_3$ | | | | | |

TABLE 37-continued

| | Examples | | | | |
|---|---|---|---|---|---|
| | 7-16 | 7-17 | 7-18 | 7-19 | 7-20 |
| $Y_2O_3$ | | 1.5 | | | |
| $Gd_2O_3$ | | | | | |
| $Ta_2O_5$ | 3.0 | | | | 0.5 |
| $Nb_2O_5$ | | | | | |
| $WO_3$ | | | | | |
| $Bi_2O_3$ | | | | | |
| $V_2O_5$ | | | | | |
| $As_2O_3$ | | | 0.5 | 2.0 | 1.0 |
| $Sb_2O_3$ | 0.5 | | 1.5 | 1.0 | 1.0 |
| Nucleation temperature (° C.) | 650 | 650 | 650 | 650 | 660 |
| Crystallization temperature (° C.) | 750 | 750 | 750 | 780 | 750 |
| Predominant crystal phase | Ga-SS | Ga | Ga-SS | Ga-SS | Ga-SS |
| Average grain diameter (μm) | 0.001 | 0.001 | 0.100 | 0.050 | 0.001 |
| Predominant crystal phase | | Ga-SS | | | |
| Average grain diameter (μm) | | 0.001 | | | |
| Coefficient of thermal expansion (× $10^{-7}$/° C.) (−60° C.→600° C.) | 80 | 80 | 80 | 38 | 78 |

TABLE 38

| | Examples | | | | |
|---|---|---|---|---|---|
| | 7-21 | 7-22 | 7-23 | 7-24 | 7-25 |
| $SiO_2$ | 32.0 | 35.0 | 55.5 | 35.5 | 40.2 |
| $Al_2O_3$ | 28.0 | 10.0 | 12.2 | 30.5 | 11.2 |
| ZnO | 12.0 | 25.0 | 6.4 | 6.1 | 6.5 |
| MgO | 4.0 | 6.2 | 2.5 | 1.6 | 16.0 |
| $TiO_2$ | 2.0 | 2.0 | 1.4 | 5.0 | 4.5 |
| $B_2O_3$ | | 0.2 | | | |
| $ZrO_2$ | | | | | |
| $P_2O_5$ | | | | | |
| $SnO_2$ | | | | | |
| CaO | | | | | |
| SrO | | | | | |
| BaO | | | | | 3.0 |
| $La_2O_3$ | 19.5 | | | | |
| $Y_2O_3$ | | 19.5 | | | |
| $Gd_2O_3$ | | | 19.5 | | |
| $Ta_2O_5$ | | | | 9.8 | |
| $Nb_2O_5$ | | | | | 9.5 |
| $WO_3$ | | 0.2 | | 8.0 | |
| $Bi_2O_3$ | | | | | 7.0 |
| $V_2O_5$ | | | | | |
| $As_2O_3$ | 2.5 | | | 3.5 | 2.1 |
| $Sb_2O_3$ | | 1.8 | 2.5 | | |
| Nucleation temperature (° C.) | 680 | 670 | 700 | 740 | 720 |
| Crystallization temperature (° C.) | 770 | 760 | 800 | 870 | 880 |
| Predominant crystal phase | Ga-SS | Ga-SS | Ga-SS | Ga-SS | Ga-SS |
| Average grain diameter (μm) | 0.001 | 0.001 | 0.001 | 0.001 | 0.001 |
| Coefficient of thermal expansion (× $10^{-7}$/° C.) (−60° C.→600° C.) | 76 | 37 | 61 | 48 | 51 |

TABLE 39

| | Examples | |
|---|---|---|
| | 7-26 | 7-27 |
| $SiO_2$ | 50.8 | 52.0 |
| $Al_2O_3$ | 18.0 | 16.0 |
| ZnO | 5.8 | 9.8 |
| MgO | 2.8 | 2.0 |
| $TiO_2$ | 2.2 | 2.0 |
| $B_2O_3$ | | |
| $ZrO_2$ | | |
| $P_2O_5$ | | |
| $SnO_2$ | | |
| CaO | | |
| SrO | 2.0 | |
| BaO | | |
| $La_2O_3$ | | |
| $Y_2O_3$ | | |
| $Gd_2O_3$ | | |
| $Ta_2O_5$ | | 7.8 |
| $Nb_2O_5$ | 7.4 | |
| $WO_3$ | 9.5 | |
| $Bi_2O_3$ | | 9.5 |
| $V_2O_5$ | | |
| $As_2O_3$ | | 1.4 |
| $Sb_2O_3$ | 1.5 | |
| Nucleation temperature (° C.) | 710 | 900 |
| Crystallization temperature (° C.) | 950 | 900 |
| Predominant crystal phase | Ga-SS | Ga-SS |
| Average grain diameter (μm) | 0.001 | 0.001 |
| Coefficient of thermal expansion (× $10^{-7}$/° C.) (−60° C.→600° C.) | 80 | 54 |

TABLE 40

| | Examples | | | | |
|---|---|---|---|---|---|
| | 8-1 | 8-2 | 8-3 | 8-4 | 8-5 |
| $SiO_2$ | 55.0 | 53.5 | 56.5 | 50.5 | 61.5 |
| $P_2O_5$ | 8.0 | 8.0 | 7.5 | 9.0 | 6.0 |
| $Al_2O_3$ | 24.0 | 23.0 | 23.5 | 23.8 | 23.0 |
| $Li_2O$ | 4.0 | 4.0 | 4.0 | 3.7 | 3.4 |
| MgO | 1.0 | 1.0 | 1.5 | 1.8 | 0.6 |
| ZnO | 0.5 | 0.5 | 0.5 | 1.0 | 1.0 |
| CaO | 1.0 | 1.0 | 0.3 | 2.5 | 0.5 |
| BaO | 1.0 | 1.0 | 0.7 | 2.5 | 0.5 |
| $TiO_2$ | 2.5 | 2.5 | 2.5 | 1.1 | 1.5 |
| $ZrO_2$ | 2.0 | 2.0 | 2.0 | 3.5 | 1.0 |
| $As_2O_3$ | 1.0 | 1.0 | 1.0 | 0.6 | |
| $Sb_2O_3$ | | | | | 1.0 |
| $V_2O_5$ | | 2.0 | | | |
| CoO | | 0.5 | | | |
| Nucleation temperature (° C.) | 750 | 730 | 700 | 650 | 730 |
| Crystallization temperature (° C.) | 800 | 900 | 850 | 770 | 900 |
| Predominant crystal phase | β-Q-SS | β-Q-SS | β-Q-SS | β-Q-SS | β-Q |
| Average grain diameter (μm) | 0.005 | 0.032 | 0.050 | 0.005 | 0.010 |
| Predominant crystal phase | | β-Sp | | | β-Sp-SS |
| Average grain diameter (μm) | | 0.100 | | | 0.010 |
| Coefficient of thermal expansion (× $10^{-7}$/° C.) (−60° C.→600° C.) | 2 | 10 | 5 | 9 | 1 |

TABLE 41

| | Examples | | | | |
|---|---|---|---|---|---|
| | 8-6 | 8-7 | 8-8 | 8-9 | 8-1-0 |
| $SiO_2$ | 59.0 | 53.9 | 54.3 | 54.0 | 55.0 |
| $P_2O_5$ | 5.5 | 9.5 | 7.8 | 8.0 | 7.8 |
| $Al_2O_3$ | 24.0 | 22.8 | 22.5 | 25.8 | 23.0 |
| $Li_2O$ | 4.7 | 3.0 | 3.4 | 3.4 | 3.2 |
| MgO | 0.8 | 0.7 | 1.7 | 1.4 | 0.7 |
| ZnO | 0.5 | 1.7 | 0.5 | 0.3 | 0.6 |

TABLE 41-continued

| | Examples | | | | |
|---|---|---|---|---|---|
| | 8-6 | 8-7 | 8-8 | 8-9 | 8-1-0 |
| CaO | 0.4 | 0.4 | 0.9 | 1.5 | 0.6 |
| BaO | 0.6 | 0.7 | 1.7 | 1.2 | 3.0 |
| $TiO_2$ | 1.3 | 3.2 | 1.9 | 2.2 | 1.4 |
| $ZrO_2$ | 1.3 | 1.5 | 1.5 | 1.3 | 2.2 |
| $As_2O_3$ | 0.4 | 1.4 | 0.3 | 0.4 | 2.5 |
| $Sb_2O_3$ | 1.5 | 1.2 | 3.5 | 0.5 | |
| $V_2O_5$ | | | | | |
| CoO | | | | | |
| Nucleation temperature (° C.) | 680 | 650 | 680 | 700 | 740 |
| Crystallization temperature (° C.) | 950 | 760 | 780 | 820 | 850 |
| Predominant crystal phase | β-Q-SS | β-Q-SS | β-Q | β-Q-SS | β-Q |
| Average grain diameter (μm) | 0.01 | 0.001 | 0.010 | 0.001 | 0.001 |
| Predominant crystal phase | β-Eu-SS | | | | |
| Average grain diameter (μm) | 0.010 | | | | |
| Coefficient of thermal expansion (× $10^{-7}$/° C.) (−60° C.→600° C.) | 4 | −5 | 10 | 8 | 2 |

TABLE 42

| | Examples | | | | |
|---|---|---|---|---|---|
| | 8-16 | 8-17 | 8-18 | 8-19 | 8-50 |
| $SiO_2$ | 55.2 | 56.8 | 55.9 | 54.1 | 55.6 |
| $P_2O_5$ | 8.1 | 7.7 | 7.2 | 8.0 | 8.2 |
| $Al_2O_3$ | 22.7 | 25.4 | 24.8 | 24.1 | 24.5 |
| $Li_2O$ | 4.9 | 3.5 | 3.5 | 3.4 | 3.2 |
| MgO | 0.6 | 0.5 | 1.8 | 0.6 | 0.9 |
| ZnO | 0.5 | 0.4 | 0.6 | 0.2 | 1.9 |
| CaO | 3.4 | 0.3 | 0.5 | 0.4 | 0.5 |
| BaO | 1.5 | 0.8 | 1.1 | 0.7 | 0.7 |
| $TiO_2$ | 1.9 | 2.0 | 1.2 | 1.7 | 1.3 |
| $ZrO_2$ | 1.9 | 1.5 | 1.3 | 1.3 | 1.5 |
| $As_2O_3$ | 0.3 | 3.2 | 0.1 | 3.6 | 1.8 |
| $Sb_2O_3$ | 0.2 | 0.4 | 2.8 | | 0.2 |
| $V_2O_5$ | | | | | |
| CoO | | | | | |
| Nucleation temperature (° C.) | 680 | 750 | 650 | 650 | 680 |
| Crystallization temperature (° C.) | 800 | 900 | 750 | 920 | 780 |
| Predominant crystal phase | β-Q-SS | β-Q-SS | β-Q-SS | β-Q-SS | β-Q-SS |
| Average grain diameter (μm) | 0.010 | 0.010 | 0.010 | 0.010 | 0.010 |
| Predominant crystal phase | β-Eu-SS | | β-Sp-SS | β-Eu-SS | |
| Average grain diameter (μm) | 0.010 | | 0.050 | 0.010 | |
| Coefficient of thermal expansion (× $10^{-7}$/° C.) (−60° C.→600° C.) | 1 | 1 | 10 | 2 | −8 |

TABLE 43

| | Examples | | | | |
|---|---|---|---|---|---|
| | 8-16 | 8-17 | 8-18 | 8-19 | 8-20 |
| $SiO_2$ | 55.2 | 56.8 | 55.9 | 54.1 | 55.6 |
| $P_2O_5$ | 7.7 | 6.8 | 8.1 | 8.0 | 8.2 |
| $Al_2O_3$ | 22.7 | 22.7 | 23.2 | 24.0 | 22.8 |
| $Li_2O$ | 4.2 | 4.4 | 3.4 | 3.5 | 3.7 |
| MgO | 1.0 | 1.3 | 0.8 | 0.7 | 0.7 |
| ZnO | 1.0 | 0.5 | 1.5 | 0.7 | 0.4 |
| CaO | 0.3 | 3.9 | 0.7 | 0.7 | 3.2 |
| BaO | 3.3 | 0.6 | 0.5 | 4.0 | 1.1 |

TABLE 43-continued

| | Examples | | | | |
|---|---|---|---|---|---|
| | 8-16 | 8-17 | 8-18 | 8-19 | 8-20 |
| $TiO_2$ | 1.8 | 1.3 | 1.3 | 1.5 | 1.1 |
| $ZrO_2$ | 1.8 | 1.2 | 1.5 | 1.5 | 1.2 |
| $As_2O_3$ | | | 1.7 | 1.3 | 2.0 |
| $Sb_2O_3$ | 1.0 | 0.5 | 1.4 | | |
| $V_2O_5$ | | | | | |
| CoO | | | | | |
| Nucleation temperature (° C.) | 720 | 700 | 750 | 750 | 660 |
| Crystallization temperature (° C.) | 850 | 760 | 860 | 770 | 760 |
| Predominant crystal phase | β-Q | β-Q-SS | β-Q-SS | β-Q | β-Q-SS |
| Average grain diameter (μm) | 0.007 | 0.010 | 0.001 | 0.007 | 0.001 |
| Predominant crystal phase | | β-Sp-SS | | | β-Eu-SS |
| Average grain diameter (μm) | | 0.010 | | | 0.010 |
| Coefficient of thermal expansion (× $10^{-7}$/° C.) (−60° C.→600° C.) | 7 | 7 | 2 | 6 | 7 |

TABLE 44

| | Examples | | |
|---|---|---|---|
| | 8-21 | 8-22 | 8-23 |
| $SiO_2$ | 57.8 | 59.9 | 55.1 |
| $P_2O_5$ | 7.6 | 8.7 | 8.2 |
| $Al_2O_3$ | 22.7 | 22.7 | 23.0 |
| $Li_2O$ | 3.1 | 3.1 | 3.4 |
| MgO | 0.6 | 0.6 | 0.8 |
| ZnO | 0.3 | 0.3 | 0.7 |
| CaO | 0.4 | 0.4 | 2.0 |
| BaO | 0.6 | 0.6 | 0.7 |
| $TiO_2$ | 3.8 | 1.3 | 1.3 |
| $ZrO_2$ | 1.1 | 1.0 | 4.0 |
| $As_2O_3$ | | | |
| $Sb_2O_3$ | 2.0 | 1.4 | 0.8 |
| $V_2O_5$ | | | |
| CoO | | | |
| Nucleation temperature (° C.) | 650 | 680 | 740 |
| Crystallization temperature (° C.) | 750 | 800 | 940 |
| Predominant crystal phase | β-Q-SS | β-Q-SS | β-Q-SS |
| Average grain diameter (μm) | 0.001 | 0.001 | 0.001 |
| Predominant crystal phase | | β-Sp-SS | |
| Average grain diameter (μm) | | 0.010 | |
| Coefficient of thermal expansion (× $10^{-7}$/° C.) (−60° C.→600° C.) | 5 | 4 | 0 |

TABLE 45

| | Comparative Examples | |
|---|---|---|
| | 9 | 10 |
| $SiO_2$ | 68.0 | 76.5 |
| $P_2O_5$ | | 2.0 |
| $Al_2O_3$ | 13.0 | 3.8 |
| $Li_2O$ | 8.0 | 10.5 |
| MgO | | 2.5 |
| ZnO | | 0.5 |
| CaO | | |
| BaO | | |
| $TiO_2$ | | |
| $ZrO_2$ | 6.0 | |
| $As_2O_3$ | 0.5 | |
| $Sb_2O_3$ | | 0.2 |
| $V_2O_5$ | | |
| CoO | | |
| $Na_2O$ | | 5.0 |

TABLE 45-continued

|  | Comparative Examples | |
|---|---|---|
|  | 9 | 10 |
| $K_2O$ |  | 4.0 |
| Nucleation temperature (° C.) |  | 540 |
| Crystallization temperature (° C.) |  | 740 |
| Predominant crystal phase | chemically tempered glass | lithium disilicate α-quartz |
| Coefficient of thermal expansion ($\times 10^{-7}$/° C.) (−60° C.→+600° C.) | 86 | 80 |

In the examples shown in Tables 34–44, raw materials such as oxides, carbonates and nitrates were mixed and were melted at a temperature within a range from about 1400° C. to 1500° C. by using a conventional melting device and homogenized by stirring. The melt was formed and cooled to provide a glass form. It was heat treated under a temperature of 650–750° C. for about 1 to 12 hours for nucleation and further heat treated under a temperature of 750–950° C. for about 1 to 12 hours for crystallization to provide desired glass-ceramics.

As shown in Tables 34 to 44, the glass-ceramics of the seventh and eighth aspects of the invention have a grain diameter of the precipitated crystals within a range of 0.001–0.10 μm.

As to the crystal phase, the glass-ceramics comprise, as a predominant crystal phase or phases, at least one crystal phase selected from the group consisting of β-quartz (β-$SiO_2$), β-quartz solid solution (β-$SiO_2$ solid solution), β-spodumene (β-$Li_2O.Al_2O_3.SiO_2$), β-spodumene solid solution (β-$Li_2O.Al_2O_3.SiO_2$ solid solution), β-eucryptite (β-$Li_2O.Al_2O_3.2SiO_2$ where a part of $Li_2O$ is replaceable by MgO and/or ZnO) and β-eucryptite solid solution (β-$Li_2O.Al_2O_3.2SiO_2$ solid solution where a part of $Li_2O$ is replaceable by MgO and/or ZnO), or gahnite ($ZnAl_2O_4$) and/or gahnite solid solution ($ZnAl_2O_4$ solid solution).

As shown in Tables 46–49, the glass-ceramics of the present invention differ from the glass-ceramics of the comparative examples in the crystal phase, that is, the glass-ceramics of the present invention do not contain lithium disilicate ($Li_2Si_2O_5$) but contain at least one selected from the group consisting of α-cristobalite, α-cristobalite solid solution, α-quartz and α-quartz solid solution. Further, in the glass-ceramics of Comparative Example No. 11, the average grain diameter of lithium disilicate was 1.5 μm and, in the glass-ceramics of Comparative Example No. 12, the average grain diameter of β-spodumene was 0.2 μm. These glass-ceramics had relatively large crystal grains of acicular shape or rice grain shape. Such crystal grains adversely affect surface roughness after polishing and other factors in the situation in which improvement in smoothness is required. The glass-ceramics of Comparative Example Nos. 11 and 12 have surface roughness Ra (arithmetic mean roughness) of 11 or over, showing that it is difficult to obtain excellent smoothness with surface roughness Ra of 5 Å or below.

Preferred examples of the ninth aspect of the invention will now be described. Tables 46 to 49 show compositions of examples (9-1 to 9-7) and two $Li_2O$—$SiO_2$ type glass-ceramics as comparative examples with nucleation temperature, crystallization temperature, crystal phase, average crystal grain diameter, coefficient of thermal expansion within a range of −50-+70° C., specific gravity and surface roughness (arithmetic mean roughness) after polishing. As to the crystal phases in the tables, α-cristobalite solid solution is expressed as "α-C-SS" and α-quartz solid solution as "α-quartz SS".

TABLE 46

|  | Examples | | |
|---|---|---|---|
|  | 9-1 | 9-2 | 9-3 |
| $SiO_2$ | 73.3 | 75.0 | 69.2 |
| $Li_2O$ | 5.0 | 5.5 | 5.0 |
| $P_2O_5$ | 2.0 | 2.1 | 2.0 |
| $ZrO_2$ | 2.4 | 4.0 | 2.4 |
| $Al_2O_3$ | 7.5 | 7.5 | 7.5 |
| MgO | 0.8 | 1.8 | 1.4 |
| ZnO | 4.0 | 0.5 | 6.0 |
| SrO | 1.0 | 0.6 | 2.0 |
| BaO | 1.0 | 0.5 | 2.0 |
| $Y_2O_3$ |  |  |  |
| $WO_3$ |  |  |  |
| $La_2O_3$ |  |  |  |
| $Bi_2O_3$ |  |  |  |
| $K_2O$ | 2.0 | 2.0 | 2.0 |
| $Na_2O$ |  |  |  |
| $Sb_2O_3$ | 1.0 | 0.5 |  |
| Nucleation temperature (° C.) | 550 | 560 | 540 |
| Crystallization temperature (° C.) | 710 | 750 | 720 |
| Predominant crystal phase | α-C-SS | α-C-SS | α-C-SS |
| Average grain diameter | <0.01 μm | <0.01 μm | <0.01 μm |
| Predominant crystal phase |  | α-quartz SS |  |
| Average grain diameter |  | 0.01 μm |  |
| Coefficient of thermal expansion ($\times 10^{-7}$/° C.) | 72 | 110 | 100 |
| light transmittance (%) | 99.0 | 91.0 | 99.0 |
| Young's modulus (GPa) | 82 | 89 | 81 |
| Bending strength (MPa) | 290 | 400 | 350 |
| Vickers' hardness | 760 | 740 | 740 |
| Surface roughness (Å) | 1.0 | 2.2 | 2.0 |
| Specific gravity | 2.43 | 2.48 | 2.44 |
| Li ion dissolving amount (μg/disk) | 0.31 | 0.38 | 0.28 |
| (μg/cm²) | 0.0046 | 0.056 | 0.0041 |

TABLE 47

|  | Examples | | |
|---|---|---|---|
|  | 9-4 | 9-5 | 9-6 |
| $SiO_2$ | 63.9 | 63.9 | 66.9 |
| $Li_2O$ | 6.0 | 6.0 | 6.0 |
| $P_2O_5$ | 2.5 | 2.5 | 2.5 |
| $ZrO_2$ | 2.4 | 2.4 | 2.4 |
| $Al_2O_3$ | 7.5 | 7.5 | 5.5 |
| MgO | 2.0 | 2.0 | 2.0 |
| ZnO | 6.0 | 6.0 | 6.0 |
| SrO | 1.7 | 1.7 | 1.7 |
| BaO | 2.6 | 2.6 | 2.6 |
| $Y_2O_3$ | $GeO_2$ = 3.0 | $Gd_2O_3$ = 3.0 | $Ga_2O_3$ = 2.0 |
| $WO_3$ |  |  |  |
| $La_2O_3$ |  |  |  |
| $Bi_2O_3$ |  |  |  |
| $K_2O$ | 2.0 | 2.0 | 2.0 |
| $Na_2O$ |  |  |  |
| $Sb_2O_3$ | 0.4 | 0.4 | 0.4 |
| Nucleation temperature (° C.) | 550 | 560 | 540 |
| Crystallization temperature (° C.) | 710 | 750 | 720 |
| Predominant crystal phase | α-C-SS | α-C-SS | α-C-SS |
| Average grain diameter | <0.01 μm | <0.01 μm | <0.01 μm |
| Coefficient of thermal expansion ($\times 10^{-7}$/° C.) (−50° C.→+70° C.) | 74 | 100 | 93 |
| light transmittance (%) | 99.0 | 99.0 | 99.0 |
| Young's modulus (GPa) | 82 | 89 | 81 |

TABLE 47-continued

| | Examples | | |
|---|---|---|---|
| | 9-4 | 9-5 | 9-6 |
| Bending strength (MPa) | 400 | 500 | 450 |
| Vickers' hardness | 740 | 740 | 740 |
| Surface roughness (Å) | 1.0 | 2.2 | 2.0 |
| Specific gravity | 2.45 | 2.48 | 2.44 |
| Li ion dissolving amount (μg/disk) | 0.22 | 0.23 | 0.19 |
| (μg/cm²) | 0.0033 | 0.0034 | 0.0028 |

TABLE 48

| | Examples | | |
|---|---|---|---|
| | 9-7 | 9-8 | 9-9 |
| SiO₂ | 68.2 | 69.1 | 69.0 |
| Li₂O | 5.0 | 5.0 | 5.0 |
| P₂O₅ | 2.0 | 2.0 | 2.0 |
| ZrO₂ | 2.4 | 2.4 | 2.0 |
| Al₂O₃ | 7.0 | 7.0 | 7.1 |
| MgO | 1.4 | 1.0 | 1.4 |
| ZnO | 6.0 | 7.0 | 6.0 |
| SrO | 2.0 | 2.0 | 2.0 |
| BaO | 2.0 | 2.0 | 2.0 |
| Y₂O₃ | 1.0 | | |
| WO₃ | | | 0.5 |
| Bi₂O₃ | | | 0.5 |
| K₂O | 2.0 | 2.0 | 2.0 |
| Na₂O | 0.5 | | |
| As₂O₃ | 0.5 | 0.5 | 0.5 |
| Nucleation temperature (° C.) | 480 | 470 | 500 |
| Crystallization temperature (° C.) | 715 | 720 | 730 |
| Predominant crystal phase | α-C-SS | α-C-SS | α-C-SS |
| Average grain diameter | <0.01 μm | <0.01 μm | <0.01 μm |
| Predominant crystal phase | | α-quartz SS | |
| Average grain diameter | | 0.01 μm | |
| Coefficient of thermal expansion (×10⁻⁷/° C.) (−50° C.–+70° C.) | 85 | 110 | 104 |
| light transmittance (%) | 99.5 | 92.0 | 99.5 |
| Young's modulus (GPa) | 85 | 98 | 90 |
| Bending strength (MPa) | 300 | 550 | 360 |
| Vickers' hardness | 740 | 730 | 760 |
| Surface roughness (Å) | 1.0 | 2.2 | 2.0 |
| Specific gravity | 2.45 | 2.43 | 2.46 |
| Li ion dissolving amount (μg/disk) | 0.32 | 0.27 | 0.25 |
| (μg/cm²) | 0.0047 | 0.0040 | 0.0037 |

TABLE 49

| | Examples | Comparative Examples | |
|---|---|---|---|
| | 9-10 | 11 | 12 |
| SiO₂ | 69.1 | 74.2 | 76.1 |
| Li₂O | 5.0 | 9.6 | 11.8 |
| P₂O₅ | 2.0 | 1.5 | 2.0 |
| ZrO₂ | 2.4 | 0.4 | |
| Al₂O₃ | 7.0 | 9.6 | 7.1 |
| MgO | 1.0 | PbO = 2.3 | |
| ZnO | 7.0 | | |
| SrO | 1.5 | | |
| BaO | 1.5 | | |
| WO₃ | 0.5 | | |
| La₂O₃ | 0.5 | | |
| K₂O | 2.0 | 2.4 | 2.8 |
| Sb₂O₃ | | | 0.2 |
| As₂O₃ | 0.5 | | |

TABLE 49-continued

| | Examples | Comparative Examples | |
|---|---|---|---|
| | 9-10 | 11 | 12 |
| Nucleation temperature (° C.) | 470 | 540 | 500 |
| Crystallization temperature (° C.) | 720 | 800 | 850 |
| Predominant crystal phase | α-C-SS | lithium disilicate | lithium disilicate |
| Average grain diameter | <0.01 μm | 1.5 μm | 0.1 μm |
| Predominant crystal phase | α-quartz SS | α-cristobalite | β-spodumene |
| Average grain diameter | 0.01 μm | 0.3 μm | 0.2 μm |
| Coefficient of thermal expansion (×10⁻⁷/° C.) (−50° C.–+70° C.) | 94 | 48 | 49 |
| light transmittance (%) | 97.0 | 74 | 60 |
| Young's modulus (GPa) | 97 | 80 | 86 |
| Bending strength (MPa) | 600 | 180 | 200 |
| Vickers' hardness | 750 | 800 | 850 |
| Surface roughness (Å) | 2.0 | 12 | 11 |
| Specific gravity | 2.50 | 2.46 | 2.55 |
| Li ion dissolving amount (μg/disk) | 0.32 | 3.00 | 3.80 |
| (μg/cm²) | 0.0047 | 0.0443 | 0.0562 |

The information storage disk holding members of the invention have achieved flatness of 0.1 μm or below after the heating test which satisfies the desired flatness (i.e., not greater than 5 μm, preferably not greater than 3 μm and more preferably not greater than 1 μm). Even under a heating temperature of 500° C. or above, they have achieved the desired flatness (i.e., not greater than 5 μm, preferably not greater than 3 μm and more preferably not greater than 1 μm). Depending upon examples, they have achieved the flatness of the above described desired range even under 600° C. for ten minutes, 700° C. for ten minutes and 800° C. for ten minutes.

As described above, the information storage disk holding members of the invention have excellent heat resisting property. The coefficient of thermal expansion of the glass-ceramics obtained is $2 \times 10^{-7}$–$65 \times 10^{-7}/°$ C. which is within a suitable range for forming a film of a perpendicular magnetic recording medium.

Industrial Utility

As described in the foregoing, according to the invention, there are provided information storage disk holding members, particularly glass-ceramics spacer rings, which have eliminated the above described defects of the prior art and are capable of coping with a high speed rotation of the substrate corresponding to high speed transmission of information, increasing mechanical strength for adaptation to mobile uses, and having a thermal expansion property matching that of other drive component parts. There are also provided an information storage disk drive device on which an information storage disk is mounted through these holding members. The information storage disk drive device of the present invention can be used for notebook-sized and desktop personal computers, servers, mobiles including APS cameras, cellular telephones, digital cameras, digital video cameras and card drives, storage media of a top box for a network television set and a novel high recording density media (perpendicular magnetic storage media and island magnetic storage media).

What is claimed is:

1. An information storage disk holding member for holding an information storage disk in position, said holding member being made of glass-ceramics in which a crystal phase is dispersed in a glass matrix.

2. An information storage disk holding member as defined in claim 1 wherein specific rigidity Young's modulus/ specific gravity) is not smaller than 37 GPa and specific gravity is not greater than 3.0.

3. An information storage disk holding member as defined in claim 1 wherein Young's modulus is within a range from 95 GPa to 130 GPa and specific gravity is within a range from 2.40 to 2.60.

4. An information storage disk holding member as defined in claim 1 wherein bending strength is within a range from 400 MPa to 800 MPa.

5. An information storage disk holding member as defined in claim 1 wherein the glass-ceramics comprise, as a predominant crystal phase or phases, at least one crystal phase selected from the group consisting of lithium disilicate ($Li_2O \cdot 2SiO_2$), α-quartz (α-$SiO_2$), α-quartz solid solution (α-$SiO_2$ solid solution), α-cristobalite (α-$SiO_2$) and α-cristobalite solid solution (α-$SiO_2$ solid solution).

6. An information storage disk holding member as defined in claim 5 wherein the glass-ceramics comprise, as a predominant crystal phase, lithium disilicate.

7. An information storage disk holding member as defined in claim 1 wherein an amount of crystal of lithium disilicate in the glass-ceramics is 3–10 mass % and an average crystal grain diameter of the crystal phase is within a range from 0.01 μm–0.05 μm.

8. An information storage disk holding member as defined in claim 1 wherein the glass-ceramics comprise, in mass % on oxide basis,

| | |
|---|---|
| $SiO_2$ | 70–79% |
| $Li_2O$ | 8–12% |
| $K_2O$ | 0–4% |
| MgO | 0–less than 2% |
| ZnO | 0–less than 2% |
| $P_2O_5$ | 1.5–3% |
| $ZrO_2$ | 1.5–7% |
| $Al_2O_3$ | 3–9% |
| $Sb_2O_3 + As_3O_3$ | 0–2%. |

9. An information storage disk holding member as defined in any of claims 1–8 wherein coefficient of thermal expansion within a range from −50° C. to +70° C. is within a range from $+65 \times 10^{-7}$/° C. to $+130 \times 10^{-7}$/° C.

10. An information storage disk holding member as defined in claim 1 wherein the glass-ceramics comprises, as a predominant crystal phase, α-quartz (α-$SiO_2$) or α-quartz solid solution (α-$SiO_2$ solid solution), an amount of the crystal phase is 3–35 mass %, and an average crystal grain diameter of the crystal phase is not greater than 0.10 μm.

11. An information storage disk holding member as defined in claim 10 wherein an average crystal grain diameter of the entire predominant crystal phase of the glass-ceramics is not greater than 0.05 μm.

12. An information storage disk holding member as defined in claim 10 wherein the glass-ceramics are substantially free of PbO.

13. An information storage disk holding member as defined in claim 10 wherein coefficient of thermal expansion within a range from −50° C. to +70° C. is within a range from $+95 \times 10^{-7}$/° C. to $+110 \times 10^{-7}$/° C.

14. An information storage disk holding member as defined in claim 10 wherein the glass-ceramics comprise, in mass % on oxide basis,

| | |
|---|---|
| $SiO_2$ | 70–77% |
| $Li_2O$ | 5–less than 9% |
| $K_2O$ | 2–5% |
| MgO + ZnO + SrO + BaO | 1–2% |
| $Y_2O_3 + WO_3 + La_2O_3 + Bi_2O_3$ | 1–3% |
| $P_2O_5$ | 1.0–2.5% |
| $ZrO_2$ | 2.0–7% |
| $Al_2O_3$ | 5–10% |
| $Na_2O$ | 0–1% |
| $Sb_2O_3 + As_3O_3$ | 0–2%. |

15. An information storage disk holding member as defined in any of claims 10–14 wherein an amount of crystal of lithium disilicate in the glass-ceramics is within a range from 15 mass % to 40 mass %.

16. An information storage disk holding member as defined in claim 1 wherein the glass-ceramics comprise, as a predominant crystal phase or phases, at least one crystal phase selected from the group consisting of cordierite ($Mg_2Al_4Si_5O_{18}$), cordierite solid solution ($Mg_2Al_4Si_5O_{18}$ solid solution), spinel, spinel solid solution, enstatite ($MgSiO_3$), enstatite solid solution ($MgSiO_3$ solid solution), β-quartz (β-$SiO_2$), β-quartz solid solution (β-$SiO_2$ solid solution), magnesium titanate ($MgTi_2O_5$) and magnesium titanate solid solution ($MgTi_2O_5$ solid solution).

17. An information storage disk holding member as defined in claim 16 wherein the glass-ceramics comprise, in mass % on oxide basis,

| | |
|---|---|
| $SiO_2$ | 40–60% |
| MgO | 10–18% |
| $Al_2O_3$ | 10–less than 20% |
| $P_2O_5$ | 0–4% |
| $B_2O_3$ | 0–4% |
| CaO | 0.5–4% |
| SrO | 0–2% |
| BaO | 0–5% |
| $ZrO_2$ | 0–5% |
| $TiO_2$ | 2.5–12% |
| $Bi_2O_3$ | 0–6% |
| $Sb_2O_3$ | 0–1% |
| $As_2O_3$ | 0–1% |
| $Fe_2O_3$ | 0–2%. |

18. An information storage disk holding member as defined in claim 16 or 17 wherein coefficient of thermal expansion within a range from −50° C. to +70° C. is within a range from $+30 \times 10^{-7}$/° C. to $+65 \times 10^{-7}$/° C.

19. An information storage disk holding member as defined in claim 1 wherein the glass-ceramics comprise, as a predominant crystal phase or phases, at least one crysal phase selected from the group consisting of enstatite ($MgSiO_3$), enstatite solid solution ($MgSiO_3$ solid solution), magnesium titanate ($MgTi_2O_5$), magnesium titanate solid solution ($MgTi_2O_5$ solid solution), spinel and spinel solid solution, the glass-ceramics comprise $Al_2O_3$ in an amount of less than 20 mass %, and the glass-ceramics have Young's modulus within a range from 115 GPa to 160 GPa.

20. An information storage disk holding member as defined in claim 19 wherein the glass-ceramics comprise enstatite ($MgSiO_3$) or enstatite solid solution ($MgSiO_3$ solid solution) as a crystal phase having the largest precipitation amount (first phase).

21. An information storage disk holding member as defined in claim 19 wherein the glass ceramics comprise magnesium titanate ($MgTi_2O_5$) or magnesium titanate solid solution ($MgTi_2O_5$ solid solution) as a crystal phase having the largest precipitation amount (first phase).

22. An information storage disk holding member as defined in claim 20 wherein the glass-ceramics comprise, as a crystal phase having a precipitation amount which is smaller than the precipitation amount of the first phase, at least one crystal phase selected from the group consisting of magnesium titanate (MgTi$_2$O$_5$), magnesium titanate solid solution (MgTi$_2$O$_5$ solid solution), spinel and spinel solid solution.

23. An information storage disk holding member as defined in claim 21 wherein the glass-ceramics comprise, as a crystal phase having a precipitation amount which is smaller than the precipitation amount of the first phase, at least one crystal phase selected from the group consisting of enstatite (MgSiO$_3$), enstatite solid solution (MgSiO$_3$ solid solution), spinel and spinel solid solution.

24. An information storage disk holding member as defined in claim 19 wherein the glass-ceramics are substantially free of Li$_2$O, Na$_2$O and K$_2$O.

25. An information storage disk holding member as defined in claim 19 wherein the glass-ceramics comprise, in mass % on oxide basis,

| | |
|---|---|
| SiO$_2$ | 40–60% |
| MgO | 10–20% |
| Al$_2$O$_3$ | 10–less than 20% |
| CaO | 0.5–4% |
| SrO | 0.5–4% |
| BaO | 0–5% |
| ZrO$_2$ | 0–5% |
| TiO$_2$ | exceeding 8% and up to 12% |
| Bi$_2$O$_3$ | 0–6% |
| Sb$_2$O$_3$ | 0–1% |
| As$_2$O$_3$ | 0–1%. |

26. An information storage disk holding member as defined in claim 19 wherein the glass-ceramics comprise an element selected from P, W, Nb, La, Y and Pb in an amount of up to 3 mass % on oxide basis and/or an element selected from Cu, Co, Fe, Mn, Cr, Sn and V in an amount of up to 2 mass % on oxide basis.

27. An information storage disk holding member as defined in claim 19 wherein coefficient of thermal expansion within a range from −50° C. to +70° C. is within a range from +40×10$^{-7}$/° C. to +60×10$^{-7}$/° C.

28. An information storge disk holding member as defined in claim 19 wherein a crystal grain diameter of the respective crystal phases is within a range from 0.05 μm 0.30 μm.

29. An information storage disk holding member as defined in any of claims 19–28 wherein Vickers' hardness is within a range from 700 to 850.

30. An information storage disk holding member as defined in claim 1 wherein a predominant crystal phase or phases of the glass-ceramics are at least one crystal phase selected from the group consisting of β-quartz, β-quartz solid solution, enstatite, enstatite solid solution, forsterite and forsterite solid solution.

31. An information storage disk holding member as defined in claim 30 wherein the glass-ceramics comprise Al$_2$O$_3$ in an amount within a range from 10 mass % to less than 20 mass % on oxide basis and have Young's modulus (GPa)/specific gravity within a range from 37 to 63.

32. An information storage disk holding member as defined in claim 30 wherein the glass-ceramics comprise, in mass % on oxide basis,

| | |
|---|---|
| SiO$_2$ | 40–60% |
| MgO | 10–20% |
| Al$_2$O$_3$ | 10–less than 20% |
| P$_2$O$_5$ | 0.5–2.5% |
| B$_2$O$_3$ | 1–4% |
| Li$_2$O | 0.5–4% |
| CaO | 0.5–4% |
| ZrO$_2$ | 0.5–5% |
| TiO$_2$ | 2.5–8% |
| Sb$_2$O$_3$ | 0.01–0.5% |
| As$_2$O$_3$ | 0–0.5% |
| SnO$_2$ | 0–5% |
| MoO$_3$ | 0–3% |
| CeO | 0–5% |
| Fe$_2$O$_3$ | 0–5%/. |

33. An information storage disk holding member as defined in claim 30 wherein the glass-ceramics are substantially free of Na$_2$O, K$_2$O and PbO.

34. An information storage disk holding member as defined in any of claims 30–33 wherein a crystal grain diameter of the respective crystal phases is within a range from 0.05 μm to 0.30 μm.

35. An information storage disk holding member as defined in claim 1 wherein the glass-ceramics comprise, as a predominant crystal phase or phases, at least one crystal phase selected from the group consisting of cordierite, cordierite solid solution, spinel, spinel solid solution, enstatite, enstatite solid solution, β-quartz and β-quartz solid solution.

36. An information storage disk holding member as defined in claim 1 wherein the glass-ceramics comprise, as a predominant crystal phase or phases, at least one crystal phase selected from the group consisting of β-quartz, β-quartz solid solution, enstatite, enstatite solid solution, forsterite and foresterite solid solution.

37. An information storage disk holding member as defined in claim 35 wherein a crystal grain diameter of the respective crystal phases is within a range from 0.05 μm to 0.30 μm.

38. An information storage disk holding member as defined in claim 35 wherein the glass-ceramics comprise, in mass % on oxide basis,

| | |
|---|---|
| SiO$_2$ | 40–60% |
| MgO | 10–20% |
| Al$_2$O$_3$ | 10–less than 20% |
| P$_2$O$_5$ | 0–4% |
| B$_2$O$_3$ | 0–4% |
| CaO | 0.5–4% |
| BaO | 0–5% |
| ZrO$_2$ | 0–5% |
| TiO$_2$ | 2.5–8% |
| Sb$_2$O$_3$ | 0–1% |
| As$_2$O$_3$ | 0–1% |
| F | 0–3% |
| Fe$_2$O$_3$ | 0–5%. |

39. An information storage disk holding member as defined in claim 35 wherein the glass-ceramics have Young's modulus (GPa)/specific gravity within a range from 37 to 63 and comprise Al$_2$O$_3$ within a range from 10% to less than 20%.

40. An information storage disk holding member as defined in claim 35 wherein the glass-ceramics are substantially free of Na$_2$O, K$_2$O and PbO.

41. An information storage disk holding member as defined in any of claims 35–40 wherein coefficient of thermal expansion within a range from −50° C. to +70° C. is within a range from +30×10⁻⁷/° C. to +50×10⁻⁷/° C.

42. An information storage disk holding member as defined in claim 1 wherein the glass-ceramics comprise, as a predominant crystal phase or phases, at least one crystal phase selected from the group consisting of β-quartz (β-$SiO_2$), β-quartz solid solution (β-$SiO_2$ solid solution), β-spodumene (β-$Li_2O.Al_2O_3.SiO_2$), β-spodumene solid solution (β-$Li_2O.Al_2O_3.SiO_2$ solid solution), β-eucryptite (β-$Li_2O.Al_2O_3.2SiO_2$ where a part of $Li_2O$ is replaceable by MgO and/or ZnO) and β-eucryptite solid solution (β-$Li_2O.Al_2O_3.2SiO_2$ solid solution where a part of $Li_2O$ is replaceable by MgO and/or ZnO).

43. An information storage disk holding member as defined in claim 42 wherein an average crystal grain diameter of the glass-ceramics is within a range from 0.001 μm to 0.10 μm.

44. An information storage disk holding member as defined in claim 42 wherein the glass-ceramics comprise, in mass % on oxide basis,

| | |
|---|---|
| $SiO_2$ | 50–62% |
| $P_2O_5$ | 5–10% |
| $Al_2O_3$ | 22–26% |
| $Li_2O$ + MgO + ZnO | 4–6.5% |
| in which $Li_2O$ | 3–5% |
| MgO | 0.5–2% |
| ZnO | 0.2–2% |
| CaO + BaO | 0.8–5% |
| in which CaO | 0.3–4% |
| BaO | 0.5–4% |
| $TiO_2$ | 1–4% |
| $ZrO_2$ | 1–4% |
| $As_2O_3$ + $Sb_2O_3$ | 0–4% | and are substantially free of PbO, $Na_2O$ and $K_2O$.

45. An information storage disk holding member as defined in any of claims 42–44 wherein coefficient of thermal expansion within a range from −50° C. to +600° C. is within a range from −10×10⁻⁷/° C. to +20×10⁻⁷/° C.

46. An information storage disk holding member as defined in claim 1 wherein a predominant crystal phase of the glass-ceramics is gahnite ($ZnAl_2O_3$) and/or gahnite solid solution ($ZnAl_2O_3$ solid solution).

47. An information storage disk holding member as defined in claim 46 wherein the glass-ceramics are substantially free of PbO, $Na_2O$ and $K_2O$.

48. An information storage disk holding member as defined in claim 46 wherein the glass-ceramics comprise, in mass % on oxide basis,

| | |
|---|---|
| $SiO_2$ | 30–65% |
| $Al_2O_3$ | 5–35% |
| ZnO | 5–35% |
| MgO | 1–20% |
| $TiO_2$ | 1–15% |
| CaO + SrO + BaO + $B_2O_3$+ $La_2O_3$ + $Y_2O_3$ + $Gd_2O_3$ + $Ta_2O_5$ + $Nb_2O_5$ + $WO_3$ + $Bi_2O_3$ | 0.5–20% |
| in which $B_2O_3$ | 0–10% |
| and $Ta_2O_5$ + $Nb_2O_5$ + $WO_3$ + $Bi_2O_3$ | 0–10% |
| $ZrO_2$ + $P_2O_5$ + $SnO_2$ | 0–7% |
| in which $ZrO_2$ | 0–less than 2% |
| $P_2O_5$ | 0–5% |
| $SnO_2$ | 0–2% |
| $As_2O_3$ + $Sb_2O_3$ | 0–4%. |

49. An information storage disk holding member as defined in any of claims 46–48 wherein coefficient of thermal expansion within a range from −50° C. to +600° C. is within a range from +35×10⁻⁷/° C. to +65×10⁻⁷/° C.

50. An information storage disk holding member as defined in claim 1 wherein the glass-ceramics comprise, as a predominant crystal phase or phases, at least one crystal phase selected from the group consisting of α-cristobalite, α-cristobalite solid solution, α-quartz and α-quartz solid solution but are substantially free of lithium disilicate ($Li_2O.2SiO_2$), lithium silicate ($Li_2O.SiO_2$), β-spodumene, β-eucryptite, β-quartz, mica and fluorrichterite and also are free of Cr and Mn, have a coefficient of thermal expansion within a range from −50° C. to +70° C. which is within a range from +65×10⁻⁷/° C. to +140×10⁻⁷/° C. and have an average crystal grain diameter of the predominant crystal phase of less than 0.10 μm.

51. An information storage disk holding member as defined in claim 50 wherein the glass-ceramics have Young's modulus which is not smaller than 80 GPa.

52. An information storage disk holding member as defined in claim 50 wherein the glass-ceramics have specific gravity within a range from 2.3 to 2.7.

53. An information storage disk holding member as defined in claim 50 wherein the glass-ceramics have light transmittance for a plate thickness of 10 mm which is 90% or over within a wavelength range from 950 nm to 1600 nm.

54. An information storage disk holding member as defined in claim 50 wherein the glass-ceramics have bending strength of 250 MPa or over.

55. An information storage disk holding member as defined in claim 50 wherein the glass-ceramics have Vickers' hardness within a range from 600 to 800.

56. An information storage disk holding member as defined in any of claims 50–55 wherein the glass-ceramics comprise, in mass % on oxide basis,

| | |
|---|---|
| $SiO_2$ | 65–75% |
| $Li_2O$ | 4–less than 7% |
| $K_2O$ | 0–3% |
| $Na_2O$ | 0–3% |
| MgO + ZnO + SrO + BaO + CaO | 2–15% |
| $Y_2O_3$ + $WO_3$ + $La_2O_3$ + $Bi_2O_3$ | 0–3% |
| $SnO_2$ | 0–3% |
| $P_2O_5$ | 1.0–2.5% |
| $ZrO_2$ | 2.0–7% |
| $Al_2O_3$ | 5–9% |
| $Sb_2O_3$ + $As_2O_3$ | 0–1%. |

57. An information storage disk holding member as defined in any of claims 1, 10 and 16 wherein the glass-ceramics are obtained by subjecting base glass obtained by melting and forming glass raw materials to heat treatment for nucleation under a temperature within a range from 400° C. to 600° C. for one to seven hours and further subjecting the base glass to heat treatment for crystallization under a temperature within a range from 700° C. to 780° C. for one to seven hours.

58. An information storage disk holding member as defined in any of claims 19, 30, 35, 36, 42 and 46 wherein the glass-ceramics are obtained by subjecting base glass obtained by melting and forming glass raw materials to heat treatment for nucleation under a temperature within a range from 650° C. to 750° C. for one to seven hours and further subjecting the base glass to heat treatment for crystallization under a temperature within a range from 750° C. to 950° C. for one to seven hours.

59. An information storage disk holding member as defined in claim 50 wherein the glass-ceramics are obtained by subjecting base glass obtained by melting and forming glass raw materials to heat treatment for nucleation under a temperature within a range from 400° C. to 600° C. for one to seven hours and further subjecting the base glass to heat treatment for crystallization under a temperature within a range from 650° C. to 750° C. for one to seven hours.

60. An information storage disk holding member made by forming a conductive film on the surface of the holding member as defined in any of claims 1, 10, 16, 19, 30, 35, 36, 42, 46 and 50.

61. A spacer ring for an information storage disk made of the holding member as defined in any of claims 1, 10, 16, 19, 30, 35, 36, 42, 46 and 50, said holding member having a ring shape.

62. An information storage disk drive device capable of holding one or more information storage disks on a rotor hub by means of the spacer ring as defined in claim 61.

63. An information storage disk drive device as defined in claim 62 wherein the rotor hub and the spacer ring have a coefficient of thermal expansion which is substantially equal to that of the information storage disk.

* * * * *